United States Patent
Kumar et al.

(10) Patent No.: US 11,609,827 B2
(45) Date of Patent: Mar. 21, 2023

(54) DISTRIBUTED ARCHITECTURE FOR TRACKING CONTENT INDEXING

(71) Applicant: Commvault Systems, Inc., Tinton Falls, NJ (US)

(72) Inventors: Sanath Kumar, Bengaluru (IN); Sri Karthik Bhagi, Morganville, NJ (US); Parag Gokhale, Marlboro, NJ (US); Rahul S. Pawar, Marlboro, NJ (US); Arun Prabu Duraisamy, Hyderabad (IN); Manoj Kumar Pradhan, East Brunswick, NJ (US); Dmitriy Borisovich Zakharkin, Monmouth Junction, NJ (US); Prosenjit Sinha, San Jose, CA (US); Vipul Pawale, Ocean, NJ (US); Jaya Rama Raju Inavolu, Eatontown, NJ (US); Manas Bhikchand Mutha, Tinton Falls, NJ (US); Pushpendra Singh, Edison, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 17/580,501

(22) Filed: Jan. 20, 2022

(65) Prior Publication Data
US 2022/0222150 A1    Jul. 14, 2022

Related U.S. Application Data

(63) Continuation of application No. 16/130,864, filed on Sep. 13, 2018, now Pat. No. 11,263,088.

(Continued)

(51) Int. Cl.
*G06F 11/14* (2006.01)
*G06F 9/50* (2006.01)
(Continued)

(52) U.S. Cl.
CPC .......... *G06F 11/1464* (2013.01); *G06F 9/505* (2013.01); *G06F 11/1469* (2013.01);
(Continued)

(58) Field of Classification Search
CPC .. G06F 11/1464; G06F 11/1469; G06F 9/505; G06F 16/13; G06F 16/113;
(Continued)

(56) References Cited

U.S. PATENT DOCUMENTS 7,937,365 B2 *  5/2011  Prahlad ............... G06F 16/2453
                                                    707/640
9,158,835 B2 * 10/2015  Prahlad ............... G06F 16/2228
(Continued)

*Primary Examiner* — Huawen A Peng
(74) *Attorney, Agent, or Firm* — Knobbe Martens Olson & Bear LLP

(57) ABSTRACT

An improved content indexing system is disclosed herein that content indexing system combines the functionality of the backup metadata database and the content index database into a single backup and content index database to avoid the need to perform synchronization operations. By using a single backup and content index database, the content indexing system also reduces the computing performance costs that would be associated with the synchronization operations as the amount of indexed content increases, thereby solving scalability issues.

20 Claims, 26 Drawing Sheets

Related U.S. Application Data

(60) Provisional application No. 62/558,742, filed on Sep. 14, 2017.

(51) Int. Cl.
*G06F 16/13* (2019.01)
*G06F 16/11* (2019.01)
*G06F 16/27* (2019.01)
*G06F 16/22* (2019.01)
*G06F 16/14* (2019.01)

(52) U.S. Cl.
CPC .......... *G06F 16/113* (2019.01); *G06F 16/116* (2019.01); *G06F 16/13* (2019.01); *G06F 16/22* (2019.01); *G06F 16/27* (2019.01); *G06F 16/148* (2019.01); *G06F 2201/84* (2013.01)

(58) Field of Classification Search
CPC ........ G06F 16/116; G06F 16/27; G06F 16/22; G06F 2201/84; G06F 16/148
See application file for complete search history.

(56) References Cited

U.S. PATENT DOCUMENTS

| | | | |
|---|---|---|---|
| 9,734,021 B1* | 8/2017 | Sanocki | H04L 41/0654 |
| 9,904,598 B2* | 2/2018 | Kumarasamy | G06F 11/1448 |
| 10,565,067 B2* | 2/2020 | Dornemann | G06F 9/45558 |
| 2017/0052853 A1* | 2/2017 | Tomnikov | G06F 11/14 |
| 2017/0075773 A1* | 3/2017 | Beeken | G06F 3/0619 |
| 2018/0336105 A1* | 11/2018 | Cadarette | G06F 3/061 |

* cited by examiner

DISTRIBUTED ARCHITECTURE FOR TRACKING CONTENT INDEXING

INCORPORATION BY REFERENCE TO ANY PRIORITY APPLICATIONS

This application is a continuation of U.S. patent application Ser. No. 16/130,864, filed Sep. 13, 2018, and entitled "DISTRIBUTED ARCHITECTURE FOR TRACKING CONTENT INDEXING", which claims the benefit of U.S. Provisional Patent Application No. 62/558,742, filed Sep. 14, 2017, and entitled "DISTRIBUTED ARCHITECTURE FOR TRACKING CONTENT INDEXING". Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

SUMMARY

A content indexing system indexes the content in backup data (e.g., secondary copies) such that a user can search the content index for content without requiring that the backup data first be restored before a search can be performed. Generally, conventional content indexing systems run in a single computing device or single server and therefore experience scalability issues.

In addition, conventional content indexing systems perform content indexing using backup data. The backup data may be organized in a particular format and thus the conventional content indexing systems may initially be configured to content index files in the backup data format. However, if a user changes the format of the backup data and/or an application provides backup data in a different format, then the conventional content indexing systems are no longer compatible and need to be reconfigured to content index files in the changed format.

Finally, conventional content indexing systems generally include a backup metadata database and a content index database that share some data. For example, the backup metadata database receives backup data. However, the backup metadata database does not support content searching or analytics. Thus, the generated content index is stored in a separate database—the content index database. A user interface may display a list of backup files and provide a user with the ability to search for content in the backup files. The user interface may provide the displayed content using information retrieved from the backup metadata database and the content index database. Because both databases may share information, conventional content indexing systems require that the two databases are synched. Synchronization requires the allocation of additional computing resources and errors can occur if there are any issues with the synchronization.

Accordingly, an improved content indexing system is disclosed herein that overcomes the deficiencies described above. For example, the improved content indexing system combines the functionality of the backup metadata database and the content index database into a single backup and content index database to avoid the need to perform synchronization operations. By using a single backup and content index database, the improved content indexing system also reduces the computing performance costs that would be associated with the synchronization operations as the amount of indexed content increases, thereby solving scalability issues.

Conventional content indexing systems generally include multiple client computing devices that each send data to be backed up to a media agent, where a media agent is a computing device that interacts with one or more secondary storage devices as described in greater detail below. The media agent can perform one or more operations, such as converting the received data into a backup format, and store the backup data in one or more secondary storage devices. However, the improved content indexing system may include multiple client computing devices, one or more media agents, the single backup and content index database, and a pool of servers. After a file backup occurs, the backup and content index database may include a file metadata index and other information associated with backed up files. A selected server in the pool of servers may query the backup and content index database for a list of files that have not been content indexed. In response, the backup and content index database may identify the files that have not been content indexed and return these results to the selected server in the pool of servers. The selected server in the pool of servers may then request a media agent to restore the identified files from secondary storage and provide the restored files to the server. The server may then content index the received restored files. Because the server content indexes restored files rather than files in a backup format, the server can perform the content indexing regardless of whether the backup data format changes. Once the content indexing is complete, the server can send the content index information (e.g., keywords) to the backup and content index database for storage.

The server may execute multiple tasks such that multiple operations can be performed in parallel. For example, the server may execute one task to request a list of files that need to be content indexed, a second task to request from a media agent a restore of the files in the received list of files, a third task to receive restored files from the media agent, and/or a fourth task to perform the content indexing. Thus, while one task is performing the content indexing, another task may be requesting the next set of files to content index.

In some cases, the media agents, alone or in combination with the servers, can perform content indexing as well. By allowing the media agents to perform content indexing, the improved content indexing system can avoid bottlenecks associated with the transfer of data from a media agent to a server via a network. Thus, the improved content indexing system can perform content indexing faster than conventional content indexing systems.

Any of the servers in the pool and/or any media agent can serve as a master node for determining which server and/or media agent performs the content indexing. For example, the master node may determine whether it is possible for a media agent to perform the content indexing rather than a server in the pool so as to avoid transferring data over a network during the content indexing process. The master node may distribute the content indexing operations across different servers and/or media agents in a manner such that loads are balanced. For example, the master node may analyze an archive file corresponding to a backup. The archive file may be associated with a set of files of varying sizes. The master node may evaluate the available computing resources present on one or more servers and/or media agents and, based on the analysis of the archive file, determine whether a single server or media agent should be instructed to content index all of the files associated with the archive file or whether multiple servers and/or media agents should each be instructed to content index a portion of the files associated with the archive file.

The improved content indexing system described herein may content index any type of file, such as a video file, an audio file, a document file, an email file, and/or the like. For example, the improved content indexing system may content index an email file by indexing the body of the email as well as any attachments. The fields included in the content index may vary based on file type. For example, all files may include fields like "modified time," "file size," etc. Emails may include additional fields like "to," from," "cc address," etc.

One aspect of the disclosure provides a computer-implemented method as generally shown and described herein and equivalents thereof.

Another aspect of the disclosure provides a system as generally shown and described herein and equivalents thereof.

Another aspect of the disclosure provides a non-transitory computer readable medium storing instructions, which when executed by at least one computing device, perform a method as generally shown and described herein and equivalents thereof.

Another aspect of the disclosure provides a networked information management system for content indexing restored secondary copies. The networked information management system comprises: a content indexing proxy having one or more first hardware processors, where the content indexing proxy is configured with first computer-executable instructions that, when executed, cause the content indexing proxy to: receive, by a first thread executing on the content indexing proxy, identification of primary data assigned to the content indexing proxy by a master content indexing proxy; transmit, by the first thread to an indexing storage system, a query for secondary copy location data corresponding to the identified primary data; receive, by the first thread, the secondary copy location data; transmit, by a second thread executing on the content indexing proxy, an instruction to a first computing device that executes a media agent to restore secondary copies stored at locations indicated by the secondary copy location data; receive, by a third thread executing on the content indexing proxy, an acknowledgment from the first computing device that a restoration of the secondary copies is complete; and transmit, by a fourth thread executing on the content indexing proxy, a request to content index the restored secondary copies. The networked information management system further comprises one or more computing devices in communication with the content indexing proxy, where the one or more computing devices each have one or more second hardware processors, where the one or more computing devices are configured with second computer-executable instructions that, when executed, cause the one or more computing devices to: receive the request to content index the restored secondary copies; retrieve the restored secondary copies from the first computing device; and content index the restored secondary copies.

The networked information management system of the preceding paragraph can include any sub-combination of the following features: where the second computer-executable instructions, when executed, further cause the one or more computing devices to generate previews and extract keywords using the restored secondary copies; where the second computer-executable instructions, when executed, further cause the one or more computing devices to store the generated previews in a database separate from secondary copy metadata; where the indexing storage system comprises an index manager and a backup and content indexing database; where the second computer-executable instructions, when executed, further cause the one or more computing devices to transmit the extracted keywords to the index manager; where the index manager is configured to mark entries in the backup and content indexing database associated with the primary data to indicate that content indexing is complete; where the index manager is configured to mark the entries by changing one or more status flags; where the first computer-executable instructions, when executed, further cause the content indexing proxy to transmit, by the third thread to the fourth thread, a request for content indexing of the restored secondary copies in response to reception of the acknowledgment; where a first worker thread and a second worker thread execute on the content indexing proxy, and where the first worker thread comprises the first thread, the second thread, the third thread, and the fourth thread; and where the primary data is assigned to the first worker thread and second primary data is assigned to the second worker thread by the master content indexing proxy.

Another aspect of the disclosure provides a computer-implemented method for content indexing restored secondary copies. The computer-implemented method further comprises: receiving, by a first thread executing on a content indexing proxy having one or more hardware processors, identification of primary data assigned to the content indexing proxy by a master content indexing proxy; transmitting, by the first thread to an indexing storage system, a query for secondary copy location data corresponding to the identified primary data; transmitting, by a second thread executing on the content indexing proxy, an instruction to a first computing device that executes a media agent to restore secondary copies stored at locations indicated by the secondary copy location data; receiving, by a third thread executing on the content indexing proxy, an acknowledgment from the first computing device that a restoration of the secondary copies is complete; retrieving the restored secondary copies from the first computing device; and content indexing the restored secondary copies.

The computer-implemented method of the preceding paragraph can include any sub-combination of the following features: where content indexing the restored secondary copies further comprises generating previews and extracting keywords using the restored secondary copies; where the computer-implemented method further comprises storing the generated previews in a database separate from secondary copy metadata; where the indexing storage system comprises an index manager and a backup and content indexing database; where the computer-implemented method further comprises transmitting the extracted keywords to the index manager; where the index manager is configured to mark entries in the backup and content indexing database associated with the primary data to indicate that content indexing is complete; where the computer-implemented method further comprises transmitting, by the third thread to the fourth thread, a request for content indexing of the restored secondary copies in response to reception of the acknowledgment; where a first worker thread and a second worker thread execute on the content indexing proxy, where the first worker thread comprises the first thread, the second thread, the third thread, and the fourth thread, and where the primary data is assigned to the first worker thread and second primary data is assigned to the second worker thread by the master content indexing proxy; where the primary data is assigned to the content indexing proxy and second primary data is assigned to a second content indexing proxy by the master content indexing proxy; and where transmitting a query for secondary copy location data corresponding to the identified primary data further comprises transmitting a query for secondary copy location data corresponding to emails in a first page.

Another aspect of the disclosure provides a networked information management system for tracking content indexing. The networked information management system comprises an indexing storage system having one or more first hardware processors, where the indexing storage system is configured with first computer-executable instructions that, when executed, cause the indexing storage system to: receive an indication that a first file has been backed up by a first computing device that executes a media agent; add a first entry in a backup and content indexing database corresponding to the first file that has been backed up, where the first entry comprises an indication that the corresponding first file has not been content indexed, and where the backup and content indexing database comprises a plurality of other entries; receive a request for a total amount of data to content index; determine that the first entry in the backup and content indexing database comprises the indication that the corresponding first file has not been content indexed; determine that a second entry in the plurality of other entries comprises an indication that a corresponding second file has not been content indexed; and transmit a response to the request providing the total amount of data to content index, where the total amount of data to content index is determined based at least in part on the first file and the second file. The networked information management system further comprises a master content indexing proxy in communication with the indexing storage system, where the master content indexing proxy has one or more second hardware processors, where the master content indexing proxy is configured with second computer-executable instructions that, when executed, cause the master content indexing proxy to transmit the request for the total amount of data to content index.

The networked information management system of the preceding paragraph can include any sub-combination of the following features: where the first computer-executable instructions, when executed, further cause the indexing storage system to determine that the first file and the second file correspond to criteria included in a context indexing policy; where the total amount of data to context index comprises at least one of a total number of archive files that include secondary copies that correspond with primary data to be context indexed or a number of secondary copies that are associated with each archive file that correspond with primary data to be context indexed; where the first computer-executable instructions, when executed, further cause the indexing storage system to receive at least one of file metadata associated with the first file or secondary copy metadata associated with the first file and generated by the first computing device; where the first computer-executable instructions, when executed, further cause the indexing storage system to store at least one of the file metadata or the secondary copy metadata in the first entry in the in the backup and content indexing database; where the second computer-executable instructions, when executed, further cause the master content indexing proxy to identify at least one of a total number of controller content indexing proxies available to perform content indexing tasks or a total number of worker threads executing on each controller content indexing proxy available to perform content indexing tasks; where the second computer-executable instructions, when executed, further cause the master content indexing proxy to split the total amount of data to content index for assignment to different controller content indexing proxies available to perform content indexing tasks; where the second computer-executable instructions, when executed, further cause the master content indexing proxy to assign the first file to a first controller content indexing proxy available to perform content indexing tasks and assign the second file to a second controller content indexing proxy available to perform content indexing tasks; where the second computer-executable instructions, when executed, further cause the master content indexing proxy to track and report on progress of content indexing performed by the first controller content indexing proxy and by the second controller content indexing proxy; and where the first entry comprises a status flag that indicates that the first file has not been content indexed.

Another aspect of the disclosure provides a computer-implemented method for tracking content indexing. The computer-implemented method comprises: receiving an indication that a first file has been backed up by a first computing device that executes a media agent; adding a first entry in a backup and content indexing database corresponding to the first file that has been backed up, where the first entry comprises an indication that the corresponding first file has not been content indexed, and where the backup and content indexing database comprises a plurality of other entries; receiving a request for a total amount of data to content index; determining that the first entry in the backup and content indexing database comprises the indication that the corresponding first file has not been content indexed; determining that a second entry in the plurality of other entries comprises an indication that a corresponding second file has not been content indexed; and transmitting a response to the request providing the total amount of data to content index, where the total amount of data to content index is determined based at least in part on the first file and the second file.

The computer-implemented method of the preceding paragraph can include any sub-combination of the following features: where the computer-implemented further comprises determining that the first file and the second file correspond to criteria included in a context indexing policy; where the total amount of data to context index comprises at least one of a total number of archive files that include secondary copies that correspond with primary data to be context indexed or a number of secondary copies that are associated with each archive file that correspond with primary data to be context indexed; where receiving an indication that a first file has been backed up by a first computing device that executes a media agent further comprises receiving at least one of file metadata associated with the first file or secondary copy metadata associated with the first file and generated by the first computing device; where the computer-implemented method further comprises storing at least one of the file metadata or the secondary copy metadata in the first entry in the in the backup and content indexing database; where the computer-implemented method further comprises identifying at least one of a total number of controller content indexing proxies available to perform content indexing tasks or a total number of worker threads executing on each controller content indexing proxy available to perform content indexing tasks, where the computer-implemented method further comprises splitting the total amount of data to content index for assignment to different controller content indexing proxies available to perform content indexing tasks; where the computer-implemented further comprises assigning the first file to a first controller content indexing proxy available to perform content indexing tasks, assigning the second file to a second controller content indexing proxy available to perform content indexing tasks, and tracking and reporting on progress of content indexing performed by the first controller content indexing proxy and by the second controller content indexing proxy; where the first controller content indexing proxy causes content indexing to be performed on a restored secondary copy of the first file in an independent format; and where receiving a request for a total amount of data to content index further comprises receiving a request for a total amount of data in a first mailbox to content index.

Another aspect of the disclosure provides a networked information management system for content indexing data. The networked information management system comprises a master content indexing proxy having one or more first hardware processors, where the master content indexing proxy is configured with first computer-executable instructions that, when executed, cause the master content indexing proxy to: transmit a query for a total amount of data to content index; receive an indication of the total amount of data to content index; determine a total number of controller content indexing proxies that are available to perform content indexing operations; for each available controller content indexing proxy, determine a total number of worker threads executing on the respective available controller content indexing proxy that are available to perform content indexing operations, assign a portion of the total amount of data to content index to the respective available controller content indexing proxy based on at least one of the total amount of data to content index, the total number of available controller content indexing proxies, or the total number of available worker threads executing on the respective available controller content indexing proxy, and transmit an instruction to the respective available controller content indexing proxy indicating the portion of the total amount of data to content index assigned to the respective available controller content indexing proxy. The networked information management system further comprises an indexing storage system in communication with the master content indexing proxy, where the indexing storage system has one or more second hardware processors, where the indexing storage system is configured with second computer-executable instructions that, when executed, cause the indexing storage system to transmit the indication of the total amount of data to content index to the master content indexing proxy.

The networked information management system of the preceding paragraph can include any sub-combination of the following features: where the first computer-executable instructions, when executed, further cause the master content indexing proxy to track progress of content indexing performed by a first available controller content indexing proxy; where the first computer-executable instructions, when executed, further cause the master content indexing proxy to transmit a notification indicating the tracked progress; where the tracked progress comprises one of a percentage of data assigned to the first available controller content indexing proxy that has yet to be content indexed, an amount of data assigned to the first available controller content indexing proxy that has yet to be content indexed, or a time remaining until the data assigned to the first available controller content indexing proxy is content indexed; where the first computer-executable instructions, when executed, further cause the master content indexing proxy to: determine that the first available controller content indexing proxy is operating at a performance level below a threshold value based on the tracked progress, and assign at least some of the content indexing tasks assigned to the first available controller content indexing proxy to another available controller content indexing proxy; where the first computer-executable instructions, when executed, further cause the master content indexing proxy to assign one of a first archive file, a portion of a second archive file, or individual primary data to a first available controller content indexing proxy; where a first worker thread and a second worker thread execute on a first available controller content indexing proxy; where the first computer-executable instructions, when executed, further cause the master content indexing proxy to: assign a first archive file to the first worker thread, and assign a second archive file to the second worker thread; where the first computer-executable instructions, when executed, further cause the master content indexing proxy to determine a total amount of data to content index for a second set of content indexing operations while the total number of controller content indexing proxies that are available to perform the content indexing operations is determined; and where the total amount of data to content index comprises at least one of a total number of archive files that include secondary copies that correspond with primary data to be context indexed or a number of secondary copies that are associated with each archive file that correspond with primary data to be context indexed.

Another aspect of the disclosure provides a computer-implemented method for content indexing data. The computer-implemented method comprises: transmitting a query for a total amount of data to content index; receiving an indication of the total amount of data to content index; determining a total number of controller content indexing proxies that are available to perform content indexing operations; and for each available controller content indexing proxy, determining a total number of worker threads executing on the respective available controller content indexing proxy that are available to perform content indexing operations, assigning a portion of the total amount of data to content index to the respective available controller content indexing proxy based on at least one of the total amount of data to content index, the total number of available controller content indexing proxies, or the total number of available worker threads executing on the respective available controller content indexing proxy, and transmitting an instruction to the respective available controller content indexing proxy indicating the portion of the total amount of data to content index assigned to the respective available controller content indexing proxy.

The computer-implemented method of the preceding paragraph can include any sub-combination of the following features: where the method further comprises tracking progress of content indexing performed by a first available controller content indexing proxy; where the computer-implemented method further comprises transmitting a notification indicating the tracked progress; where the tracked progress comprises one of a percentage of data assigned to the first available controller content indexing proxy that has yet to be content indexed, an amount of data assigned to the first available controller content indexing proxy that has yet to be content indexed, or a time remaining until the data assigned to the first available controller content indexing proxy is content indexed; where the computer-implemented method further comprises: determining that the first available controller content indexing proxy is operating at a performance level below a threshold value based on the tracked progress, and assigning at least some of the content indexing tasks assigned to the first available controller content indexing proxy to another available controller content indexing proxy; where assigning a portion of the total amount of data to content index to the respective available controller content indexing proxy further comprises assigning one of a first archive file, a portion of a second archive file, or individual primary data to a first available controller content indexing proxy; where a first worker thread and a second worker thread execute on a first available controller content indexing proxy, and where assigning a portion of the total amount of data to content index to the respective available controller content indexing proxy further comprises: assigning a first archive file to the first worker thread, and assigning a second archive file to the second worker thread; where the first available controller content indexing proxy causes content indexing to be performed on restored secondary copies in an independent format; where the computer-implemented method further comprises determining a total amount of data to content index for a second set of content indexing operations while the total number of controller content indexing proxies that are available to perform the content indexing operations is determined; and where transmitting a query for a total amount of data to content index further comprises transmitting a query for a total amount of data in a first mailbox to content index.

Another aspect of the disclosure provides a networked information management system for content indexing data. The networked information management system comprises a master content indexing proxy having one or more first hardware processors, where the master content indexing proxy is configured with first computer-executable instructions that, when executed, cause the master content indexing proxy to: transmit a query for a total amount of data to content index; receive an indication of the total amount of data to content index; determine a total number of controller content indexing proxies that are available to perform content indexing operations; determine, based on the total number of controller content indexing proxies that are available to perform content indexing operations, that a first controller content indexing proxy is available to perform content indexing operations, where the first controller content indexing proxy is executed by a first computing device that executes a media agent, and where the media agent manages at least a subset of the total amount of data to content index; assign the subset of the total amount of data to content index to the first controller content indexing proxy such that the media agent restores secondary copies corresponding to the subset of the total amount of data and provides the restored secondary copies to the first controller content indexing proxy without transmitting the restored secondary copies over an external network; and transmit an instruction to the first controller content indexing proxy indicating that the subset of the total amount of data to content index is assigned to the first controller content indexing proxy. The networked information management system further comprises an indexing storage system in communication with the master content indexing proxy, where the indexing storage system has one or more second hardware processors, where the indexing storage system is configured with second computer-executable instructions that, when executed, cause the indexing storage system to transmit the indication of the total amount of data to content index to the master content indexing proxy.

The networked information management system of the preceding paragraph can include any sub-combination of the following features: where the first computer-executable instructions, when executed, further cause the master content indexing proxy to track progress of content indexing performed by the first controller content indexing proxy; where the first computer-executable instructions, when executed, further cause the master content indexing proxy to transmit a notification indicating the tracked progress; where the tracked progress comprises one of a percentage of the subset of the total amount of data assigned to the first controller content indexing proxy that has yet to be content indexed, an amount of the subset of the total amount of data assigned to the first controller content indexing proxy that has yet to be content indexed, or a time remaining until the subset of the total amount of data assigned to the first available controller content indexing proxy is content indexed; where the first computer-executable instructions, when executed, further cause the master content indexing proxy to: determine that the first controller content indexing proxy is operating at a performance level below a threshold value based on the tracked progress, and assign at least some of the subset of the total amount of data assigned to the first controller content indexing proxy to another controller content indexing proxy; where the first computer-executable instructions, when executed, further cause the master content indexing proxy to assign one of a first archive file, a portion of a second archive file, or individual primary data to the first controller content indexing proxy; where a first worker thread and a second worker thread execute on the first controller content indexing proxy; where the first computer-executable instructions, when executed, further cause the master content indexing proxy to: assign a first portion of the subset of the total amount of data to the first worker thread, and assign a second portion of the subset of the total amount of data to the second worker thread; where the first computer-executable instructions, when executed, further cause the master content indexing proxy to determine a total amount of data to content index for a second set of content indexing operations while the total number of controller content indexing proxies that are available to perform the content indexing operations is determined; and where the subset of the total amount of data to content index comprises at least one of a total number of archive files that include secondary copies that correspond with primary data to be context indexed or a number of secondary copies that are associated with each archive file that correspond with primary data to be context indexed.

Another aspect of the disclosure provides a computer-implemented method for content indexing data. The computer-implemented method comprises: transmitting a query for a total amount of data to content index; receiving an indication of the total amount of data to content index; determining a total number of controller content indexing proxies that are available to perform content indexing operations; determining, based on the total number of controller content indexing proxies that are available to perform content indexing operations, that a first controller content indexing proxy is available to perform content indexing operations, where the first controller content indexing proxy is executed by a first computing device that executes a media agent, and where the media agent manages at least a subset of the total amount of data to content index; assigning the subset of the total amount of data to content index to the first controller content indexing proxy such that the media agent restores secondary copies corresponding to the subset of the total amount of data and provides the restored secondary copies to the first controller content indexing proxy for use in content indexing without transmitting the restored secondary copies over an external network; and transmitting an instruction to the first controller content indexing proxy indicating that the subset of the total amount of data to content index is assigned to the first controller content indexing proxy.

The computer-implemented method of the preceding paragraph can include any sub-combination of the following features: where the computer-implemented method further comprises tracking progress of content indexing performed by the first controller content indexing proxy; where the computer-implemented method further comprises transmitting a notification indicating the tracked progress; where the tracked progress comprises one of a percentage of the subset of the total amount of data assigned to the first controller content indexing proxy that has yet to be content indexed, an amount of the subset of the total amount of data assigned to the first controller content indexing proxy that has yet to be content indexed, or a time remaining until the subset of the total amount of data assigned to the first available controller content indexing proxy is content indexed; where the computer-implemented method further comprises determining that the first controller content indexing proxy is operating at a performance level below a threshold value based on the tracked progress, and assigning at least some of the subset of the total amount of data assigned to the first controller content indexing proxy to another controller content indexing proxy; where assigning the subset of the total amount of data to content index to the first controller content indexing proxy further comprises assigning one of a first archive file, a portion of a second archive file, or individual primary data to the first controller content indexing proxy; where a first worker thread and a second worker thread execute on the first controller content indexing proxy, and where assigning the subset of the total amount of data to content index to the first controller content indexing proxy further comprises: assigning a first portion of the subset of the total amount of data to the first worker thread, and assigning a second portion of the subset of the total amount of data to the second worker thread; where the restored secondary copies are in an independent format; where the computer-implemented method further comprises determining a total amount of data to content index for a second set of content indexing operations while the total number of controller content indexing proxies that are available to perform the content indexing operations is determined; and where transmitting a query for a total amount of data to content index further comprises transmitting a query for a total amount of data in a first mailbox to content index.

Another aspect of the disclosure provides a networked information management system for combining backup and content index data. The networked information management system comprises an indexing storage system having one or more first hardware processors, where the indexing storage system is configured with first computer-executable instructions that, when executed, cause the indexing storage system to: receive an indication that a first file has been backed up by a first computing device that executes a media agent; add a first entry in a backup and content indexing database corresponding to the first file that has been backed up, where the first entry comprises an indication of a secondary copy location of the first file; receive a request for the secondary copy location; transmit the secondary copy location such that a restored secondary copy of the first file can be content indexed; receive one or more keywords extracted from the restored secondary copy of the first file; and store the one or more keywords in the first entry in the backup and content indexing database. The networked information management system further comprises a controller content indexing proxy in communication with the indexing storage system, where the controller content indexing proxy has one or more second hardware processors, where the controller content indexing proxy is configured with second computer-executable instructions that, when executed, cause the controller content indexing proxy to transmit the request for the secondary copy location.

The networked information management system of the preceding paragraph can include any sub-combination of the following features: where the first computer-executable instructions, when executed, further cause the indexing storage system to mark the first entry in the backup and content indexing database to indicate that the first file has been content indexed; where the first computer-executable instructions, when executed, further cause the indexing storage system to change a status flag in the first entry to indicate that the first file has been content indexed; where the indexing storage system is configured to not store a preview of the first file generated during the content indexing of the first file; where the first computer-executable instructions, when executed, further cause the indexing storage system to receive at least one of file metadata associated with the first file or secondary copy metadata associated with the first file and generated by the first computing device; where the first computer-executable instructions, when executed, further cause the indexing storage system to store at least one of the file metadata or the secondary copy metadata in the first entry in the in the backup and content indexing database; where the second computer-executable instructions, when executed, further cause the controller content indexing proxy to request a restoration of the first file from the secondary copy location; where the second computer-executable instructions, when executed, further cause the controller content indexing proxy to request content indexing of the first file subsequent to the request for the restoration of the first file from the secondary copy location; where the second computer-executable instructions, when executed, further cause the controller content indexing proxy to request a secondary copy location of a second file while requesting the restoration of the first file from the secondary copy location; and where the restored secondary copy of the first file is in a markup language format.

Another aspect of the disclosure provides a computer-implemented method for combining backup and content index data. The computer-implemented method comprises: receiving an indication that a first file has been backed up by a first computing device that executes a media agent; adding a first entry in a backup and content indexing database corresponding to the first file that has been backed up, where the first entry comprises an indication of a secondary copy location of the first file; receiving a request for the secondary copy location; transmitting the secondary copy location such that a restored secondary copy of the first file can be content indexed; receiving one or more keywords extracted from the restored secondary copy of the first file; and storing the one or more keywords in the first entry in the backup and content indexing database.

The computer-implemented method of the preceding paragraph can include any sub-combination of the following features: where the computer-implemented method further comprises marking the first entry in the backup and content indexing database to indicate that the first file has been content indexed; where marking the first entry in the backup and content indexing database to indicate that the first file has been content indexed further comprises changing a status flag in the first entry to indicate that the first file has been content indexed; where the indexing storage system is configured to not store a preview of the first file generated during the content indexing of the first file; where receiving an indication that a first file has been backed up by a first computing device further comprises receiving at least one of file metadata associated with the first file or secondary copy metadata associated with the first file and generated by the first computing device; where the computer-implemented method further comprises storing at least one of the file metadata or the secondary copy metadata in the first entry in the in the backup and content indexing database; where the computer-implemented method further comprises: requesting a restoration of the first file from the secondary copy location, and requesting content indexing of the first file subsequent to the request for the restoration of the first file from the secondary copy location; where the computer-implemented method further comprises requesting a secondary copy location of a second file while requesting the restoration of the first file from the secondary copy location; where the restored secondary copy of the first file is in an independent format; where receiving a request for the secondary copy location further comprises: receiving a request for the secondary copy location of the first file from a first controller content indexing proxy at the direction of a master content indexing proxy, and receiving a request for a secondary copy location of a second file from a second controller content indexing proxy at the direction of the master content indexing proxy.

Another aspect of the disclosure provides a networked information management system for separately storing previews. The networked information management system comprises a preview database. The networked information management system further comprises a backup and content indexing database. The networked information management system further comprises a content indexing service having one or more first hardware processors, where the content indexing service is configured with first computer-executable instructions that, when executed, cause the content indexing service to: receive a restored version of a secondary copy, where the secondary copy corresponds to a first data file; parse the restored version of the secondary copy; extract one or more keywords corresponding the first data file based on the parsing of the restored version of the secondary copy; generate a preview of the restored version of the secondary copy; store the generated preview of the restored version of the secondary copy in the preview database; and store, in the backup and content indexing database, the one or more extracted keywords and a path to a storage location of the generated preview in the preview database.

The networked information management system of the preceding paragraph can include any sub-combination of the following features: where the preview database comprises a link to a duplicate preview at a location corresponding to the path to the storage location of the generated preview; where the first computer-executable instructions, when executed, further cause the content indexing service to identify the path to the storage location of the generated preview in the preview database subsequent to storing the generated preview in the preview database; where the first computer-executable instructions, when executed, further cause the content indexing service to process an instruction to content index the first data file; where the first computer-executable instructions, when executed, further cause the content indexing service to parse the restored version of the secondary copy in response to reception of the instruction to content index the first data file; where the first computer-executable instructions, when executed, further cause the content indexing service to process an instruction to content index the first data file received from a controller content indexing proxy; where the first computer-executable instructions, when executed, further cause the content indexing service to receive the restored version of the secondary copy as a result of the controller content indexing proxy instructing a first computing device having a media agent to restore the first data file; where the first computer-executable instructions, when executed, further cause the content indexing service to store the one or more extracted keywords in the backup and content indexing database in an entry associated with the first data file; where storage of the one or more extracted keywords in the backup and content indexing database results in an indication, in the backup and content indexing database, that the first data file is content indexed; and where the restored version of the secondary copy is in a markup language format.

Another aspect of the disclosure provides a computer-implemented method for separately storing previews. The computer-implemented method further comprises: receiving a restored version of a secondary copy, where the secondary copy corresponds to a first data file; parsing the restored version of the secondary copy; extracting one or more keywords corresponding the first data file based on the parsing of the restored version of the secondary copy; generating a preview of the restored version of the secondary copy; storing the generated preview of the restored version of the secondary copy in a preview database; and storing, in a backup and content indexing database, the one or more extracted keywords and a path to a storage location of the generated preview in the preview database.

The computer-implemented method of the preceding paragraph can include any sub-combination of the following features: where the preview database comprises a link to a duplicate preview at a location corresponding to the path to the storage location of the generated preview; where the computer-implemented method further comprises identifying the path to the storage location of the generated preview in the preview database subsequent to storing the generated preview in the preview database; where the computer-implemented method further comprises receiving an instruction to content index the first data file; where parsing the restored version of the secondary copy further comprises parsing the restored version of the secondary copy in response to reception of the instruction to content index the first data file; where receiving an instruction to content index the first data file further comprises: receiving an instruction to content index the first data file from a first controller content indexing proxy at the direction of a master content indexing proxy, and receiving an instruction to content index a second data file from a second controller content indexing proxy at the direction of the master content indexing proxy; where receiving the restored version of the secondary copy further comprises receiving the restored version of the secondary copy as a result of the first controller content indexing proxy instructing a first computing device having a media agent to restore the first data file; where storing the one or more extracted keywords further comprises storing the one or more extracted keywords in the backup and content indexing database in an entry associated with the first data file; where storage of the one or more extracted keywords in the backup and content indexing database results in an indication, in the backup and content indexing database, that the first data file is content indexed; and where the restored version of the secondary copy is in an independent format.

Another aspect of the disclosure provides a networked information management system for content indexing emails. The networked information management system comprises a content indexing proxy having one or more first hardware processors, where the content indexing proxy is configured with first computer-executable instructions that, when executed, cause the content indexing proxy to: receive, by a first thread executing on the content indexing proxy, identification of emails assigned to the content indexing proxy by a master content indexing proxy, where the identified emails are each associated with an email page in a plurality of email pages; and for each email page in the plurality of email pages, transmit, by the first thread to an indexing storage system, a query for secondary copy location data corresponding to the emails associated with the respective email page, receive, by the first thread, the secondary copy location data, transmit, by a second thread executing on the content indexing proxy, an instruction to a first computing device that executes a media agent to restore secondary copies stored at locations indicated by the secondary copy location data, receive, by a third thread executing on the content indexing proxy, an acknowledgment from the first computing device that a restoration of the secondary copies is complete, and transmit, by a fourth thread executing on the content indexing proxy, a request to content index the restored secondary copies. The networked information management system further comprises one or more computing devices in communication with the content indexing proxy, where the one or more computing devices each have one or more second hardware processors, where the one or more computing devices are configured with second computer-executable instructions that, when executed, cause the one or more computing devices to content index the restored secondary copies.

The networked information management system of the preceding paragraph can include any sub-combination of the following features: where the first computer-executable instructions, when executed, further cause the content indexing proxy to simultaneously transmit an instruction to the first computing device to restore secondary copies of emails associated with a first email page in the plurality of email pages and transmit a query for secondary copy location data corresponding to emails associated with a second email page in the plurality of email pages; where the first computer-executable instructions, when executed, further cause the content indexing proxy to: for an attachment file associated with a first email in a first email page in the plurality of email pages, transmit, by the first thread to the indexing storage system, a query for secondary copy location data corresponding to the attachment file, receive, by the first thread, the secondary copy location data corresponding to the attachment file, transmit, by the second thread, an instruction to the first computing device to restore a secondary copy of the attachment file stored at a location indicated by the secondary copy location data corresponding to the attachment file, receive, by the third thread, an acknowledgment from the first computing device that a restoration of the secondary copy of the attachment file is complete, and transmit, by the fourth thread, a request to content index the restored secondary copy of the attachment file; where the secondary copy of the attachment file is stored separately from a secondary copy of the first email in a secondary storage device; where the secondary copy location data comprises at least one of logical paths to secondary copies stored in a secondary storage device or offsets indicating where the secondary copies are stored in the secondary storage device; where the emails assigned to the content indexing proxy are emails that have not yet been content indexed; where the second computer-executable instructions, when executed, further cause the one or more computing devices to extract one or more keywords and generate one or more previews using the restored secondary copies; where the second computer-executable instructions, when executed, further cause the one or more computing devices to store the one or more keywords and the one or more previews in different databases; where the second computer-executable instructions, when executed, further cause the one or more computing devices to store the one or more keywords and a path to a storage location of the one or more previews in a backup and content indexing database; and where the restored secondary copies are in a markup language format.

Another aspect of the disclosure provides a computer-implemented method for content indexing emails. The computer-implemented method comprises: receiving, by a first thread executing on a content indexing proxy, identification of emails assigned to the content indexing proxy by a master content indexing proxy, where the identified emails are each associated with an email page in a plurality of email pages; and for each email page in the plurality of email pages, transmitting, by the first thread to an indexing storage system, a query for secondary copy location data corresponding to the emails associated with the respective email page, receiving, by the first thread, the secondary copy location data, transmitting, by a second thread executing on the content indexing proxy, an instruction to a first computing device that executes a media agent to restore secondary copies stored at locations indicated by the secondary copy location data, receiving, by a third thread executing on the content indexing proxy, an acknowledgment from the first computing device that a restoration of the secondary copies is complete, and transmitting, by a fourth thread executing on the content indexing proxy, a request to content index the restored secondary copies.

The computer-implemented method of the preceding paragraph can include any sub-combination of the following features: where the computer-implemented method further comprises simultaneously transmitting an instruction to the first computing device to restore secondary copies of emails associated with a first email page in the plurality of email pages and transmitting a query for secondary copy location data corresponding to emails associated with a second email page in the plurality of email pages; where the computer-implemented method further comprises for an attachment file associated with a first email in a first email page in the plurality of email pages, transmitting, by the first thread to the indexing storage system, a query for secondary copy location data corresponding to the attachment file, receiving, by the first thread, the secondary copy location data corresponding to the attachment file, transmitting, by the second thread, an instruction to the first computing device to restore a secondary copy of the attachment file stored at a location indicated by the secondary copy location data corresponding to the attachment file, receiving, by the third thread, an acknowledgment from the first computing device that a restoration of the secondary copy of the attachment file is complete, and transmitting, by the fourth thread, a request to content index the restored secondary copy of the attachment file; where the secondary copy of the attachment file is stored separately from a secondary copy of the first email in a secondary storage device; where the secondary copy location data comprises at least one of logical paths to secondary copies stored in a secondary storage device or offsets indicating where the secondary copies are stored in the secondary storage device; where the emails assigned to the content indexing proxy are emails that have not yet been content indexed; where the computer-implemented method further comprises extracting one or more keywords and generating one or more previews using the restored secondary copies; where the computer-implemented method further comprises storing the one or more keywords and the one or more previews in different databases; where the computer-implemented method further comprises receiving, by a first thread executing on a second content indexing proxy, identification of second emails assigned to the second content indexing proxy by the master content indexing proxy, and performing, by the second content indexing proxy, operations to content index the second emails; and where the restored secondary copies are in an independent format.

DETAILED DESCRIPTION

Figure 1A:
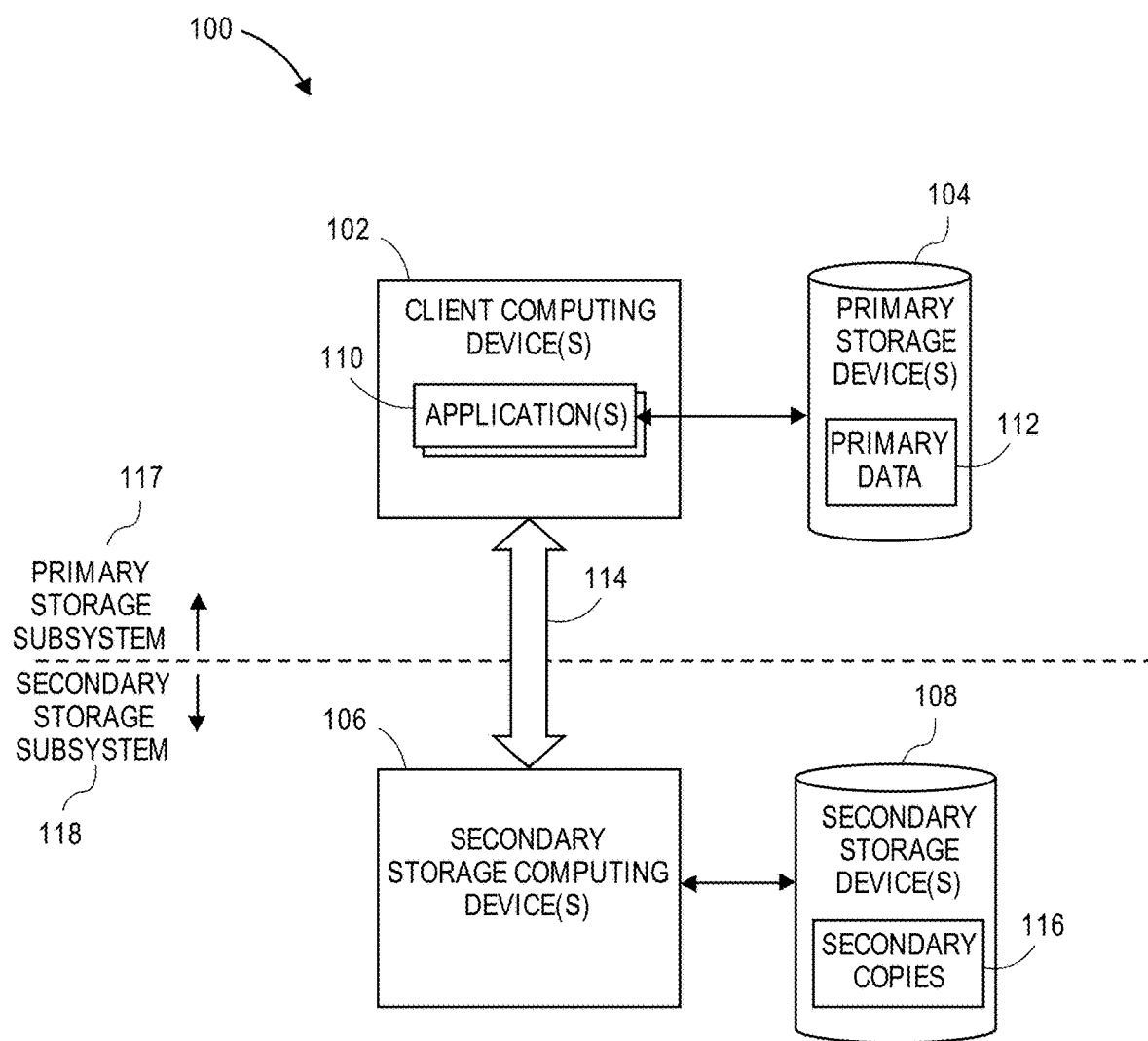
FIG. 1A is a block diagram illustrating an exemplary information management system.

A content indexing system indexes the content in backup data (e.g., secondary copies) such that a user can search the content index for content without requiring that the backup data first be restored before a search can be performed.

Generally, conventional content indexing systems run in a single computing device or single server and therefore experience scalability issues.

In addition, conventional content indexing systems perform content indexing using backup data. The backup data may be organized in a particular format and thus the conventional content indexing systems may initially be configured to content index files in the backup data format. However, if a user changes the format of the backup data and/or an application provides backup data in a different format, then the conventional content indexing systems are no longer compatible and need to be reconfigured to content index files in the changed format.

Finally, conventional content indexing systems generally include a backup metadata database and a content index database that share some data. For example, the backup metadata database receives backup data. However, the backup metadata database does not support content searching or analytics. Thus, the generated content index is stored in a separate database—the content index database. A user interface may display a list of backup files and provide a user with the ability to search for content in the backup files. The user interface may provide the displayed content using information retrieved from the backup metadata database and the content index database. Because both databases may share information, conventional content indexing systems require that the two databases are synched. Synchronization requires the allocation of additional computing resources and errors can occur if there are any issues with the synchronization.

Accordingly, an improved content indexing system is disclosed herein that overcomes the deficiencies described above. For example, the improved content indexing system combines the functionality of the backup metadata database and the content index database into a single backup and content index database to avoid the need to perform synchronization operations. By using a single backup and content index database, the improved content indexing system also reduces the computing performance costs that would be associated with the synchronization operations as the amount of indexed content increases, thereby solving scalability issues.

Conventional content indexing systems generally include multiple client computing devices that each send data to be backed up to a media agent, where a media agent is a computing device that interacts with one or more secondary storage devices as described in greater detail below. The media agent can perform one or more operations, such as converting the received data into a backup format, and store the backup data in one or more secondary storage devices. However, the improved content indexing system may include multiple client computing devices, one or more media agents, the single backup and content index database, and a pool of servers. After a file backup occurs, the backup and content index database may include a file metadata index and other information associated with backed up files. A selected server in the pool of servers may query the backup and content index database for a list of files that have not been content indexed. In response, the backup and content index database may identify the files that have not been content indexed and return these results to the selected server in the pool of servers. The selected server in the pool of servers may then request a media agent to restore the identified files from secondary storage and provide the restored files to the server. The server may then content index the received restored files. Because the server content indexes restored files rather than files in a backup format, the server can perform the content indexing regardless of whether the backup data format changes. Once the content indexing is complete, the server can send the content index information (e.g., keywords) to the backup and content index database for storage.

The server may execute multiple tasks such that multiple operations can be performed in parallel. For example, the server may execute one task to request a list of files that need to be content indexed, a second task to request from a media agent a restore of the files in the received list of files, a third task to receive restored files from the media agent, and/or a fourth task to perform the content indexing. Thus, while one task is performing the content indexing, another task may be requesting the next set of files to content index.

In some cases, the media agents, alone or in combination with the servers, can perform content indexing as well. By allowing the media agents to perform content indexing, the improved content indexing system can avoid bottlenecks associated with the transfer of data from a media agent to a server via a network. Thus, the improved content indexing system can perform content indexing faster than conventional content indexing systems.

Any of the servers in the pool and/or any media agent can serve as a master node for determining which server and/or media agent performs the content indexing. For example, the master node may determine whether it is possible for a media agent to perform the content indexing rather than a server in the pool so as to avoid transferring data over a network during the content indexing process. The master node may distribute the content indexing operations across different servers and/or media agents in a manner such that loads are balanced. For example, the master node may analyze an archive file corresponding to a backup. The archive file may be associated with a set of files of varying sizes. The master node may evaluate the available computing resources present on one or more servers and/or media agents and, based on the analysis of the archive file, determine whether a single server or media agent should be instructed to content index all of the files associated with the archive file or whether multiple servers and/or media agents should each be instructed to content index a portion of the files associated with the archive file.

The improved content indexing system described herein may content index any type of file, such as a video file, an audio file, a document file, an email file, and/or the like. For example, the improved content indexing system may content index an email file by indexing the body of the email as well as any attachments. The fields included in the content index may vary based on file type. For example, all files may include fields like "modified time," "file size," etc. Emails may include additional fields like "to," from," "cc address," etc.

Detailed descriptions and examples of systems and methods according to one or more illustrative embodiments of the present invention may be found in the section entitled Improved Content Indexing System, as well as in the section entitled Example Embodiments, and also in FIGS. 3 through 17 herein. Furthermore, components and functionality for the improved content indexing system described herein may be configured and/or incorporated into information management systems such as those described herein in FIGS. 1A-1H and 2A-2C.

Various embodiments described herein are intimately tied to, enabled by, and would not exist except for, computer technology. For example, the improved content indexing system described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. Pub. No. 2006/0224846, entitled "System and Method to Support Single Instance Storage Operations";
- U.S. Pat. Pub. No. 2014/0201170, entitled "High Availability Distributed Deduplicated Storage System";
- U.S. Pat. Pub. No. 2016/0350391, entitled "Replication Using Deduplicated Secondary Copy Data";
- U.S. Patent Application Pub. No. 2017/0168903 entitled "Live Synchronization and Management of Virtual Machines across Computing and Virtualization Platforms and Using Live Synchronization to Support Disaster Recovery";
- U.S. Patent Application Pub. No. 2017/0193003 entitled "Redundant and Robust Distributed Deduplication Data Storage System";
- U.S. Patent Application Pub. No. 2017/0235647 entitled "Data Protection Operations Based on Network Path Information";
- U.S. Patent Application Pub. No. 2017/0242871, entitled "Data Restoration Operations Based on Network Path Information"; and
- U.S. Patent Application Pub. No. 2017/0185488, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
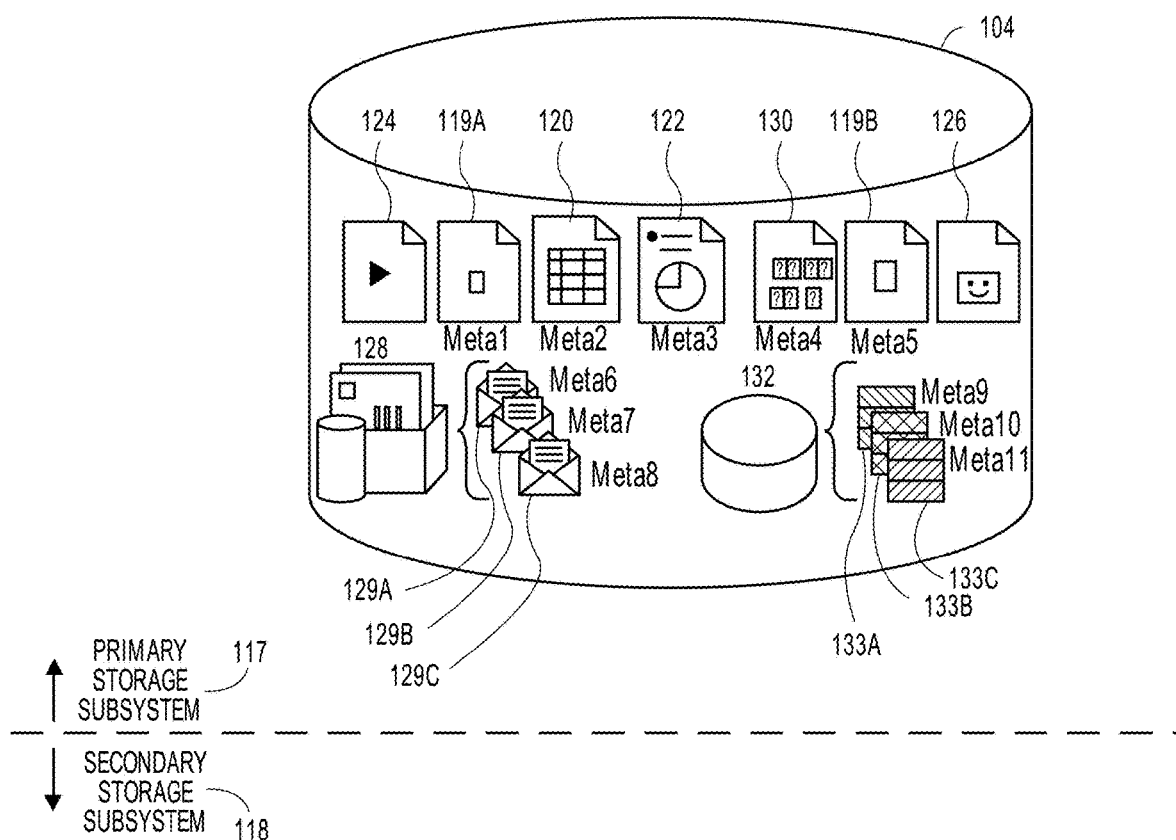
FIG. 1B is a detailed view of a primary storage device, a secondary storage device, and some examples of primary data and secondary copy data.
Figure 1B:
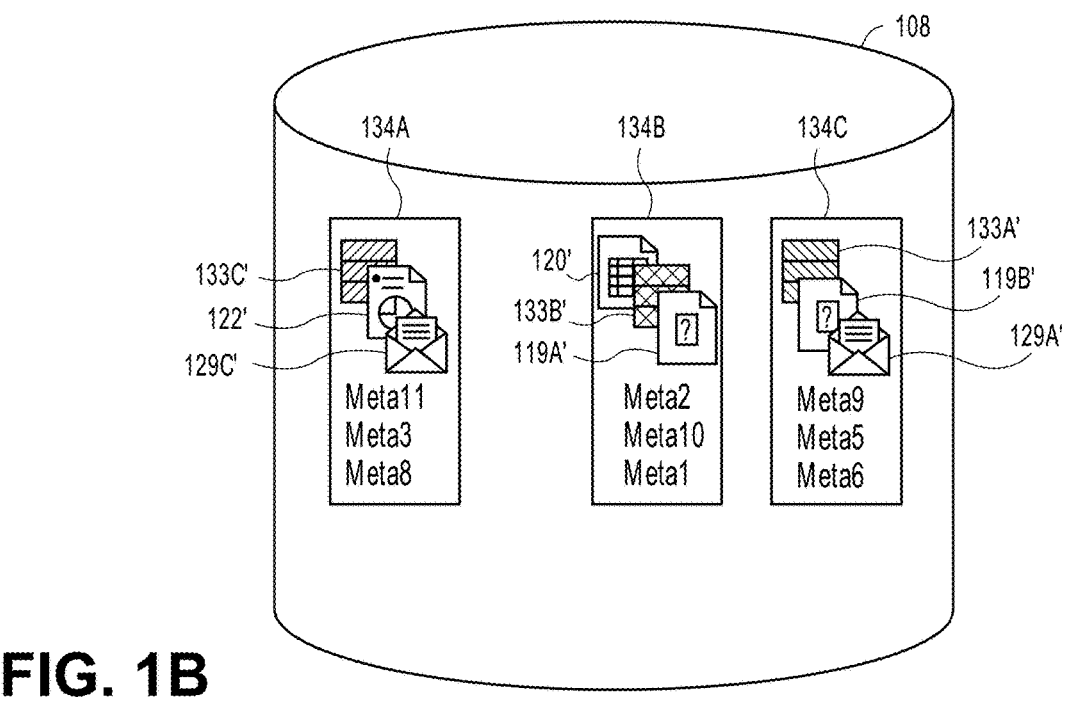
Figure 1C:
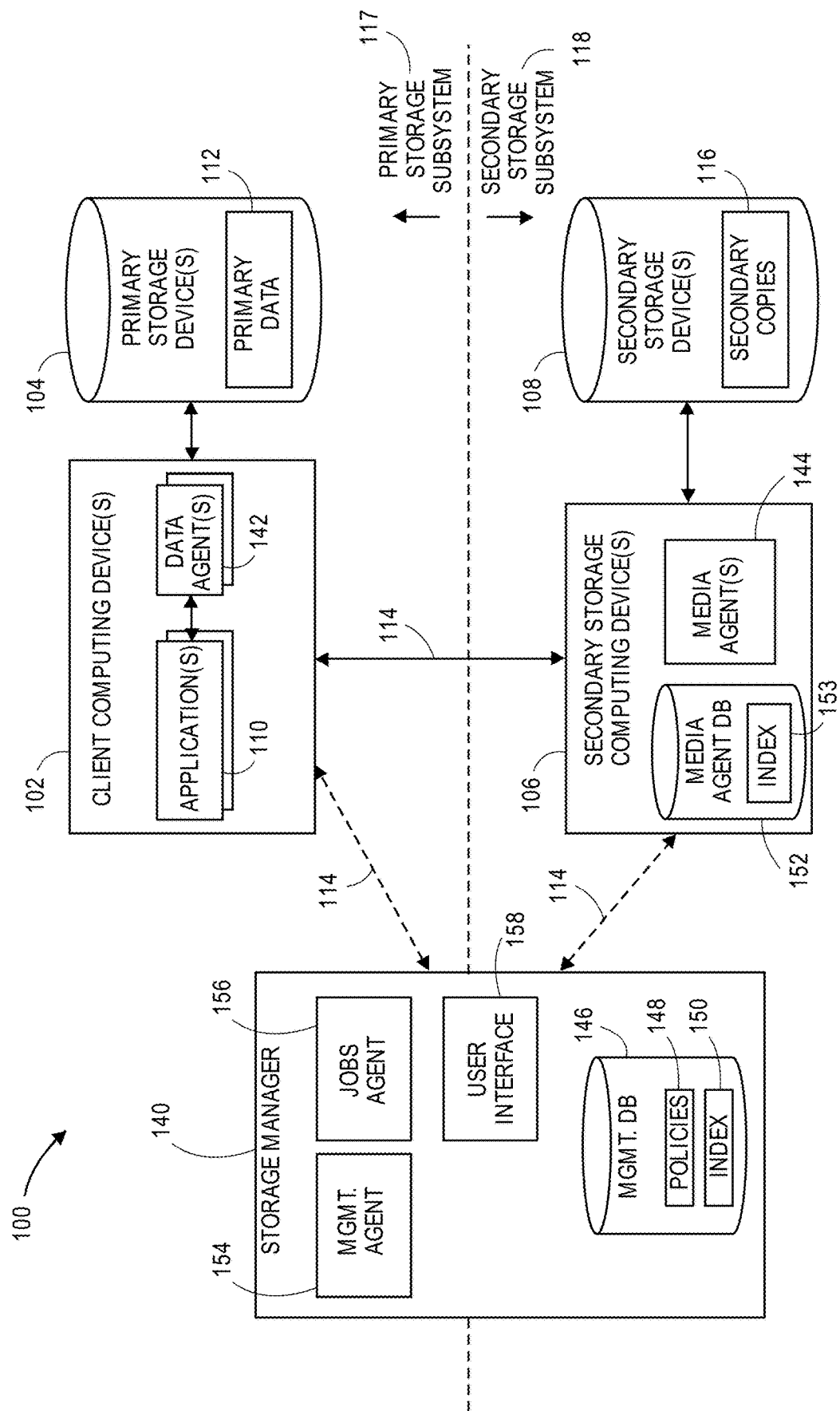
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clarion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 1346 represents primary data objects 120, 1336, and 119A as 120', 1336', and 119A', respectively, accompanied by corresponding metadata Meta2, Meta10, and Meta1, respectively. Also, secondary copy data object 134C represents primary data objects 133A, 1196, and 129A as 133A', 1196', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/ or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents.

Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
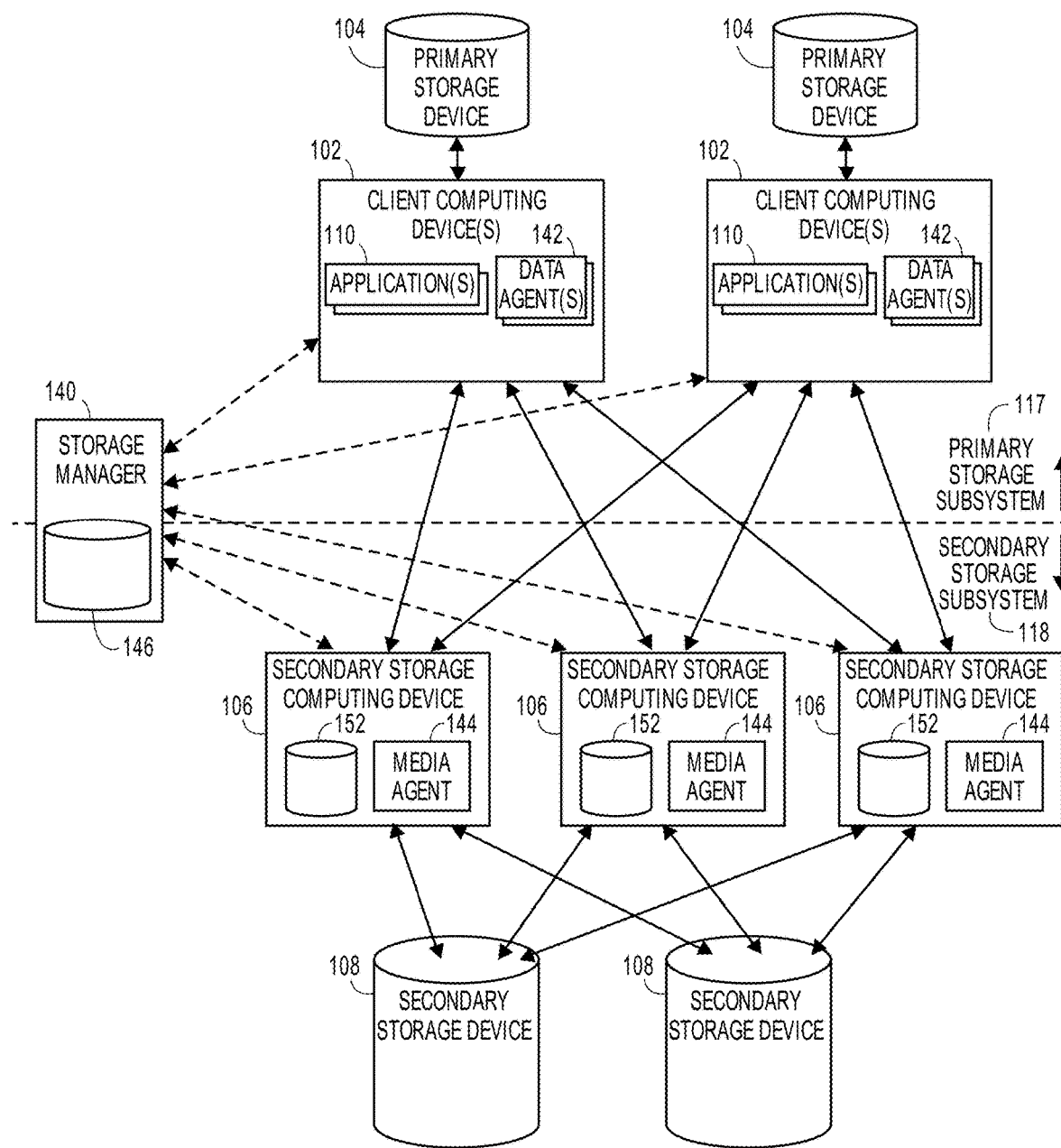
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;
the type of secondary copy 116 and/or copy format (e.g., snapshot, backup, archive, HSM, etc.);
a location or a class or quality of storage for storing secondary copies 116 (e.g., one or more particular secondary storage devices 108);
preferences regarding whether and how to encrypt, compress, deduplicate, or otherwise modify or transform secondary copies 116;
which system components and/or network pathways (e.g., preferred media agents 144) should be used to perform secondary storage operations;
resource allocation among different computing devices or other system components used in performing information management operations (e.g., bandwidth allocation, available storage capacity, etc.);
whether and how to synchronize or otherwise distribute files or other data objects across multiple computing devices or hosted services; and
retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;
time-related factors (e.g., aging information such as time since the creation or modification of a data object);
deduplication information (e.g., hashes, data blocks, deduplication block size, deduplication efficiency or other metrics);
an estimated or historic usage or cost associated with different components (e.g., with secondary storage devices 108);
the identity of users, applications 110, client computing devices 102 and/or other computing devices that created, accessed, modified, or otherwise utilized primary data 112 or secondary copies 116;
a relative sensitivity (e.g., confidentiality, importance) of a data object, e.g., as determined by its content and/or metadata;
the current or historical storage capacity of various storage devices;
the current or historical network capacity of network pathways connecting various components within the storage operation cell;
access control lists or other security information; and
the content of a particular data object (e.g., its textual content) or of metadata associated with the data object.

Exemplary Storage Policy and Secondary Copy Operations

Figure 1E:
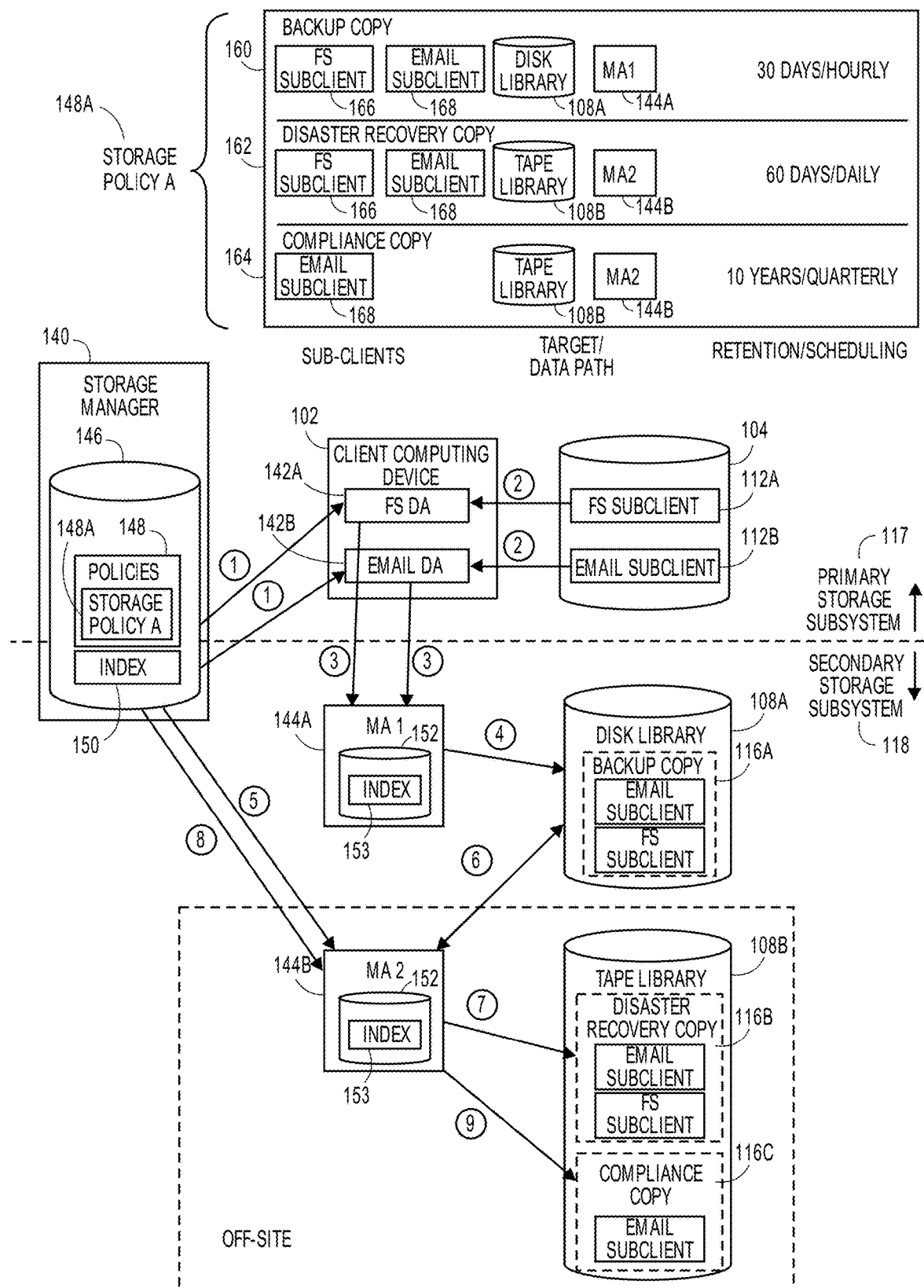
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 1168. Illustratively, and by way of illustrating the scalable aspects and off-loading principles embedded in system 100, disaster recovery copy 1168 is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
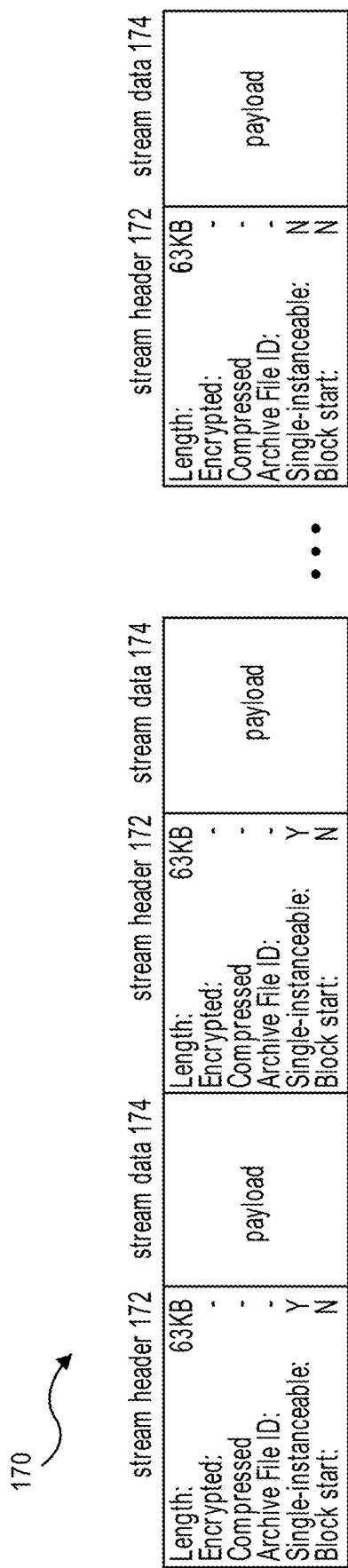
FIGS. 1F-1H are block diagrams illustrating suitable data structures that may be employed by the information management system.
Figure 1G:
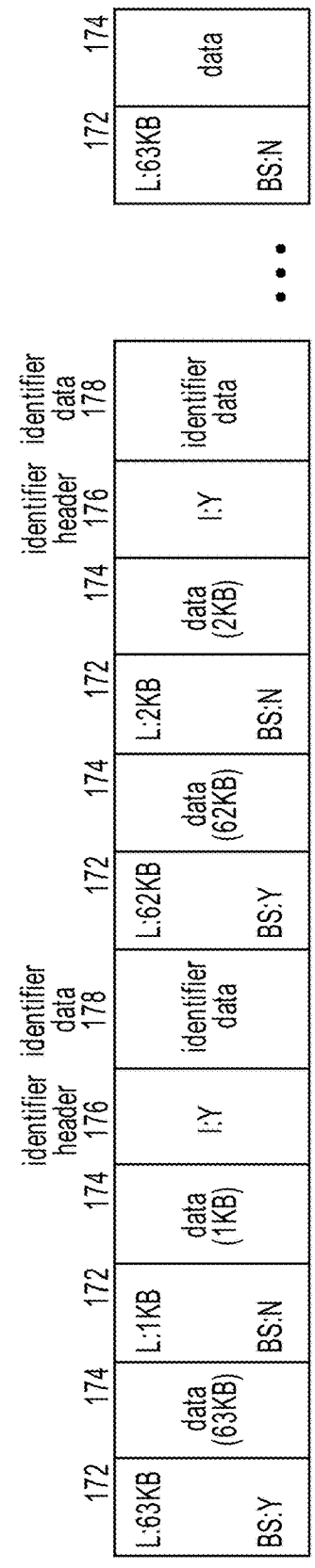

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
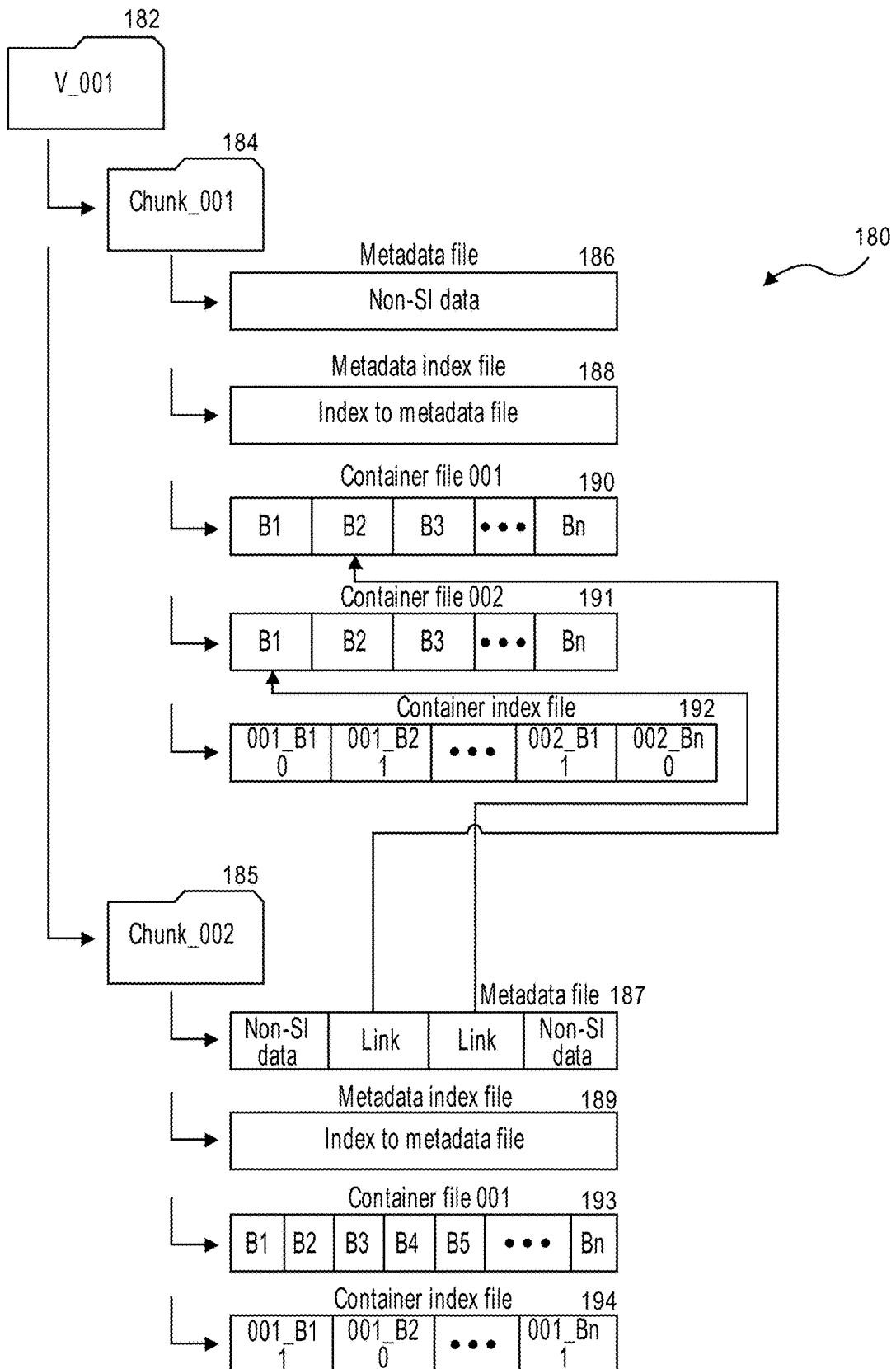

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
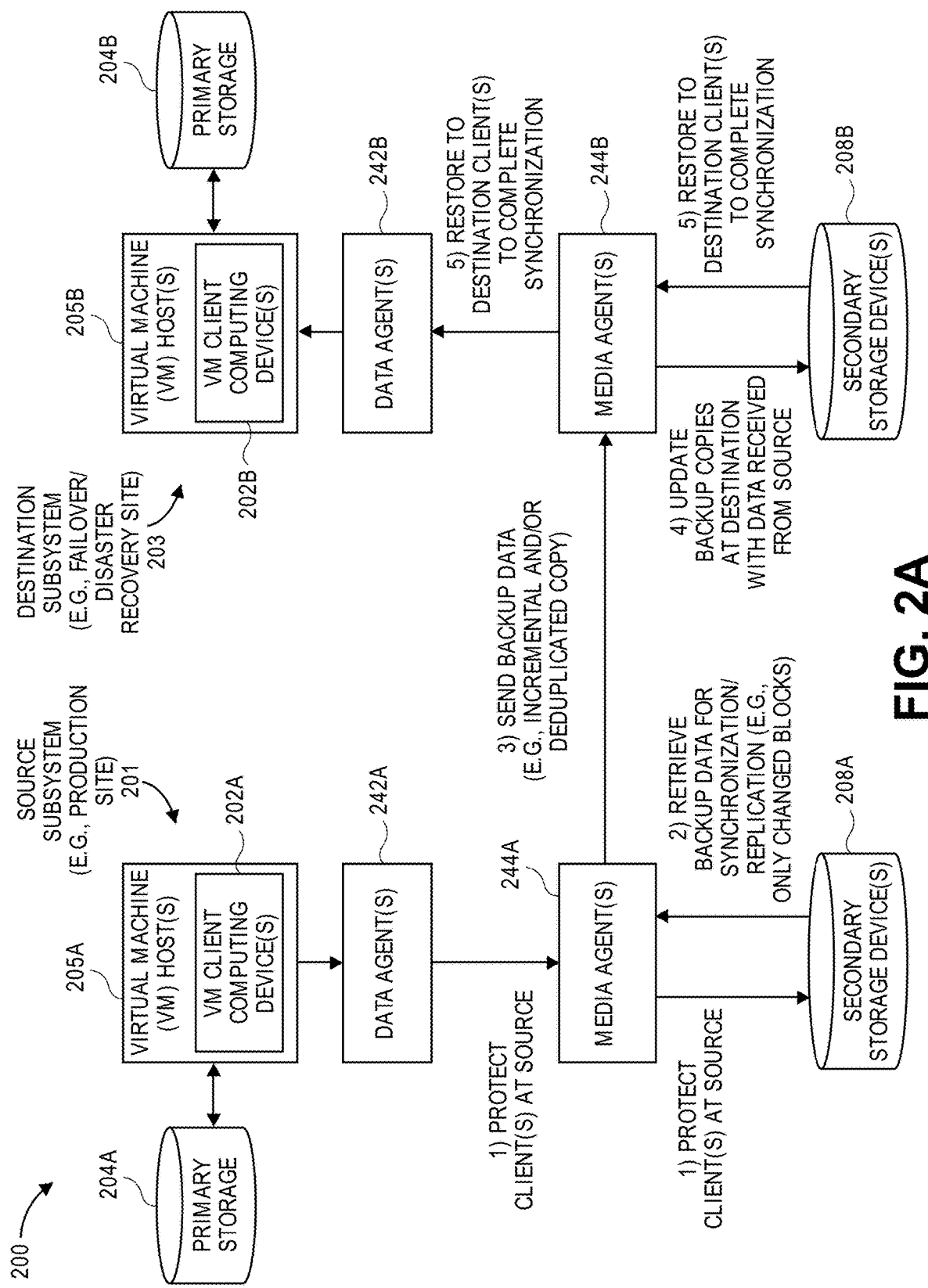
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application Pub. No. 2017/0168903 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b* may be kept "warm" awaiting activation in case failure is detected at the source. This synchronization/replication process can incorporate the techniques described in U.S. Patent Application Pub. No. 2016/0350391, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
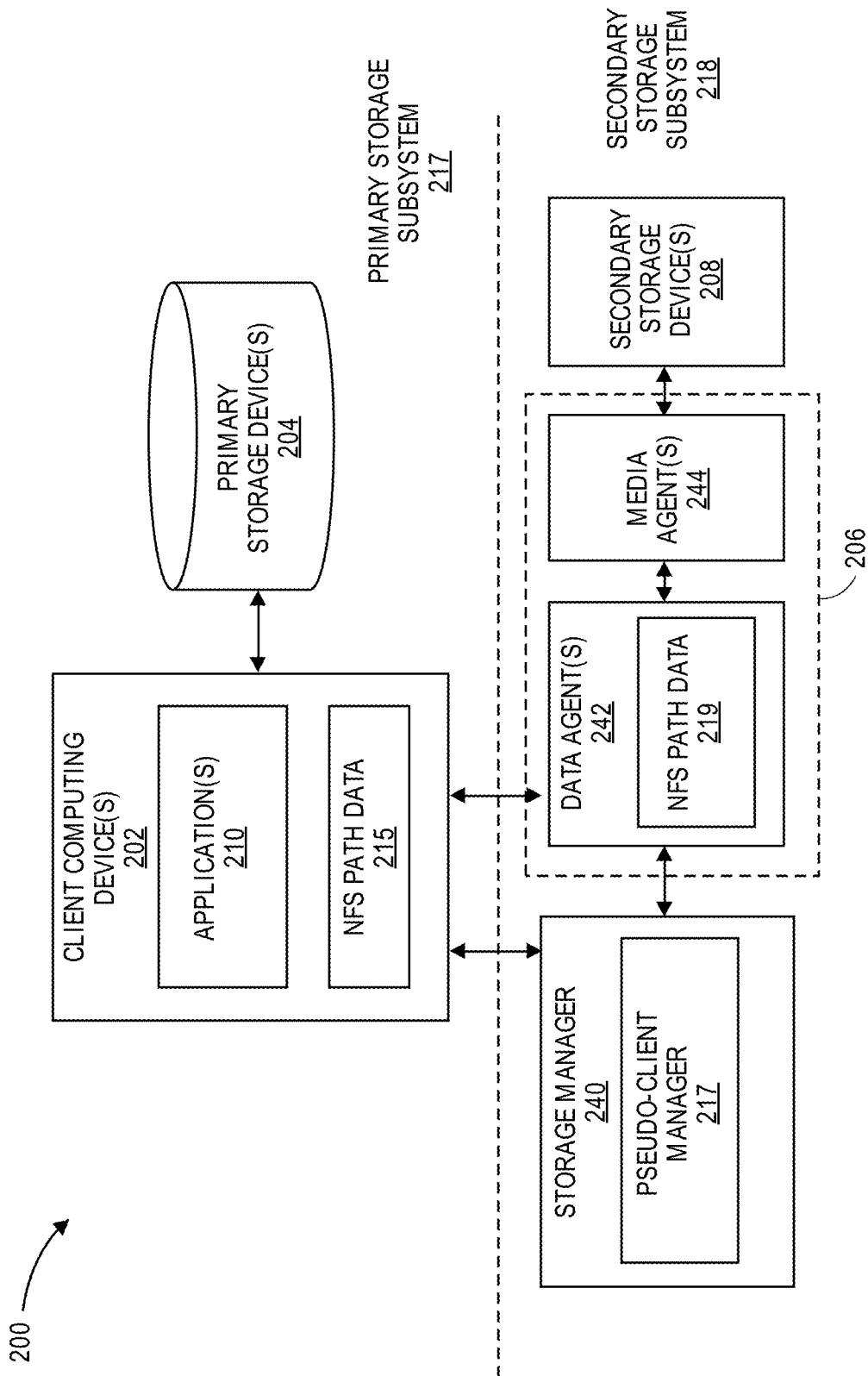
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application Pub. No. 2017/0235647, entitled "Data Protection Operations Based on Network Path Information." Examples of improved data restoration scenarios based on network-path information, including using stored backups effectively as primary data sources, may be found in U.S. Patent Application Pub. No. 2017/0242871, entitled "Data Restoration Operations Based on Network Path Information."

Highly Scalable Managed Data Pool Architecture

Figure 2C:
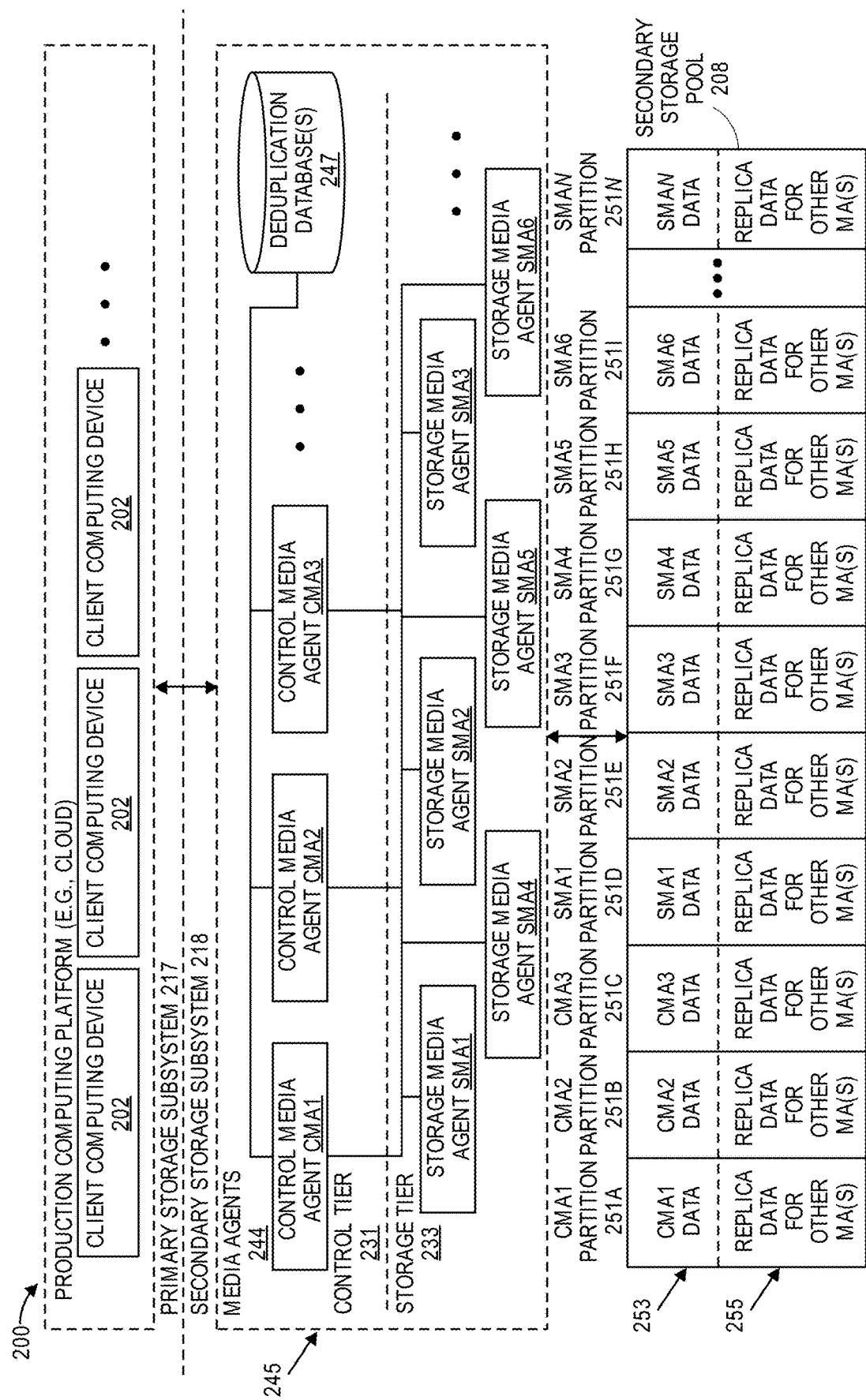
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application Pub. No. 2017/0193003 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Improved Content Indexing System

Figure 3:
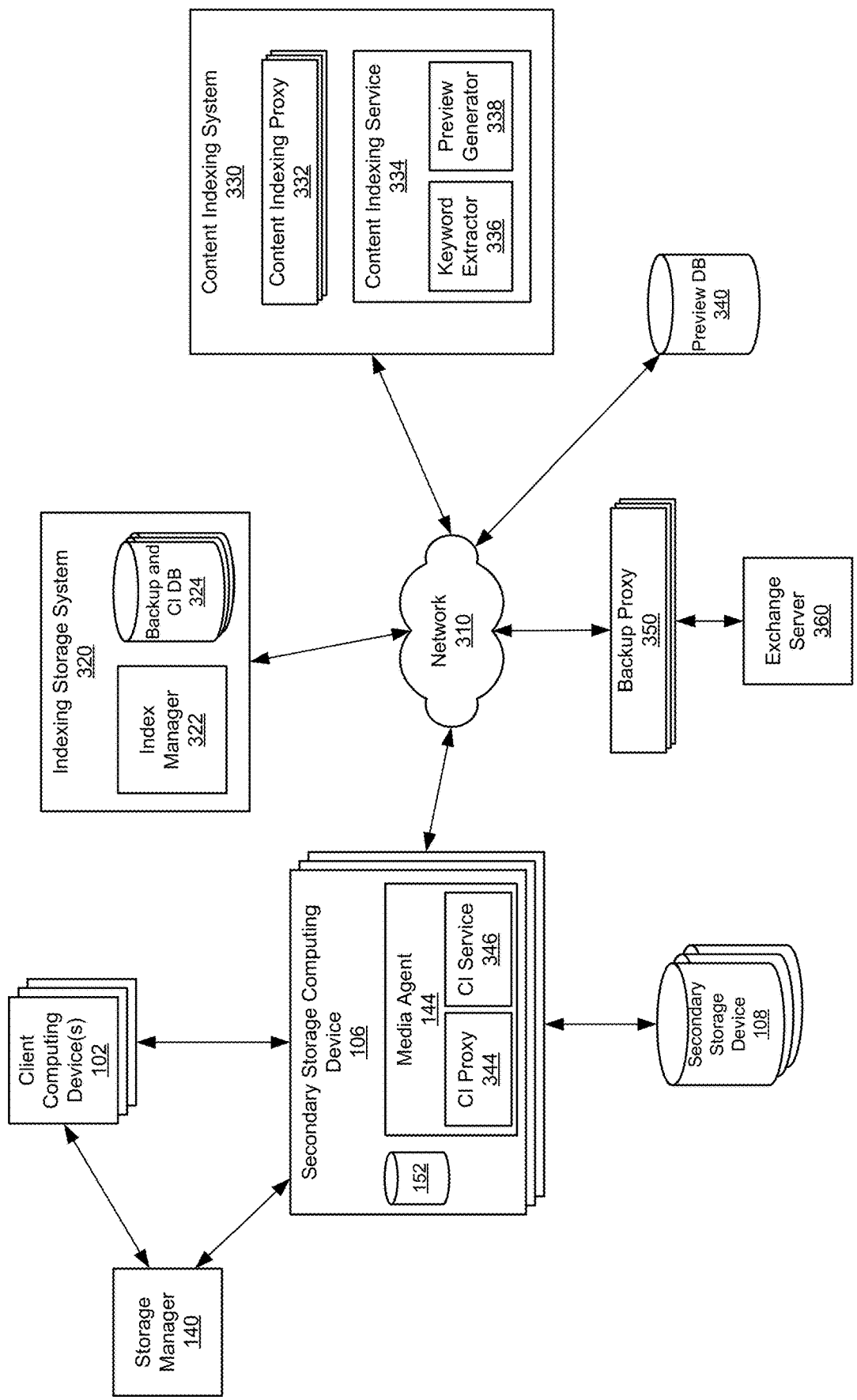
FIG. 3 is a block diagram illustrating some salient portions of an operating environment used for content indexing data objects, according to an illustrative embodiment of the present invention.

FIG. 3 is a block diagram illustrating some salient portions of an operating environment used for content indexing data objects, according to an illustrative embodiment of the present invention. As illustrated in FIG. 3, the operating environment includes one or more client computing devices 102, one or more secondary storage computing devices 106, one or more secondary storage devices 108, the storage manager 140, an indexing storage system 320, a content indexing system 330, a preview database 340, one or more backup proxies 350, and an exchange server 360. The one or more secondary storage computing devices 106, the indexing storage system 320, the content indexing system 330, the preview database 340, and/or the one or more backup proxies 350 may communicate via a communication network 310.

One or more of the components in the operating environment depicted in FIG. 3 may implement functionality to provide the improved content indexing system described herein. As described above, a conventional content indexing system indexes the content in backup data, which allows a user to search for content in the backup data without having to restore the backup data. For example, typically, a media agent 144 running on a secondary storage computing device 106 content indexes secondary copies of data objects stored in a secondary storage device 108. The backup data may be organized in a particular format and thus the media agent 144 may initially be configured to content index files in the backup data format. However, if a user changes the format of the backup data and/or an application provides backup data in a different format, then the media agent 144 is no longer compatible with the backup data and cannot perform the content indexing unless the media agent 144 is reconfigured to handle the new backup format. Thus, the secondary storage computing devices 106, the indexing storage system 320, and/or the content indexing system 330 of the present disclosure can be configured to implement techniques that allow backed up data to be content indexed regardless of the backup data format.

In addition, conventional content indexing systems run in a single computing device or single server and therefore experience scalability issues. For example, as the size of backed up data increases, the load on the single computing device or single server to content index the backed up data also increases. The increased load causes the single computing device or single server to perform content indexing operations with suboptimal and/or inefficient performance. Thus, the secondary storage computing devices 106, the indexing storage system 320, and/or the content indexing system 330 of the present disclosure can be configured to implement techniques that allow the content indexing operations to scale efficiently as the size of the backup data increases.

Finally, conventional content indexing systems generally include a separate backup metadata database and a separate content index database. For example, the backup metadata database receives backup metadata (e.g., media agent index 153) during secondary copy operations, and the backup metadata database may be stored on a secondary storage computing device 106 (e.g., in media agent database 152). However, the backup metadata database does not support content searching or analytics. Thus, the generated content index is stored in a separate database—the content index database—and content searches are performed by querying the content index database. While the above disclosure indicates that the content index can also be stored in the media agent database 152, the content index database and the backup metadata database may actually be separate databases that are both stored within the media agent database 152. The content index database, however, may share some data with the backup metadata database to allow a user, via a user interface (e.g., the user interface 158 of storage manager 140), to provide search criteria for searching content in the secondary copy files. Because the content index database may share information with the backup metadata database and because the backup metadata database is otherwise not accessed when search criteria is provided, conventional content indexing systems require that the two databases be synchronized. Synchronization requires the allocation of additional computing resources, which can increase the latency of synchronization operations (and thus subsequent operations, such as content searching operations) as the amount of backup data increases. Similarly, content searching errors can occur if there are any issues with the synchronization. Thus, the secondary storage computing devices 106, the indexing storage system 320, and/or the content indexing system 330 of the present disclosure can be configured to implement techniques that allow for a single database to store data typically stored separately in the backup metadata database and in the content index database, thereby avoiding the need for synchronization operations to be performed.

For example, the secondary storage computing devices 106 may perform secondary copy operations in response to receiving primary data from the client computing devices 102, as described above. In particular, the media agent 144 may perform secondary copy operations to convert primary data into secondary copies and then store the secondary copies in one or more secondary storage devices 108. The primary data processed during a single secondary copy operation (e.g., a single backup job) may each be associated with the same backup job identifier (e.g., the same archive file identifier) because the resulting secondary copies may be grouped into a single backup file (e.g., a single archive file) corresponding to the backup job identifier. In the process of performing secondary copy operations, the media agent 144 may generate a data structure associated with the particular media agent 144 that includes information about the stored data associated with the particular media agent 144 (e.g., index 153). For instance, for each secondary copy, the index 153 may include metadata such as an identification of the respective secondary copy (e.g., file/subdirectory, database object, mailbox object, etc.), a logical path to the respective secondary copy on the corresponding secondary storage device 108, location information (e.g., offsets) indicating where the respective secondary copy is stored in the secondary storage device 108, when the respective secondary copy was created or modified, etc. As described above, the media agent 144 may store the indices 153 in the media agent database 152. However, alternatively or in addition, the media agent 144 may transmit the indices 153 to the indexing storage system 320 for storage in one or more backup and content indexing (CI) databases 324 stored locally by the indexing storage system 320. The indexing storage system 320 may include an index manager 322 that determines in which backup and CI database 324 the received indices 153 should be stored. Because the secondary copies may be grouped into an archive file when stored in the one or more secondary storage devices 108, the received indices 153 may be stored in entries associated with the corresponding archive file identifier.

In addition, the exchange server 360 may store one or more email files corresponding to an individual user account or a group of user accounts. Periodically and/or at the direction of a secondary copy policy or administrator, the exchange server 360 may transmit some or all of the email files to the one or more backup proxies 350. The one or more backup proxies 350 may process the email files to identify certain metadata (e.g., such as metadata specific to email files, like received time, sent time, "to" addresses, "from" address, "cc" addresses, "bcc" addresses, subject line, number of attachments, types of attachments, etc.) and then forward the email files and metadata to the one or more secondary storage computing devices 106 via the network 310. In some embodiments, a backup proxy 350 may separate attachment file(s) from an email file and transmit the attachments and emails to the one or more secondary storage computing devices 106 as separate files. The secondary storage computing devices 106 may then perform secondary copy operations in a manner as discussed above, generating an index 153 for each of the email files and/or each of the attachment files and transmitting the indices 153 and the metadata received from the one or more backup proxies 350 to the indexing storage system 320 for storage in one or more backup and CI databases 324. Alternatively or in addition, the media agent 144 that performs the secondary copy operation may store the indices 153 and the received metadata in the media agent database 152.

Thus, the indexing storage system 320 may store the indices 153 generated by the media agents 144 during secondary copy operations and/or the metadata generated by the one or more backup proxies 350, which together may represent backup metadata (which can more generally be referred to herein as "secondary copy metadata"). Individual backup metadata may be stored in an entry in the one or more backup and CI databases 324 associated with the corresponding primary data and a corresponding archive file identifier. When individual backup metadata is initially stored in the one or more backup and CI databases 324, the primary data corresponding to the individual backup metadata may be marked as not yet content indexed (e.g., with a status flag).

Once the secondary copies are stored in the one or more secondary storage devices 108, one or more of the secondary storage computing devices 106 and/or the content indexing system 330 may initiate and/or perform content indexing. However, the one or more secondary storage computing devices 106 and/or the content indexing system 330 may not perform content indexing using the secondary copies. Rather, as described in greater detail below, the one or more secondary storage computing devices 106 and/or the content indexing system 330 may perform the content indexing using restored versions of the secondary copies.

The one or more secondary storage computing devices 106 and/or the content indexing system 330 may include various components for performing the content indexing. For example, the content indexing system 330 may include one or more content indexing proxies 332 and a content indexing service 334. Similarly, a media agent 144 may execute instructions that cause the media agent 144 to implement a content indexing proxy 344 and a content indexing service 346. Each content indexing proxy 332 may be a separate computing system, such as a single server or a group of servers, that can instruct other content indexing proxies 332 and/or 344 to perform content indexing operations and/or that can itself perform content indexing operations. In particular, a content indexing proxy 332 or 344 may act as a master proxy or a controller proxy. Generally, one content indexing proxy 332 or 344 may act as a master proxy and the remaining content indexing proxies 332 and/or 344 may act as controller proxies. If a content indexing proxy 332 or 344 is a master proxy, then the content indexing proxy 332 or 344 may identify which primary data need to be content indexed, split the content indexing operations across one or more other content indexing proxies 332 and/or 344, instruct the other content indexing proxies 332 and/or 344 to perform the content indexing operations accordingly, and monitor the status of the various other content indexing proxies 332 and/or 344 for reporting purposes. If a content indexing proxy 332 or 344 is a controller proxy, then the content indexing proxy 332 or 344 may receive an instruction from a master proxy to perform content indexing operations. In response, the content indexing proxy 332 or 344 may determine which primary data that need to be content indexed are assigned thereto and determine the corresponding secondary storage paths, cause the restoration of secondary copies corresponding to these primary data, and instruct the content indexing service 334 and/or 346 to content index the restored secondary copies. In some embodiments, a content indexing proxy 332 or 344 acting as a master proxy also performs the operations performed by a controller proxy.

By introducing a plurality of content indexing proxies 332 and/or 344 that are capable of performing content indexing operations, the operating environment may be able to scale efficiently as the amount and/or size of backup data increases. For example, additional content indexing proxies 332 and/or 344 can be provisioned as the need for additional computing resources arises (e.g., due to the increase in the amount and/or size of backup data) without any changes to the operations that are executed to perform the content indexing and/or without any reconfiguration of the existing content indexing proxies 332 and/or 344.

Each content indexing proxy 332 and/or 344 may execute one or more threads to perform individual tasks corresponding to the content indexing operations described herein. For example, a content indexing proxy 332 or 344 may execute one thread to determine which primary data that need to be content indexed are assigned thereto and determine the corresponding secondary storage paths, a second thread to cause the restoration of secondary copies corresponding to these primary data, a third thread to determine when the restoration is complete, and a fourth thread to instruct the content indexing service 334 and/or 346 to content index the restored secondary copies. Some or all of the threads may operate serially. Alternatively or in addition, some or all of the threads may operate in parallel. Thus, the first thread may determine which primary data that need to be content indexed are assigned thereto and determine the corresponding secondary storage paths at the same time that the second thread causes the restoration of secondary copies corresponding to primary data that were previously determined by the first thread to be assigned thereto. By executing threads in parallel, the media agent 144 and/or content indexing system 330 can reduce the amount of content indexing proxy 332 and/or 344 down time (e.g., more efficiently use the computing processing capabilities of the content indexing proxies 332 and/or 344), thereby reducing the time taken to perform the content indexing operations.

The content indexing service 334 and/or 346 may include various components to perform the content indexing. For example, the content indexing service 334 may include a keyword extractor 336 and a preview generator 338. The content indexing service 346 may include similar components (not shown). In some embodiments, the restored secondary copies may be in an independent format that is the same regardless of the actual file type. In other embodiments, the restored secondary copies may be in a format that changes based on the file type of the corresponding primary data. In an illustrative example, the restored secondary copies are in a markup language format, such as the extensible markup language (XML) format. The keyword extractor 336 may parse the content of restored secondary copies and, for each restored secondary copy, extract keyword(s) from the content and transmit the extracted keyword(s) to the indexing storage system 320. The index manager 322 of the indexing storage system 320 may identify an entry in one or more of the backup and CI databases 324 for the primary data that corresponds to the respective restored secondary copy from which the received keyword(s) is extracted and store the received keyword(s) in the identified entry.

The preview generator 338 may process the content of restored secondary copies and, for each restored secondary copy, generate a preview of the respective restored secondary copy. Unlike the keyword extractor 336, the preview generator 338 may not transmit the generated previews to the indexing storage system 320 for storage. The generated previews may have file sizes that are larger than the backup metadata and/or extracted keywords, and therefore the backup and CI databases 324 may be more likely to reach storage capacity sooner if the generated previews are stored therein. To increase the amount of storage space available in the one or more backup and CI databases 324 (and thus to reduce the need for provisioning additional backup and CI databases 324), the preview generator 338 may instead transmit the generated previews to the preview database 340. Individual generated previews may be stored in the preview database 340 in an entry associated with the primary data corresponding to the restored secondary copy from which the respective preview was generated.

Storing the generated previews in the preview database 340, which is a database separate from the backup and CI databases 324, may provide an additional benefit. For example, some different restored secondary copies may correspond to identical or duplicate primary data. This may often occur when the primary data are email files that have been sent to multiple recipients (and therefore the same email is stored on the exchange server 360 in association with multiple user accounts). Because the different restored secondary copies are identical, the previews generated from these restored secondary copies may also be identical. Instead of storing identical previews, the preview database 340, a secondary storage computing device 106 (e.g., a media agent 144), and/or another computing device (not shown) may periodically or at the request of a user, storage manager 140, etc. run a deduplication operation to prune duplicate previews from the preview database 340. Previews that are duplicate of another preview may be replaced by the preview database 340, the secondary storage computing device 106 (e.g., the media agent 144), and/or the other computing device with a link to the preview that was duplicated.

After the previews are stored in the preview database 340, the preview generator 338 may identify the corresponding preview storage paths in the preview database 340 and transmit these paths to the indexing storage system 320. For each preview, the index manager 322 of the indexing storage system 320 may identify an entry in one or more of the backup and CI databases 324 for the primary data that corresponds to the restored secondary copy from which the respective preview is generated and store the corresponding preview storage path in the identified entry. Thus, if a user, via the user interface 158, submits search criteria for performing a content search, the storage manager 140 (or other component in the operating environment) may use the keywords stored in the one or more backup and CI databases 324 to identify primary data that satisfy the search criteria. The storage manager 140 can then retrieve previews corresponding to primary data that satisfy the search criteria from the one or more backup and CI databases 324 and display an identification of the primary data that satisfy the search criteria and/or the corresponding primary data previews in the user interface 158.

Accordingly, each entry in the backup and CI databases 324 may be associated with individual primary data, an archive file identifier, backup metadata, extracted keywords, and/or a path to a stored preview.

As described above, the indexing storage system 320 stores one or more backup and CI databases 324. For example, the indexing storage system 320 may store a first backup and CI database 324 and a replicated version of the first backup and CI database 324. The indexing storage system 320 may further store a second backup and CI database 324, a replicated version of the second backup and CI database 324, a third backup and CI database 324, a replicated version of the third backup and CI database 324, and so on. While the indexing storage system 320 is referred to as an indexing storage system, this is not meant to be limiting. For example, the indexing storage system 320 can be used for non-content indexing operations (e.g., to retrieve backup metadata for performing a restore operation).

The network 310 may include any wired network, wireless network, or combination thereof. For example, the network 310 may be a personal area network, local area network, wide area network, over-the-air broadcast network (e.g., for radio or television), cable network, satellite network, cellular telephone network, or combination thereof. As a further example, the network 310 may be a publicly accessible network of linked networks, possibly operated by various distinct parties, such as the Internet. In some embodiments, the network 310 may be a semi-private network, such as a corporate or university intranet, or a private network. The network 310 may include one or more wireless networks, such as a Global System for Mobile Communications (GSM) network, a Code Division Multiple Access (CDMA) network, a Long Term Evolution (LTE) network, or any other type of wireless network. The network 310 can use protocols and components for communicating via the Internet or any of the other aforementioned types of networks. For example, the protocols used by the network 310 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Additional details regarding the operations performed to content index restored secondary copies are described below with respect to FIGS. 4 through 17.

Distributed Architecture of Content Indexing Proxies

Figure 4:
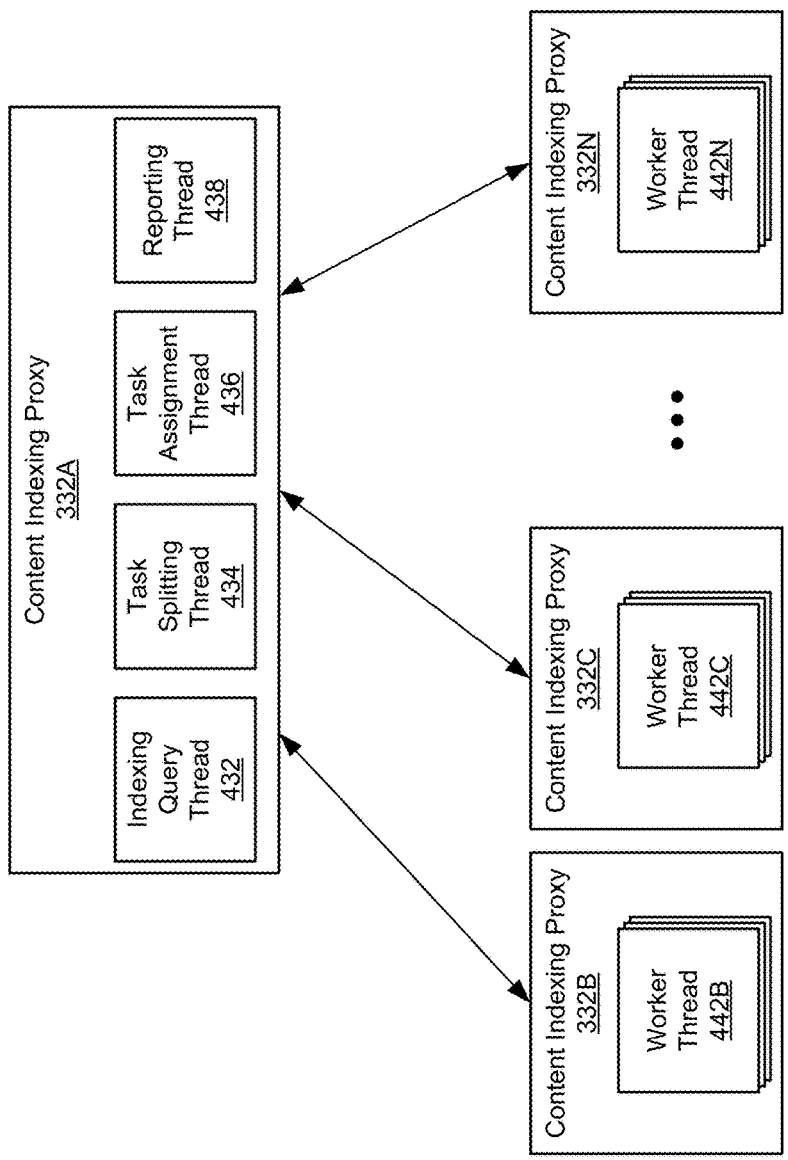
FIG. 4 is a more detailed block diagram of the interactions between a content indexing proxy that acts as a master proxy and content indexing proxies that act as controller proxies, according to an illustrative embodiment of the present invention.

FIG. 4 is a more detailed block diagram of the interactions between a content indexing proxy 332A that acts as a master proxy and content indexing proxies 332B-N that act as controller proxies, according to an illustrative embodiment of the present invention. While FIG. 4 depicts content indexing proxies 332, any content indexing proxy 344 may be substituted for a content indexing proxy 332. For example, a content indexing proxy 344 of a first media agent 144 may act as the master proxy instead of the content indexing proxy 332A. A content indexing proxy 344 of a second media agent 144 may act as a controller proxy instead of the content indexing proxy 332C. As another example, a content indexing proxy 344 of a first media agent 144 may act as a controller proxy instead of the content indexing proxy 332B and a content indexing proxy 344 of a second media agent 144 may act as a controller proxy instead of the content indexing proxy 332C. Thus, any combination of content indexing proxies 332 and/or 344 may implement the techniques described below with respect to FIG. 4.

As illustrated in FIG. 4, the master content indexing proxy 332A may execute four threads: an indexing query thread 432, a task splitting thread 434, a task assignment thread 436, and a reporting thread 438. The indexing query thread 432, when executed, may query the indexing storage system 320 to determine the number of individual primary data that need to be content indexed (and thus the number of secondary copies that need to be content indexed). For example, the indexing query thread 432 may transmit a query to the index manager 322 for the number of individual primary data that need to be content indexed. The index manager 322 may access one or more of the backup and CI databases 324 and determine which primary data have not been content indexed by checking the status flag of individual entries stored in one or more of the backup and CI databases 324. If the status flag is set high, then this may indicate that the individual primary data associated with the entry has not been content indexed, or vice-versa. The index manager 322 may also determine the number of archive files that include secondary copies corresponding to primary data that have not been content indexed. For example, each entry may also be associated with an archive file identifier. Thus, the index manager 322 can determine the number of archive files that include secondary copies corresponding to primary data that have not been content indexed and/or the number of individual primary data that have not been content indexed that are associated with each archive file. The index manager 322 can transmit the number of archive files that include secondary copies corresponding to primary data that have not been content indexed and/or the number of individual primary data that have not been content indexed that are associated with each archive file to the indexing query thread 432 and/or the task splitting thread 434. If the data is transmitted by the index manager 322 to the indexing query thread 432, then the indexing query thread 432 can forward the data to the task splitting thread 434.

The task splitting thread 434, when executed, may determine how to split content indexing tasks among the available controller content indexing proxies 332B-332N. For example, the task splitting thread 434 may identify the total number of controller content indexing proxies 332B-332N available to perform content indexing tasks. Alternatively, the indexing query thread 432 may identify the total number of controller content indexing proxies 332B-332N available to perform content indexing tasks and provide this information to the task splitting thread 434. In an embodiment, the task splitting thread 434 can identify the total number of controller content indexing proxies 332B-332N available to perform content indexing tasks by broadcasting or otherwise transmitting beacon messages or other similar types of messages to various content indexing proxies 332B-332N, requesting a reply indicating the respective content indexing proxy 332B-332N availability. For each available controller content indexing proxy 332B-332N, the task splitting thread 434 (or the indexing query thread 432) can identify the total number of worker threads available to perform content indexing operations. For example, each controller content indexing proxy 332B-332N may execute one or more worker threads 442B-442N, where the worker threads 442B-442N each perform a discrete content indexing operation, as described in greater detail below. The number of worker threads 442B-442N that a controller content indexing proxy 332B-332N can execute may therefore indicate a processing capacity of the respective controller content indexing proxy 332B-332N. The task splitting thread 434 may identify the total number of worker threads 442B-442N using the beacon or other similar type of message described above.

Once the task splitting thread 434 has identified the total number of controller content indexing proxies 332B-332N available to perform content indexing tasks and the total number of worker threads 442B-442N available on each available controller content indexing proxies 332B-332N, the task splitting thread 434 can use the number of archive files that include secondary copies corresponding to primary data that have not been content indexed and/or the number of individual primary data that have not been content indexed that are associated with each archive file to determine how the content indexing of the individual primary data should be split among the available controller content indexing proxies 332B-332N. The task splitting thread 434 may follow one or more rules in determining how to split the content indexing of the individual primary data among the available controller content indexing proxies 332B-332N (and thus the assignment of primary data to controller content indexing proxies 332B-332N). For example, one rule may be that the primary data associated with a single archive file should be grouped and assigned to the same controller content indexing proxy 332B-332N for content indexing. However, another rule may dictate that the load on the available controller content indexing proxies 332B-332N should be within a threshold value or percentage of each other. Thus, if one archive file is associated with 1000 individual primary data whereas a second archive file is associated with 500 individual primary data, then the task splitting thread 434 may determine that the primary data associated with the second archive file should be assigned to the same controller content indexing proxy 332B-332N and the primary data associated with the first archive file should be split between two different controller content indexing proxies 332B-332N. Similarly, if one archive file is associated with primary data that total 1 TB in size whereas a second archive file is associated with primary data that total 500 GB in size, then the task splitting thread 434 may determine that the primary data associated with the second archive file should be assigned to the same controller content indexing proxy 332B-332N and the primary data associated with the first archive file should be split between two different controller content indexing proxies 332B-332N. Another rule may dictate that the primary data associated with a single archive file should not be split among more than 2 (or 3, 4, 5, etc.) controller content indexing proxies 332B-332N. This rule may prevent delays in content indexing due to many different controller content indexing proxies 332B-332N attempting to access the same restored archive file (e.g., the same set of restored secondary copies).

Not only may the task splitting thread 436 determine which controller content indexing proxies 332B-332N should be assigned certain primary data, but the task splitting thread 436 may also determine which worker threads 442B-442N executed by each of the controller content indexing proxies 332B-332N should be assigned certain primary data. The task splitting thread 436 may follow one or more rules similar to the rules described above in determining how to split the content indexing of the individual primary data among the worker threads 442B-442N executing on the available controller content indexing proxies 332B-332N (and thus the assignment of primary data to the worker threads 442B-442N executing on the controller content indexing proxies 332B-332N). For example, one rule may dictate that the load on the worker threads 442B-442N executing on a single controller content indexing proxy 332B-332N should be within a threshold value or percentage of each other. Thus, the task splitting thread 436 may distribute the assignment of primary data evenly or nearly evenly across the worker threads 442B-442N executing on a single controller content indexing proxy 332B-332N (e.g., the task splitting thread 436 may assign the same number of primary data to each worker thread 442B-442N executing on a single controller content indexing proxy 332B-332N, the task splitting thread 436 may determine the size of the individual primary data assigned to a single controller content indexing proxy 332B-332N and assign subsets of this primary data to each worker thread 442B-442N executing on the single controller content indexing proxy 332B-332N such that each worker thread 442B-442N is assigned the same or nearly the same size of data to content index, etc.). Once the task splitting thread 434 has determined how to split the archive files and/or primary data among the controller content indexing proxies 332B-332N and/or among the individual worker threads 442B-442N (e.g., the assignment of primary data to controller content indexing proxies 332B-332N and/or to individual worker threads 442B-442N), the task splitting thread 434 may transmit the assignment information to the task assignment thread 436.

The task assignment thread 436, when executed, may use the assignment information to instruct controller content indexing proxies 332B-332N accordingly. For example, for each available controller content indexing proxy 332B-332N that has been assigned primary data to content index (e.g., where restored versions of secondary copies corresponding to the assigned primary data are actually the items that are content indexed), the task assignment thread 436 may transmit an instruction to the respective available controller content indexing proxy 332B-332N that includes an identification of the primary data (and thus secondary copies) that have been assigned to the respective available controller content indexing proxy 332B-332N and/or an identification of the primary data (and thus secondary copies) that have been assigned to each worker thread 442B-442N executing on the respective available controller content indexing proxy 332B-332N. The instruction may cause the respective available controller content indexing proxy 332B-332N to begin the content indexing process.

As the controller content indexing proxies 332B-332N are performing the content indexing operations, the reporting thread 438, when executed, may periodically communicate with the controller content indexing proxies 332B-332N to determine the content indexing progress (e.g., the percentage of all assigned primary data that has been content indexed and/or the percentage of all assigned primary data that have yet to be content indexed, the number of assigned primary data that have been content indexed and/or the number of assigned primary data that have yet to be content indexed, the content index completion percentage of an individual primary data, the time remaining until all assigned primary data will be content indexed, the time remaining until an individual primary data will be content indexed, etc.). The reporting thread 438 may also periodically communicate with the controller content indexing proxies 332B-332N to determine the performance of the controller content indexing proxies 332B-332N (e.g., the available processing capacity of the controller content indexing proxies 332B-332N, whether processing errors or other suboptimal conditions are present, etc.). If the reporting thread 438 determines that a controller content indexing proxy 332B-332N is operating at a performance level below a threshold value, then the reporting thread 438 can notify the task splitting thread 434 and/or the task assignment thread 436 to assign some or all of the content indexing tasks to a different controller content indexing proxy 332B-332N. Either the reporting thread 438 or the controller content indexing proxies 332B-332N can initiate the communication for providing the content indexing progress and controller content indexing proxy 332B-332N performance. The reporting thread 438 may periodically and/or at the request of a user transmit reports, alerts, notifications, and/or the like to a client computing device 102 indicating the content indexing progress and/or the controller content indexing proxy 332B-332N performance.

The master content indexing proxy 332A can execute the indexing query thread 432, the task splitting thread 434, the task assignment thread 436, and/or the reporting thread 438 in parallel. For example, to initialize a first set of content indexing operations, the threads 432, 434, 436, and 438 may operate serially in a manner as described above. However, once the indexing query thread 432 determines the number of individual primary data that need to be content indexed for the first set of content indexing operations, the indexing query thread 432 may begin determining the number of individual primary data that need to be content indexed for a second set of content indexing operations. The indexing query thread 432 may determine the number of individual primary data that need to be content indexed for a second set of content indexing operations while the task splitting thread 434 determines how to split content indexing tasks among the available controller content indexing proxies 332B-332N for the first set of content indexing operations. The same may apply for the other threads 436 and 438. Thus, the threads 432, 434, 436, and 438 may perform actions corresponding to the same set of content indexing operations serially, but the threads 432, 434, 436, and 438 may also execute simultaneously or in parallel because the threads 432, 434, 436, and 438 may be performing actions corresponding to different sets of content indexing operations.

Any content indexing proxy 332A-332N can act as a master proxy. The content indexing system 330 (and/or the media agents 144) can select one content indexing proxy 332 (and/or content indexing proxy 344) to act as a master proxy prior to the content indexing operations being performed. Each time a new set of content indexing operations are to be performed (e.g., after a new secondary copy operation is complete), the content indexing system 330 (and/or the media agents 144) can rotate which content indexing proxy 332 (and/or content indexing proxy 344) is selected to act as a master proxy. If a master content indexing proxy 332 happens to malfunction, go offline, or otherwise fail while content indexing operations are occurring, the content indexing system 330 (and/or a media agent 144) can pause content indexing operations, select one of the controller content indexing proxies 332 to act as the master proxy, reassign the content indexing tasks originally assigned to the new master proxy to another controller proxy, and resume content indexing operations with the new master proxy.

Figure 5:
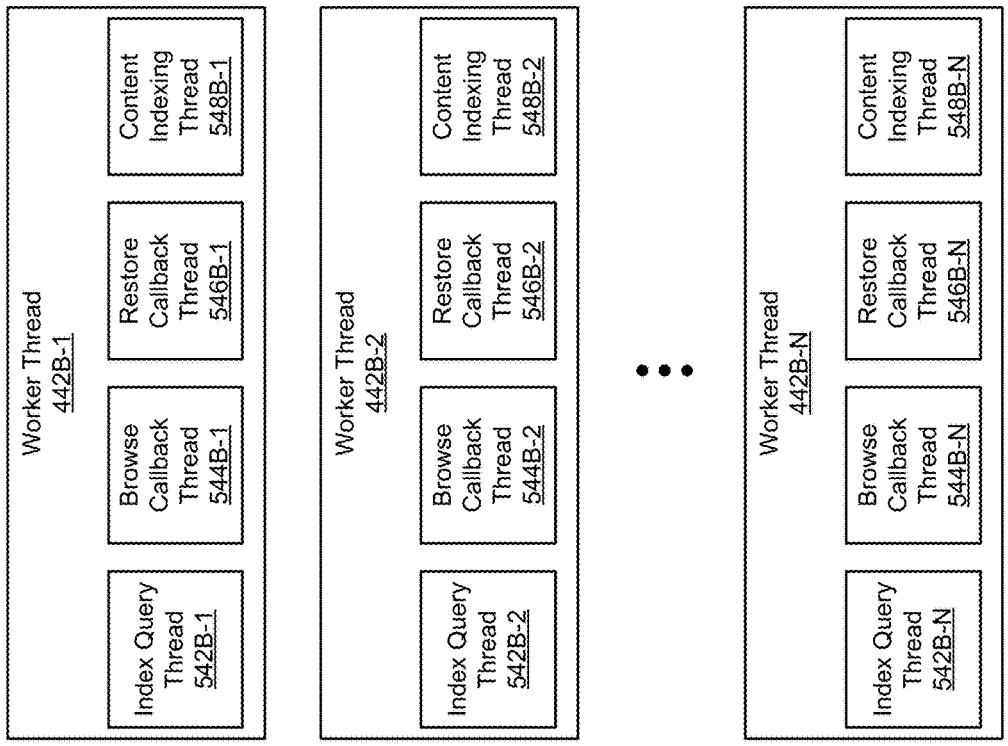
FIG. 5 is a more detailed block diagram of a controller content indexing proxy 332B, according to an illustrative embodiment of the present invention.

FIG. 5 is a more detailed block diagram of a controller content indexing proxy 332B, according to an illustrative embodiment of the present invention. While FIG. 5 depicts the controller content indexing proxy 332B and the operations performed by the controller content indexing proxy 332B are described below, this is merely for illustrative purposes. Any content indexing proxy 332 or content indexing proxy 344 may act as a controller proxy, include a distributed architecture similar to the architecture depicted in FIG. 5 with respect to the controller content indexing proxy 332B, and perform the operations described below with respect to the controller content indexing proxy 332B.

As illustrated in FIG. 5, the controller content indexing proxy 332B executes a plurality of worker threads 442B-1 through 442B-N. As described above, each worker thread 442B-1 through 442B-N may be assigned primary data (and thus restored versions of secondary copies) to content index. To perform the content indexing, each worker thread 442B-1 through 442B-N may execute four threads: an index query thread 542B, a browse callback thread 544B, a restore callback thread 546B, and a content indexing thread 548B.

The index query thread 542B, when executed, may query the indexing storage system 320 for information corresponding to the secondary copies that are associated with the primary data assigned to the worker thread 442B that is executing the index query thread 542B. For example, the queried information may include the logical paths to the secondary copies stored in the secondary storage device 108 and/or the location information (e.g., offsets) indicating where the secondary copies are stored in the secondary storage device 108 (e.g., together referred to herein as the secondary copy location data). The index query thread 542B may retrieve the secondary copy location data by communicating with the index manager 322, which can retrieve the secondary copy location data from the one or more backup and CI databases 324.

The index query thread 542B may forward the secondary copy location data to the browse callback thread 544B. Alternatively, the index manager 322 may forward the secondary copy location data directly to the browse callback thread 544B. The browse callback thread 544B, when executed, may request the restoration of the secondary copies identified by the secondary copy location data. For example, the browse callback thread 544B may transmit the secondary copy location data to a media agent 144. The media agent 144 to which the browse callback thread 544B transmits the secondary copy location data may be the media agent 144 that has authority over the referenced secondary copies (e.g., where the authoritative media agent 144 may be indicated in the backup metadata stored in the one or more backup and CI databases 324 and provided to the index query thread 542B and/or browse callback thread 544B). The media agent 144 may use the secondary copy location data to restore the referenced secondary copies from the secondary storage device 108. Once the restore is complete or a portion of the restore is complete, the media agent 144 may notify the restore callback thread 546B.

The restore callback thread 546B, when executed, may instruct the content indexing thread 548B to begin the content indexing process in response to receiving the notification from the media agent 144 that the restore or a portion of the restore is complete. The content indexing thread 548B may request the content indexing service 334 to content index the restored secondary copies. The content indexing thread 548B may retrieve the restored secondary copies from the media agent 144 and provide the restored secondary copies to the content indexing service 334. Alternatively, the content indexing service 334 may directly retrieve the restored secondary copies from the media agent 144. If a content indexing thread is running on worker thread executed by a content indexing proxy 344, then the content indexing thread may request the content indexing service 346 to content index the restored secondary copies.

Each of the worker threads 442B-1 through 442B-N may operate in parallel. In addition, each worker thread 442B-1 through 442B-N can execute the index query thread 542B, the browse callback thread 544B, the restore callback thread 546B, and/or the content indexing thread 548B in parallel. For example, to initialize a first set of content indexing operations, the threads 542B, 544B, 546B, and 548B may operate serially in a manner as described above. However, once the index query thread 542B queries the indexing storage system 320 for information corresponding to the secondary copies that are associated with the assigned primary data for the first set of content indexing operations, the index query thread 542B may begin querying the indexing storage system 320 for information corresponding to the secondary copies that are associated with the assigned primary data for a second set of content indexing operations. The index query thread 542B may query the indexing storage system 320 for information corresponding to the secondary copies that are associated with the assigned primary data for a second set of content indexing operations while the browse callback thread 544B requests the restoration of the secondary copies identified by the secondary copy location data for the first set of content indexing operations. The same may apply for the other threads 546B and 548B. Thus, the threads 542B, 544B, 546B, and 548B may perform actions corresponding to the same set of content indexing operations serially, but the threads 542B, 544B, 546B, and 548B may also execute simultaneously or in parallel because the threads 542B, 544B, 546B, and 548B may be performing actions corresponding to different sets of content indexing operations.

Example Secondary Copy Operations

Figure 6A:
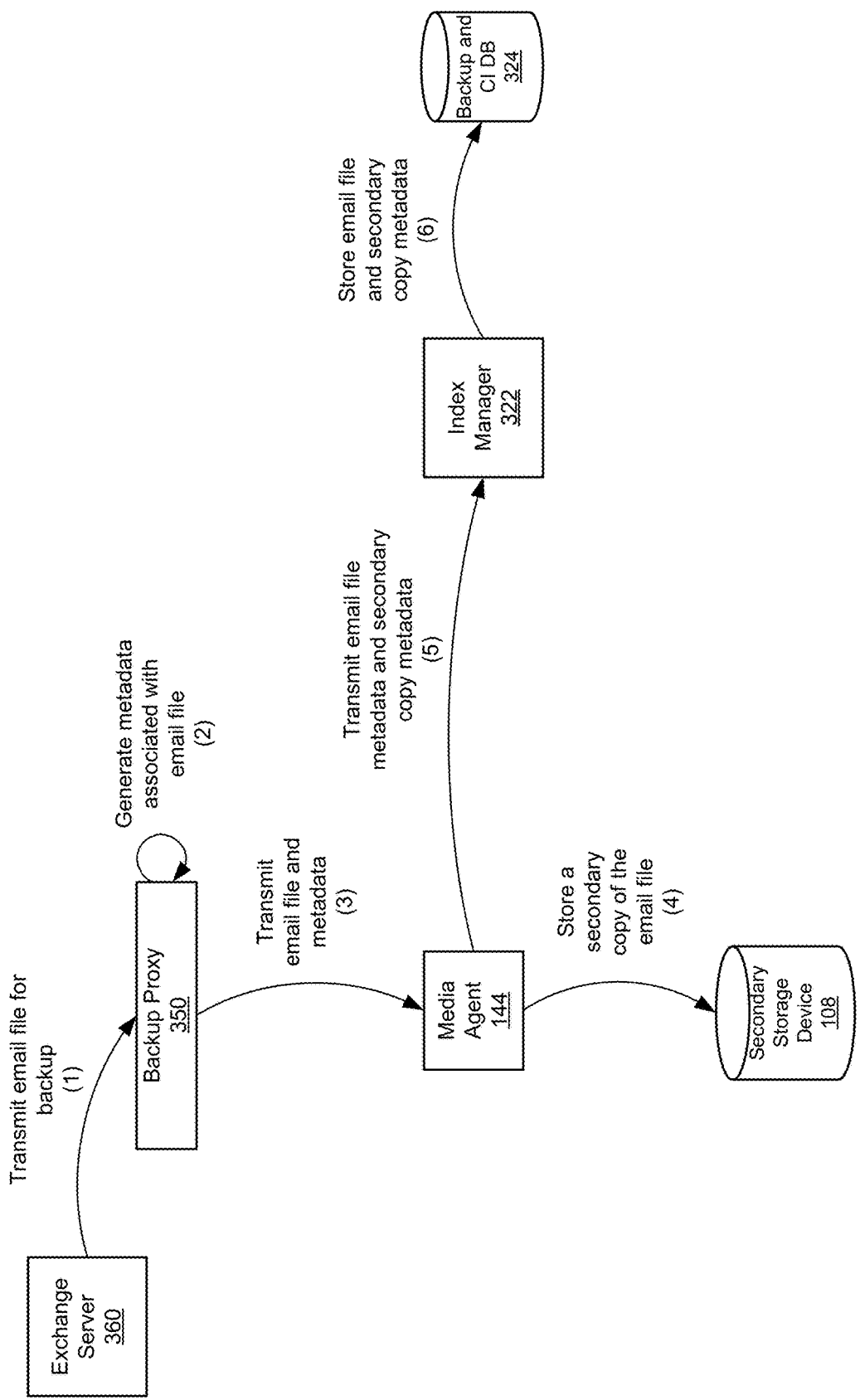
FIG. 6A illustrates a block diagram showing the operations performed to perform secondary copy operations on email files.

FIG. 6A illustrates a block diagram showing the operations performed to perform secondary copy operations on email files. As illustrated in FIG. 6A, the exchange server 360 may transmit an email file to the backup proxy 350 for backup at (1). The backup proxy 350 may process the email file and generate metadata associated with the email file (e.g., received time, sent time, "to" addresses, "from" address, "cc" addresses, "bcc" addresses, subject line, number of attachments, types of attachments, etc.) at (2). The backup proxy 350 may then forward the email file and metadata to the media agent 144 at (3). In some embodiments, the backup proxy 350 may separate any attachment file(s) from the email file and transmit the attachment file(s) and email file to the media agent 144 as separate files.

The media agent 144 may perform secondary copy operations in a manner as discussed above. For example, the media agent 144 may convert the email file into a secondary copy of the email file and store the secondary copy of the email file in the secondary storage device 108 at (4). If the email file included any attachment files, then the media agent 144 may also store the attachment files separately in the secondary storage device 108. In the process of converting the email file and storing the secondary copy of the email file, the media agent may generate an index 153 of the email file (e.g., referred to herein as secondary copy metadata) and/or an index 153 for each attachment file(s) (e.g., referred to herein as attachment secondary copy metadata). The media agent 144 may then transmit the email file metadata, the secondary copy metadata, and/or the attachment secondary copy metadata to the index manager 322 at (5).

The index manager 322 may store the email file metadata, the secondary copy metadata, and/or the attachment secondary copy metadata in the backup and CI database 324 at (6). Thus, the backup and CI database 324 may store backup metadata for the email file and/or the attachment file(s). The backup metadata can later be used for restoring the email file and/or the attachment file(s) and/or to content index the email file and/or the attachment file(s).

The operations described with respect to FIG. 6A may be repeated for any number of email files and/or attachment file(s). In addition, groups of email files and/or attachment file(s) can be processed together by the backup proxy 350 and/or the media agent 144.

Figure 6B:
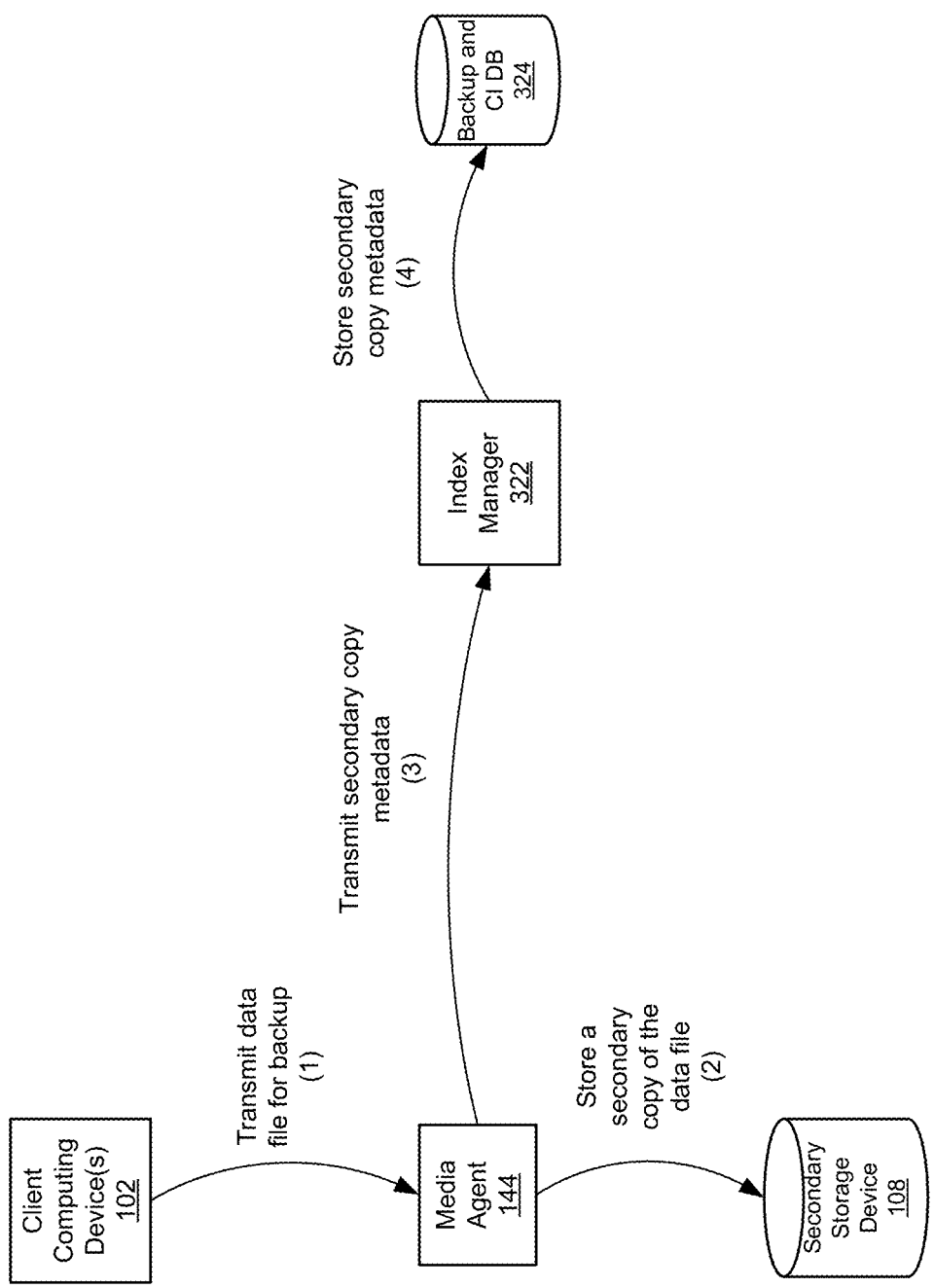
FIG. 6B illustrates a block diagram showing the operations performed to perform secondary copy operations on primary data originally stored or created by a client computing device.

FIG. 6B illustrates a block diagram showing the operations performed to perform secondary copy operations on primary data originally stored or created by a client computing device 102. As illustrated in FIG. 6B, the client computing device 102 may transmit primary data (e.g., a data file) to the media agent 144 for backup at (1). The media agent 144 may perform secondary copy operations in a manner as discussed above. For example, the media agent 144 may convert the data file into a secondary copy of the data file and store the secondary copy of the data file in the secondary storage device 108 at (2).

In the process of converting the data file and storing the secondary copy of the data file, the media agent may generate an index 153 of the data file in a manner as described above (e.g., referred to herein as secondary copy metadata). The media agent 144 may then transmit the secondary copy metadata to the index manager 322 at (3).

The index manager 322 may store the secondary copy metadata in the backup and CI database 324 at (4). Thus, the backup and CI database 324 may store backup metadata for the data file. The backup metadata can later be used for restoring the data file and/or to content index the data file.

The operations described with respect to FIG. 6B may be repeated for any number of data files. In addition, groups of data files can be processed together by the media agent 144.

Example Operations Performed by a Master Proxy

Figure 7:
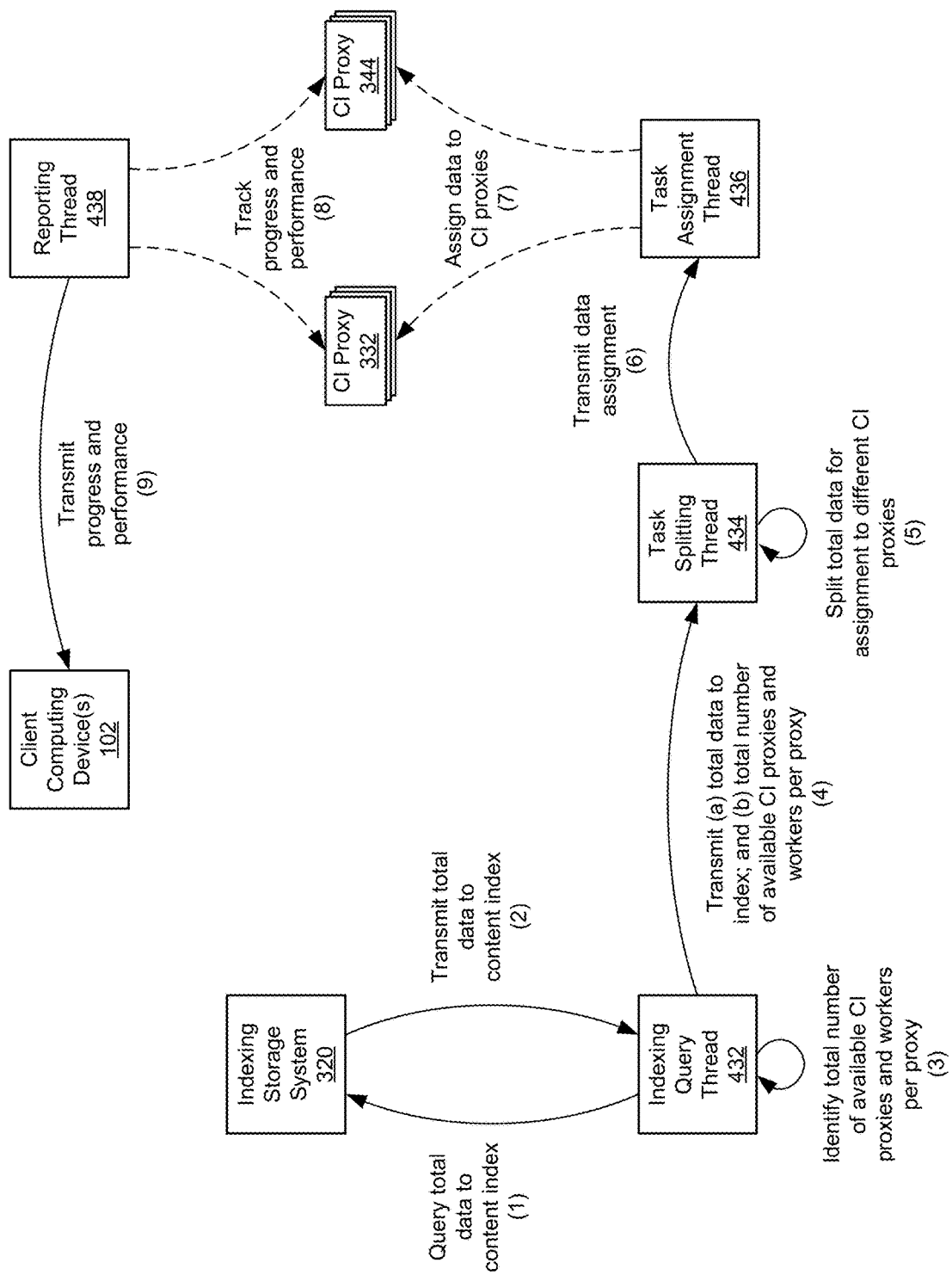
FIG. 7 illustrates a block diagram showing the operations performed by a master proxy to instruct controller proxies to begin content indexing restored versions of secondary copies.

FIG. 7 illustrates a block diagram showing the operations performed by a master proxy to instruct controller proxies to begin content indexing restored versions of secondary copies. As illustrated in FIG. 7, the indexing query thread 432 executed by a master content indexing proxy 332 or 344 queries the indexing storage system 320 for the total data to content index at (1). For example, the indexing query thread 432 may query the index manager 322 for the number of archive files that include secondary copies that correspond with primary data to be content indexed and/or the number of secondary copies that are associated with each archive file that correspond with primary data to be content indexed. The indexing query thread 432 may transmit the query in response to an indication that content indexing is to be performed. The indication may be received periodically from a client computing device 102, from the storage manager 140, from a media agent 144, and/or the like. The indication may also be received at the request of an administrator.

A content indexing policy may indicate what types of primary data should be content indexed. For example, the content indexing policy may include criteria indicating that only primary data stored in certain directories, subdirectories, folders, mailboxes, etc. are to be content indexed. The indexing storage system 320 may identify the primary data to be content indexed, taking into account the content indexing policy criteria, and transmit an indication of the total data to the indexing query thread 432 at (2). The indication of the total data may include an indication of the total number of archive files that include secondary copies that correspond with primary data that need to be content indexed (and that comply with the content indexing policy criteria) and/or the number of secondary copies that are associated with each archive file that correspond with primary data that need to be content indexed (and that comply with the content indexing policy criteria).

The indexing query thread 432 may also identify the total number of controller content indexing proxies 332 and/or 344 available to perform content indexing tasks and/or the total number of worker threads executing on each controller content indexing proxy 332 and/or 344 available to perform content indexing operations at (3). Alternatively, the task splitting thread 434 can identify the total number of controller content indexing proxies 332 and/or 344 available to perform content indexing tasks and/or the total number of worker threads executing on each controller content indexing proxy 332 and/or 344 available to perform content indexing operations. The indexing query thread 432 can then transmit an indication of the total data to content index, the total number of controller content indexing proxies 332 and/or 344 available to perform content indexing tasks, and the total number of worker threads executing on each controller content indexing proxy 332 and/or 344 available to perform content indexing operations to the task splitting thread 434 at (4).

The task splitting thread 434 can split the total data for assignment to different controller content indexing proxies 332 and/or 344 at (5). For example, the task splitting thread 434 can assign archive files, portions of archive files, and/or individual primary data to different controller content indexing proxies 332 and/or 344 and/or different worker threads executing on these different controller content indexing proxies 332 and/or 344. The task splitting thread 434 can then transmit information regarding the data assignment to the task assignment thread 436 at (6).

The task assignment thread 436 can assign data to different controller content indexing proxies 332 and/or 344 at (7) using the received data assignment information. For example, the task assignment thread 436 can transmit instructions indicating which archive files and/or individual primary data are assigned to a particular controller content indexing proxy 332 and/or 344 and/or worker thread. The controller content indexing proxies 332 and/or 344 may then begin content indexing operations.

Periodically or at the request of a user, the reporting thread 438 can communicate with the controller content indexing proxies 332 and/or 344 to track the progress and performance of the content indexing at (8). Based on the results of the tracked progress and performance or based on a user request, the reporting thread 438 can transmit a notification, alert, or other such message to the client computing device 102 indicating the tracked progress and performance at (9).

Example Operations Performed by a Controller Proxy

Figure 8:
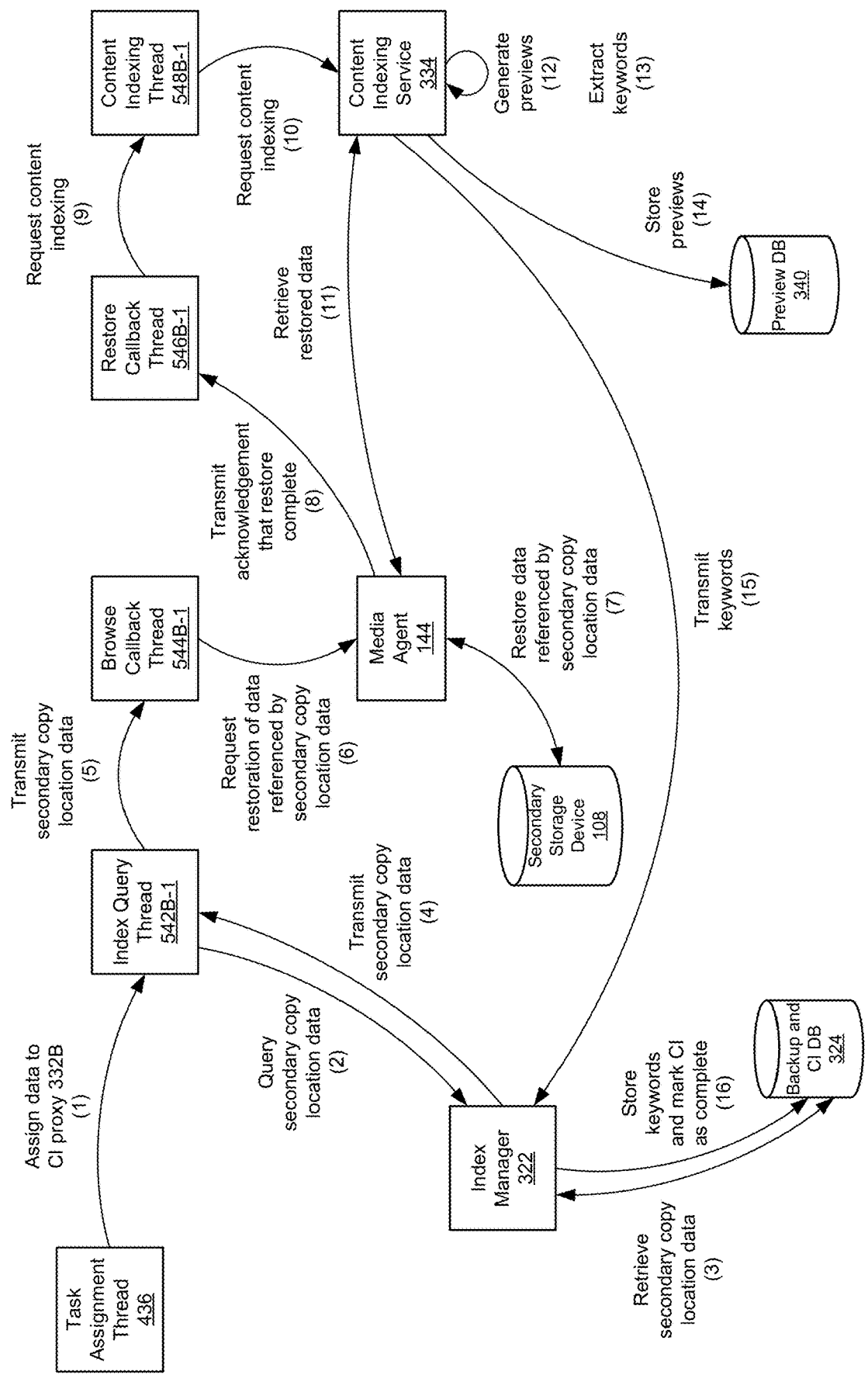
FIG. 8 illustrates a block diagram showing the operations performed by a controller proxy to content index restored versions of secondary copies.

FIG. 8 illustrates a block diagram showing the operations performed by a controller proxy to content index restored versions of secondary copies. As illustrated in FIG. 8, the task assignment thread 436 assigns data to a controller content indexing proxy 332B at (1). For example, the task assignment thread 436 may assign primary data to the controller content indexing proxy 332B and a subset of that primary data to a worker thread 442B-1 executing on the controller content indexing proxy 332B.

The index query thread 542B-1 of the worker thread 442B-1 may receive the data assignment and query the index manager 322 for the secondary copy location data corresponding to the assigned primary data at (2). The index manager 322 may retrieve the secondary copy location data from the backup and CI database 324 at (3) (given that the secondary copy location data was previously stored in the backup and CI database 324, as illustrated in FIGS. 6A and 6B) and transmit the secondary copy location data to the index query thread 542B-1 at (4). The index query thread 542B-1 can then forward the secondary copy location data to the browse callback thread 544B-1 of the worker thread 442B-1 at (5). Alternatively, the index manager 322 may transmit the secondary copy location data directly to the browse callback thread 544B-1.

The browse callback thread 544B-1 can request the media agent 144 to restore the data (e.g., secondary copies) referenced by the secondary copy location data at (6). Thus, the media agent 144 may use the secondary copy location data to identify the locations of secondary copies to restore. The media agent 144 can then restore the data (e.g., secondary copies) referenced by the secondary copy location data at (7) and transmit an acknowledgement to the restore callback thread 546B-1 of the worker thread 442B-1 that the restore is complete at (8).

Upon receiving the acknowledgment, the restore callback thread 546B-1 can request content indexing from the content indexing thread 548B-1 of the worker thread 442B-1 at (9). In response, the content indexing thread 548B-1 can instruct the content indexing service 334 to perform the content indexing at (10).

The content indexing service 334 can retrieve the restored data (e.g., the restored secondary copies) at (11). Alternatively, the content indexing thread 548B-1 can retrieve the restored data and provide the restored data to the content indexing service 334. The content indexing service 334 can then process the restored data to generate previews at (12) and extract keywords at (13).

The content indexing service 334 may store the generated previews in a database separate from the backup metadata. For example, the content indexing service 334 can store the generated previews in the preview database 340 at (14). The content indexing service 334 may then transmit the extracted keywords and/or paths to the storage location of the previews to the index manager 322 at (15). The index manager 322 can then store the keywords and/or the paths to the storage location of the previews in the backup and CI database 324 at (16). In addition, the index manager 322 may mark the entries associated with the primary data for which content indexing has been performed indicating that content indexing is complete (e.g., change the status flag to indicate that content indexing is complete).

Example Operations Performed to Perform a Content Search

Figure 9:
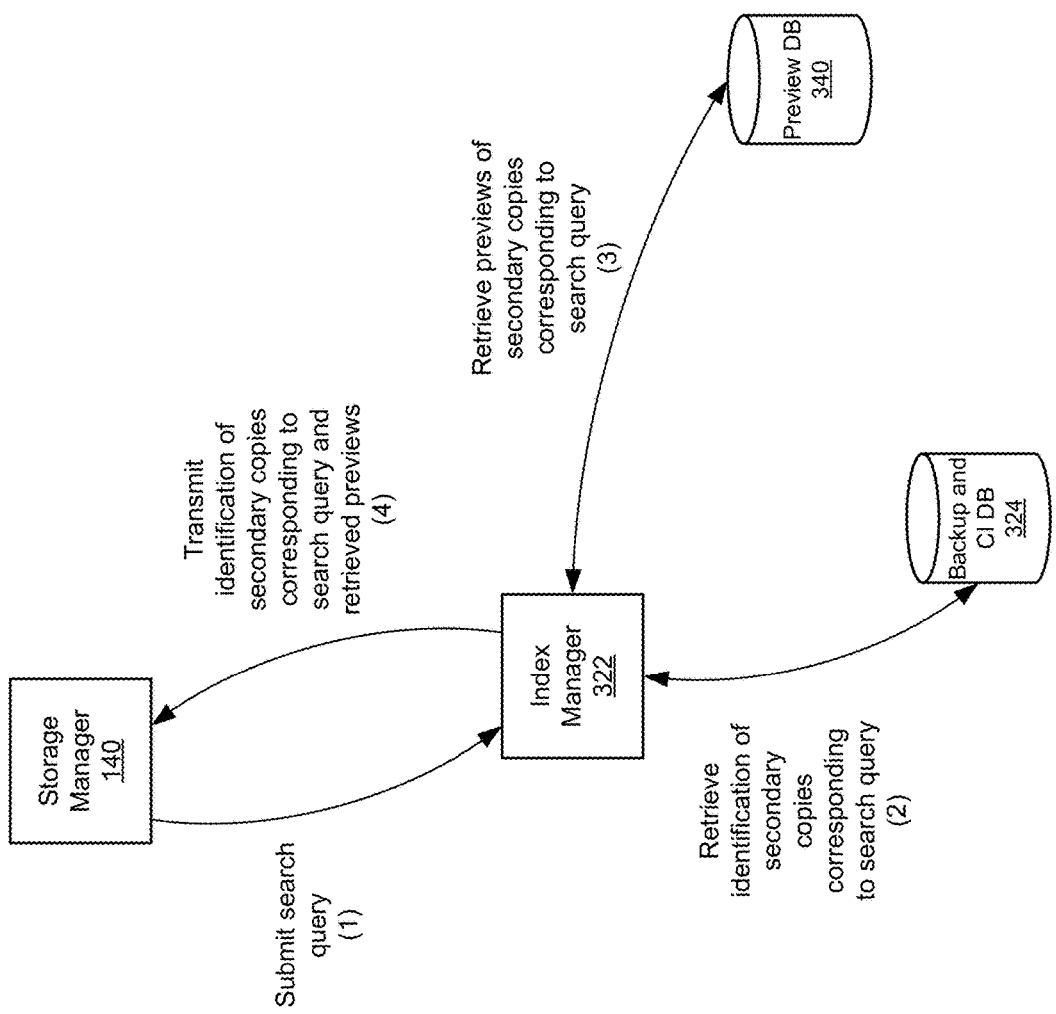
FIG. 9 illustrates a block diagram showing the operations performed to identify secondary copies that match search criteria.

FIG. 9 illustrates a block diagram showing the operations performed to identify secondary copies that match search criteria. As illustrated in FIG. 9, the storage manager 140 submits a search query at (1) to the index manager 322. The query may be for secondary copies that include content matching search criteria included in the search query. A user may provide the search criteria via the user interface 158 provided by the storage manager 140.

The index manager 322 may retrieve an identification of secondary copies that correspond to the search query at (2) from the backup and CI database 324. For example, the index manager 322 may query the backup and CI database 324 for keywords that satisfy or comply with the search criteria. The index manager 322 can then identify secondary copies that correspond with the keywords that satisfy or comply with the search criteria. The index manager 322 can then retrieve previews of secondary copies that correspond to the search query at (3) from the preview database 340. For example, the previews in the preview database 340 may be stored in association with the secondary copies from which the previews were generated. Thus, the index manager 322 can use the identified secondary copies to retrieve the appropriate previews.

Once the secondary copies corresponding to the search query are identified and the previews have been retrieved, the index manager can transmit the identification of the secondary copies and the retrieved previews to the storage manager 140 at (4). The storage manager 140 may then display a list of the identified secondary copies along with the corresponding previews in the user interface 158. A user can select any of the identified secondary copies. Upon selection of an identified secondary copy, the storage manager 140 can instruct a media agent 144 to restore the selected secondary copy and provide the restored secondary copy to the storage manager 140 and/or a client computing device 102 operated by the user.

Example Method for Content Indexing Using Restored Secondary Copies

Figure 10:
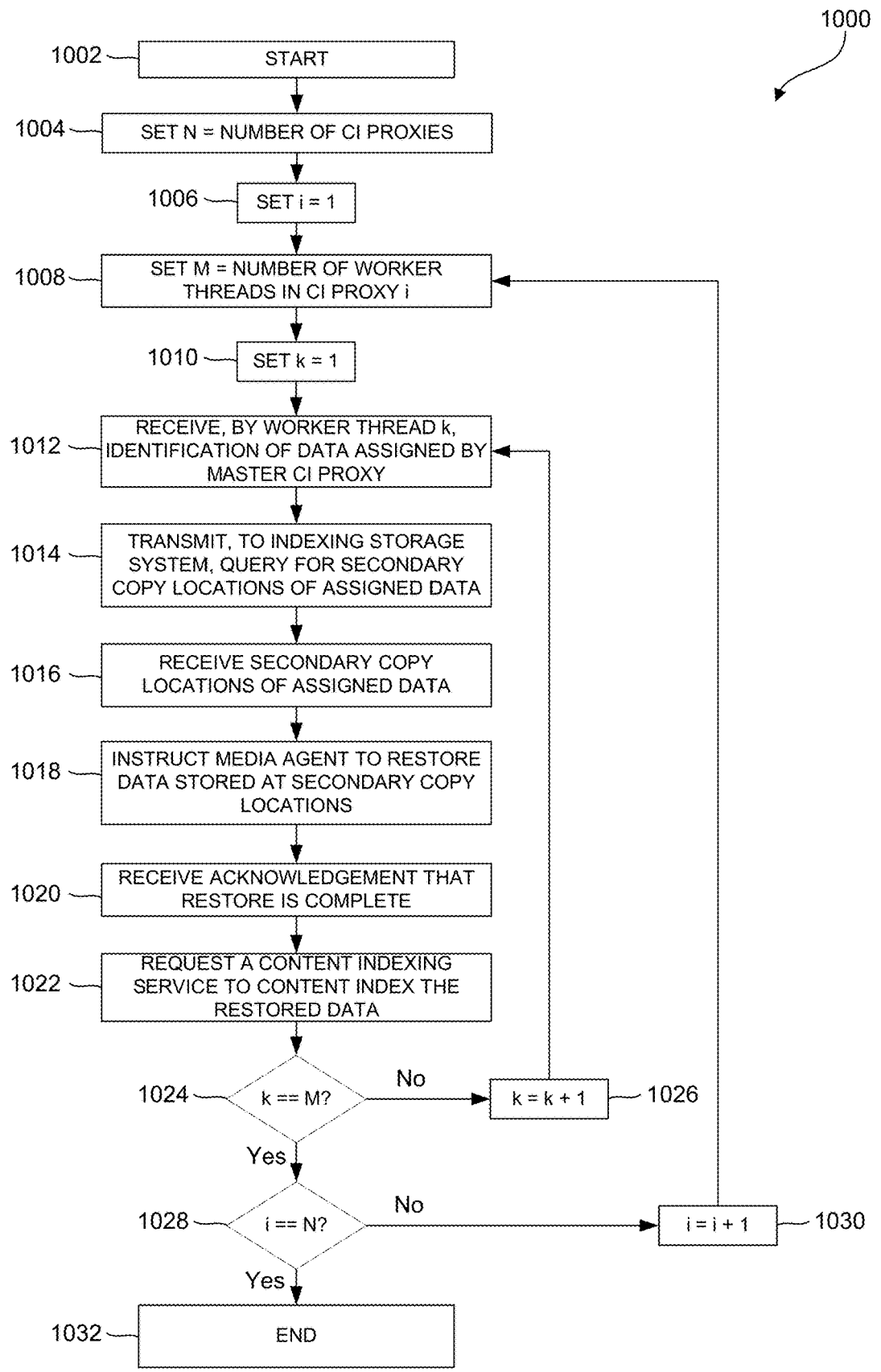
FIG. 10 depicts some salient operations of a method for content indexing using restored secondary copies according to an illustrative embodiment of the present invention.

FIG. 10 depicts some salient operations of a method 1000 for content indexing using restored secondary copies according to an illustrative embodiment of the present invention. One or more controller content indexing proxies 332 and/or 344 can implement the method 1000. The method 1000 starts at block 1002.

At block 1004, the variable N is set to the number of available controller content indexing proxies.

At block 1006, the variable i is set to 1. As used herein, variable i will refer to a particular controller content indexing proxy.

At block 1008, the variable M is set to the number of worker threads available in controller content indexing proxy i.

At block 1010, the variable k is set to 1. As used herein, variable k will refer to a particular worker thread of a particular controller content indexing proxy.

At block 1012, an identification of data assigned by the master content indexing proxy is received by worker thread k of controller content indexing proxy i. The assigned data may be primary data that corresponds with secondary copies that partially or completely form an archive file.

At block 1014, a query for secondary copy locations of assigned data are transmitted to the indexing storage system 320. For example, the queried secondary copy location data may include the logical paths to the secondary copies stored in the secondary storage device 108 and/or the location information (e.g., offsets) indicating where the secondary copies are stored in the secondary storage device 108.

At block 1016, secondary copy locations of assigned data are received. The secondary copy locations may be received after the index manager 322 queries the backup and CI database 324 for the information.

At block 1018, a media agent is instructed to restore data stored at the received secondary copy locations. The media agent therefore may restore secondary copies corresponding to primary data that has yet to be content indexed.

At block 1020, an acknowledgement is received that the restore is complete. For example, the acknowledgment may be received from the media agent 144.

At block 1022, a content indexing service is requested to content index the restored data. For example, the content indexing service may retrieve the restored secondary copies. The restored secondary copies may be in the XML format and the content indexing service can process the restored secondary copies to extract keywords and generate previews.

At block 1024, a determination is made as to whether variable k equals variable M. If the two variables are equal, then all worker threads of controller content indexing proxy i may have executed blocks 1012 through 1022 and the method 1000 can proceed to block 1028. Otherwise, if the two variables are not equal, then not all of the worker threads of controller content indexing proxy i have executed blocks 1012 through 1022 and the method 1000 can proceed to block 1026.

At block 1026, the variable k is incremented by 1. Once variable k is incremented by 1, the method 1000 proceeds back to block 1012.

At block 1028, a determination is made as to whether variable i equals variable N. If the two variables are equal, then all worker threads of all available controller content indexing proxies may have executed blocks 1012 through 1022 and the method 1000 can proceed to block 1032 and end. Otherwise, if the two variables are not equal, then not all of the worker threads of all available controller content indexing proxies have executed blocks 1012 through 1022 and the method 1000 can proceed to block 1030.

At block 1030, the variable i is incremented by 1. Once variable i is incremented by 1, the method 1000 proceeds back to block 1008.

While FIG. 10 is illustrated in a manner such that the operations of successive worker threads occur serially, this is not meant to be limiting. Rather, FIG. 10 is illustrated to show the distributed architecture of the improved content indexing system. For example, FIG. 10 is illustrated to show that the same tasks can be assigned to a plurality of worker threads of a plurality of controller content indexing proxies. The operations of each worker thread may occur in parallel or nearly in parallel. Thus, blocks 1012, 1014, 1016, 1018, 1020, and/or 1022 may be executed in parallel in relation to different sets of restored secondary copies.

Example Method for Task Splitting and Task Assignments

Figure 11:
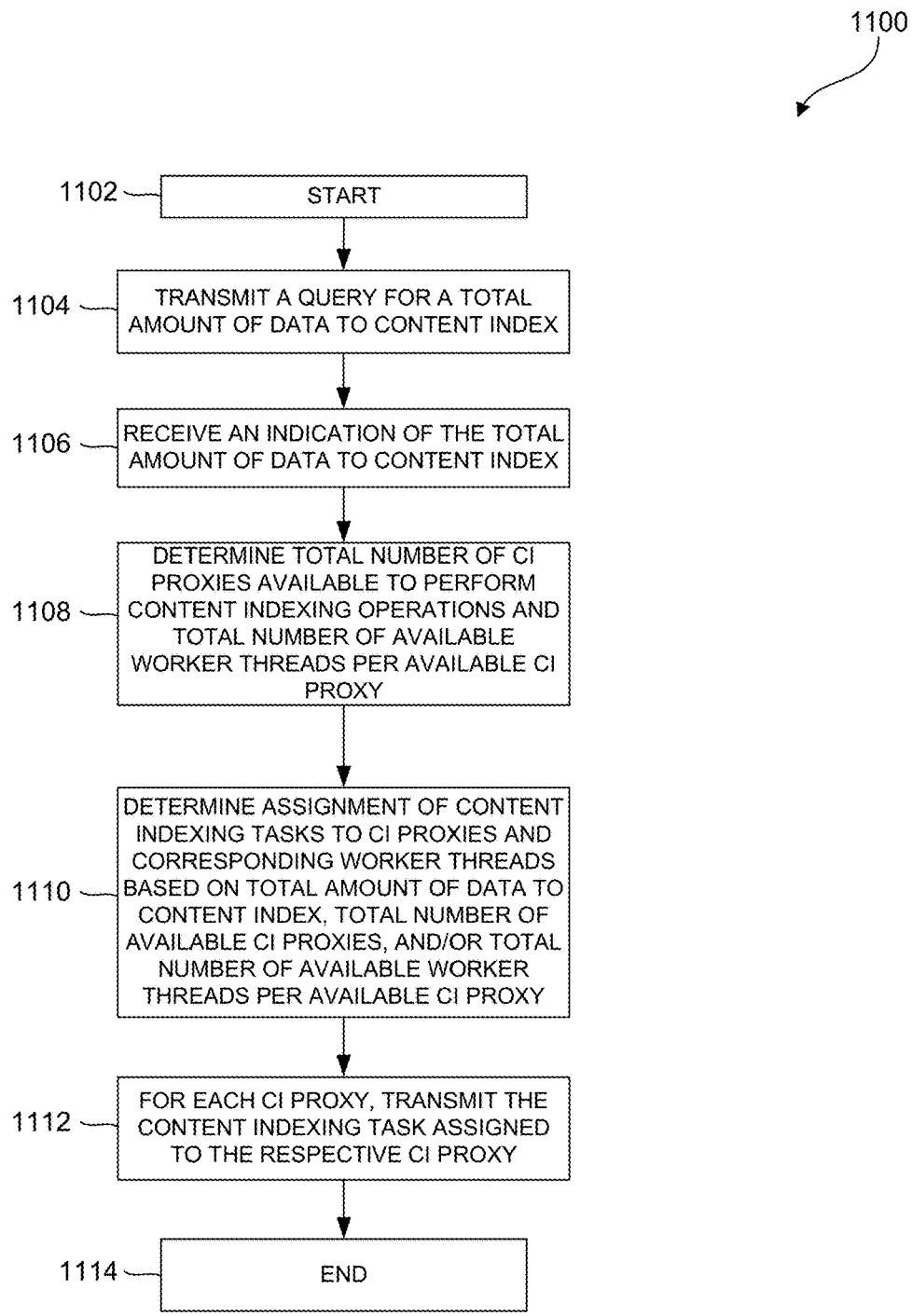
FIG. 11 depicts some salient operations of a method for content index task splitting and task assignments according to an illustrative embodiment of the present invention.

FIG. 11 depicts some salient operations of a method 1100 for content index task splitting and task assignments according to an illustrative embodiment of the present invention. A master content indexing proxy 332 or 344 can implement the method 1100. The method 1100 starts at block 1102.

At block 1104, a query for a total amount of data to content index is transmitted. The query may be transmitted to the indexing storage system 320. The backup and CI databases 324 of the indexing storage system 320 may include status flags that indicate which primary data have been content indexed and which have not.

At block 1106, an indication of the total amount of data to content index is received. The indication may be received from the indexing storage system 320 (e.g., the index manager 322). The indexing storage system 320 (e.g., the index manager 322) may take into account any content indexing policy criteria in determining which data to include in the identified total amount.

At block 1108, a total number of controller content indexing proxies available to perform content indexing operations and a total number of available worker threads per available controller content indexing proxy is determined.

At block 1110, an assignment of content indexing tasks to controller content indexing proxies and corresponding worker threads is determined based on a total amount of data to content index, the total number of available controller content indexing proxies, and/or the total number of available worker threads per available controller content indexing proxy. The assignment may be based on one or more rules that dictate how archive files should be split and the load balance of assigned tasks.

At block 1112, for each controller content indexing proxy, the content indexing task assigned to the respective controller content indexing proxy is transmitted. Transmission of the assigned tasks may include transmission of an identification of the primary data assigned to the respective controller content indexing proxy. After the content indexing tasks are transmitted, the method 1100 ends, as shown at block 1114.

Example Method for Data Proximity-Based Task Splitting

Figure 12:
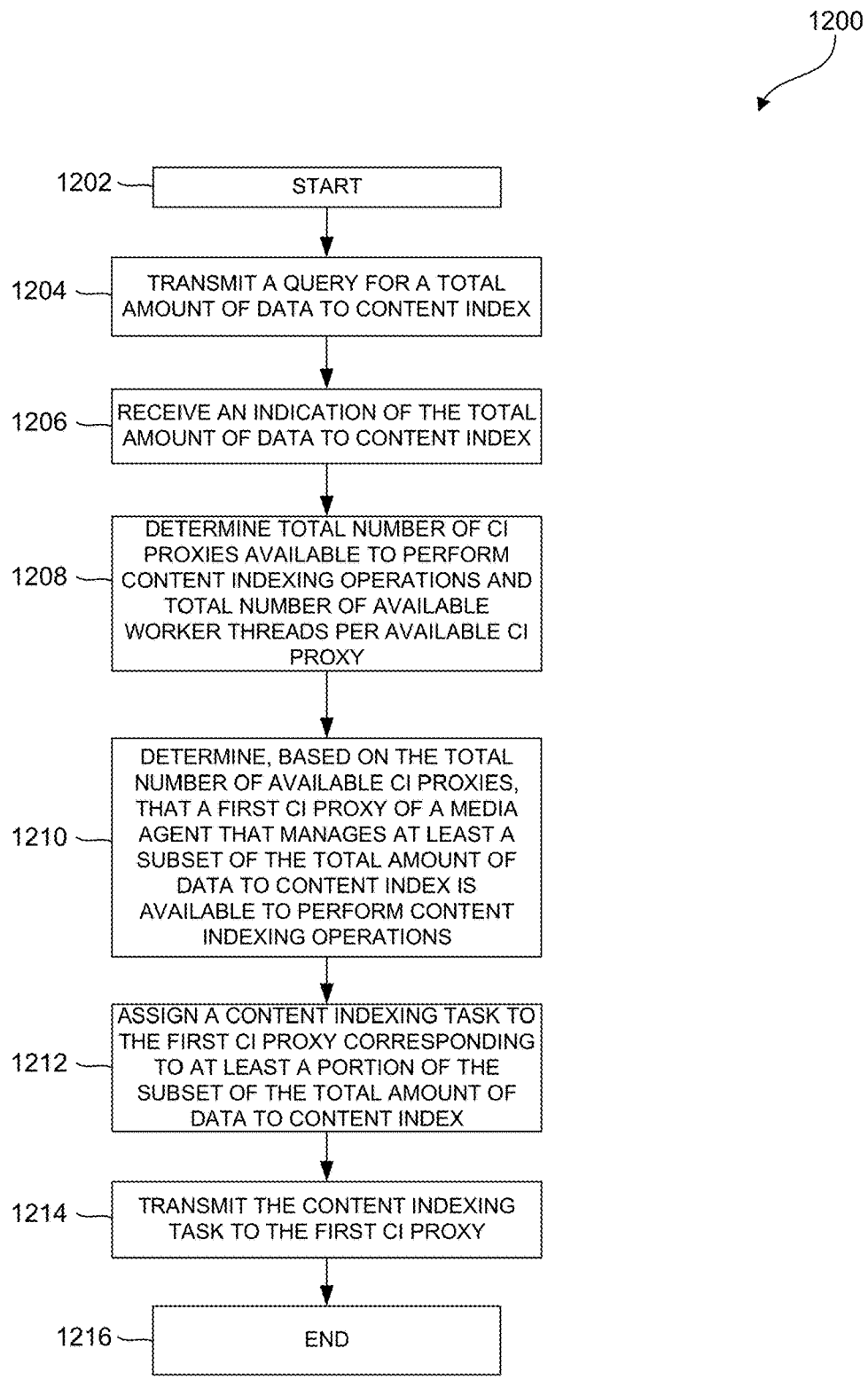
FIG. 12 depicts some salient operations of a method for data proximity-based task splitting according to an illustrative embodiment of the present invention.

FIG. 12 depicts some salient operations of a method 1200 for data proximity-based task splitting according to an illustrative embodiment of the present invention. A master content indexing proxy 332 or 344 can implement the method 1200. The method 1200 starts at block 1202.

At block 1204, a query for a total amount of data to content index is transmitted. The query may be transmitted to the indexing storage system 320. The backup and CI databases 324 of the indexing storage system 320 may include status flags that indicate which primary data have been content indexed and which have not.

At block 1206, an indication of the total amount of data to content index is received. The indication may be received from the indexing storage system 320 (e.g., the index manager 322). The indexing storage system 320 (e.g., the index manager 322) may take into account any content indexing policy criteria in determining which data to include in the identified total amount.

At block 1208, a total number of controller content indexing proxies available to perform content indexing operations and a total number of available worker threads per available controller content indexing proxy is determined.

At block 1210, a first controller content indexing proxy of a media agent that manages at least a subset of the total amount of data to content index is determined, based on the total number of available controller content indexing proxies, to be available to perform content indexing operations. For example, the master proxy may prefer to assign primary data to controller content indexing proxies executed by media agents that manage or have authority of the primary data because then the corresponding restored secondary copies that are restored by the media agent do not have to be transmitted over the network 310. The controller content indexing proxies 332 and/or 344 may be executed by hardware that is fast and efficient. The network 310, however, may have limited bandwidth. Thus, the network 310 may serve as a performance bottleneck. If the media agent that restores the secondary copies is also available to content index the restored secondary copies, this may be preferable to the master proxy because then transmissions of the restored secondary copies over the network 310 can be avoided. In some embodiments, the backup and CI databases 324 may include an indication of which media agents 144 manage certain secondary copies. In other embodiments, the media agents 144 may provide this information to the master proxy.

At block 1212, a content indexing task is assigned to the first controller content indexing proxy that corresponds to at least a portion of the subset of the total amount of data to content index. Thus, the master proxy may assign a controller content indexing proxy executing on a media agent 144 primary data to content index that corresponds with secondary copies managed by the same media agent 144.

At block 1214, the content indexing task assigned to the first controller content indexing proxy is transmitted. Transmission of the assigned task may include transmission of an identification of the primary data assigned to the first controller content indexing proxy. After the content indexing task is transmitted, the method 1200 ends, as shown at block 1216.

Example Method for Content Indexing Emails

Figure 13:
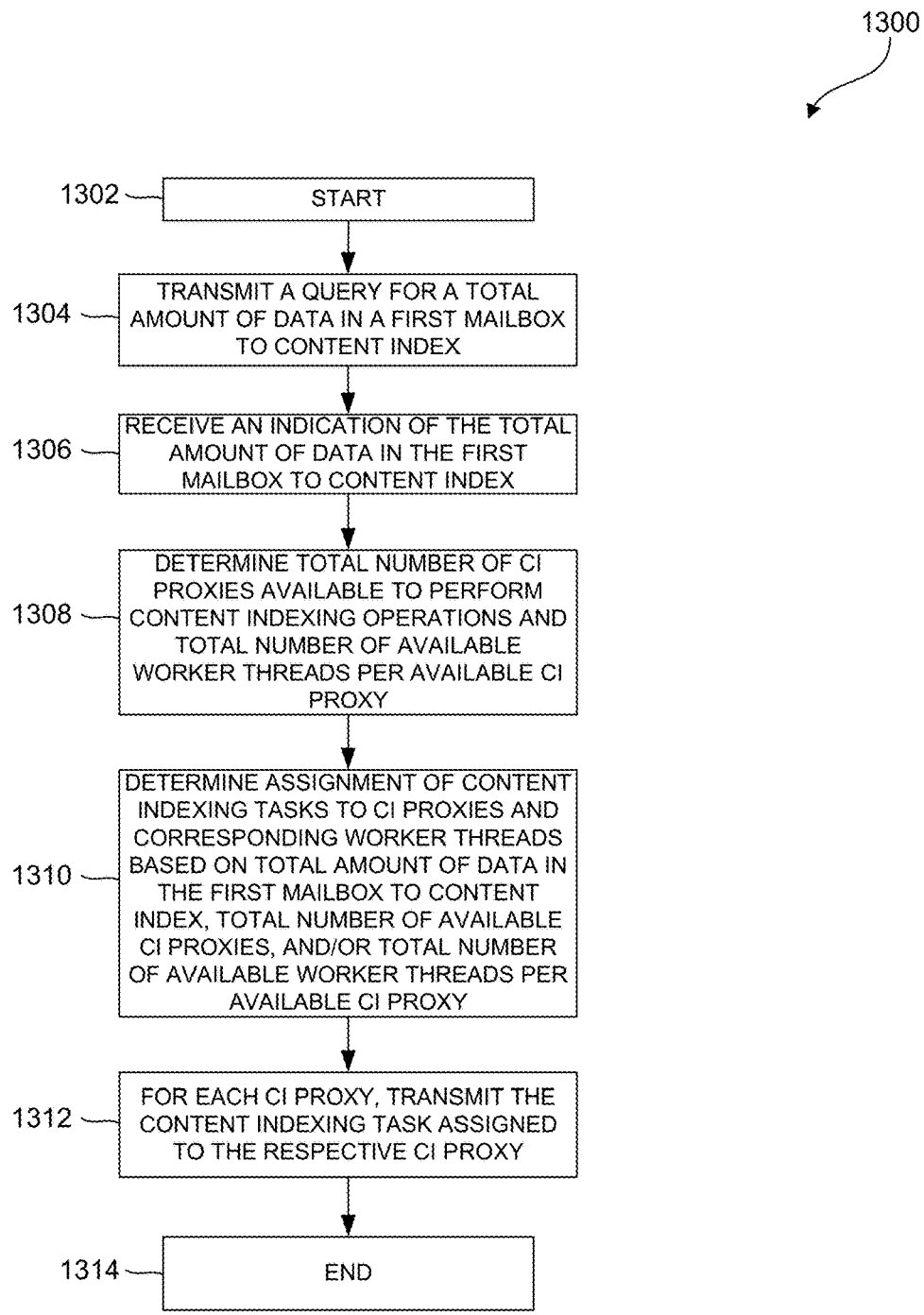
FIG. 13 depicts some salient operations of a method for content indexing emails according to an illustrative embodiment of the present invention.

FIG. 13 depicts some salient operations of a method 1300 for content indexing emails according to an illustrative embodiment of the present invention. A master content indexing proxy 332 or 344 can implement the method 1300. The method 1300 starts at block 1302.

At block 1304, a query for a total amount of data in a first mailbox to content index is transmitted. The query may be transmitted to the indexing storage system 320. The backup and CI databases 324 of the indexing storage system 320 may include status flags that indicate which primary data have been content indexed and which have not. The query may be limited to a first mailbox because a content indexing policy criteria may indicate that only emails stored or saved in the first mailbox are to be content indexed.

At block 1306, an indication of the total amount of data in the first mailbox to content index is received. The indication may be received from the indexing storage system 320 (e.g., the index manager 322). The indexing storage system 320 (e.g., the index manager 322) may take into account any content indexing policy criteria in determining which data to include in the identified total amount (e.g., only data corresponding to the first mailbox).

At block 1308, a total number of controller content indexing proxies available to perform content indexing operations and a total number of available worker threads per available controller content indexing proxy is determined.

At block 1310, an assignment of content indexing tasks to controller content indexing proxies and corresponding worker threads is determined based on a total amount of data in the first mailbox to content index, the total number of available controller content indexing proxies, and/or the total number of available worker threads per available controller content indexing proxy. The assignment may be based on one or more rules that dictate how archive files should be split and the load balance of assigned tasks.

At block 1312, for each controller content indexing proxy, the content indexing task assigned to the respective controller content indexing proxy is transmitted. Transmission of the assigned tasks may include transmission of an identification of the primary data assigned to the respective controller content indexing proxy. After the content indexing tasks are transmitted, the method 1300 ends, as shown at block 1314.

Figure 14:
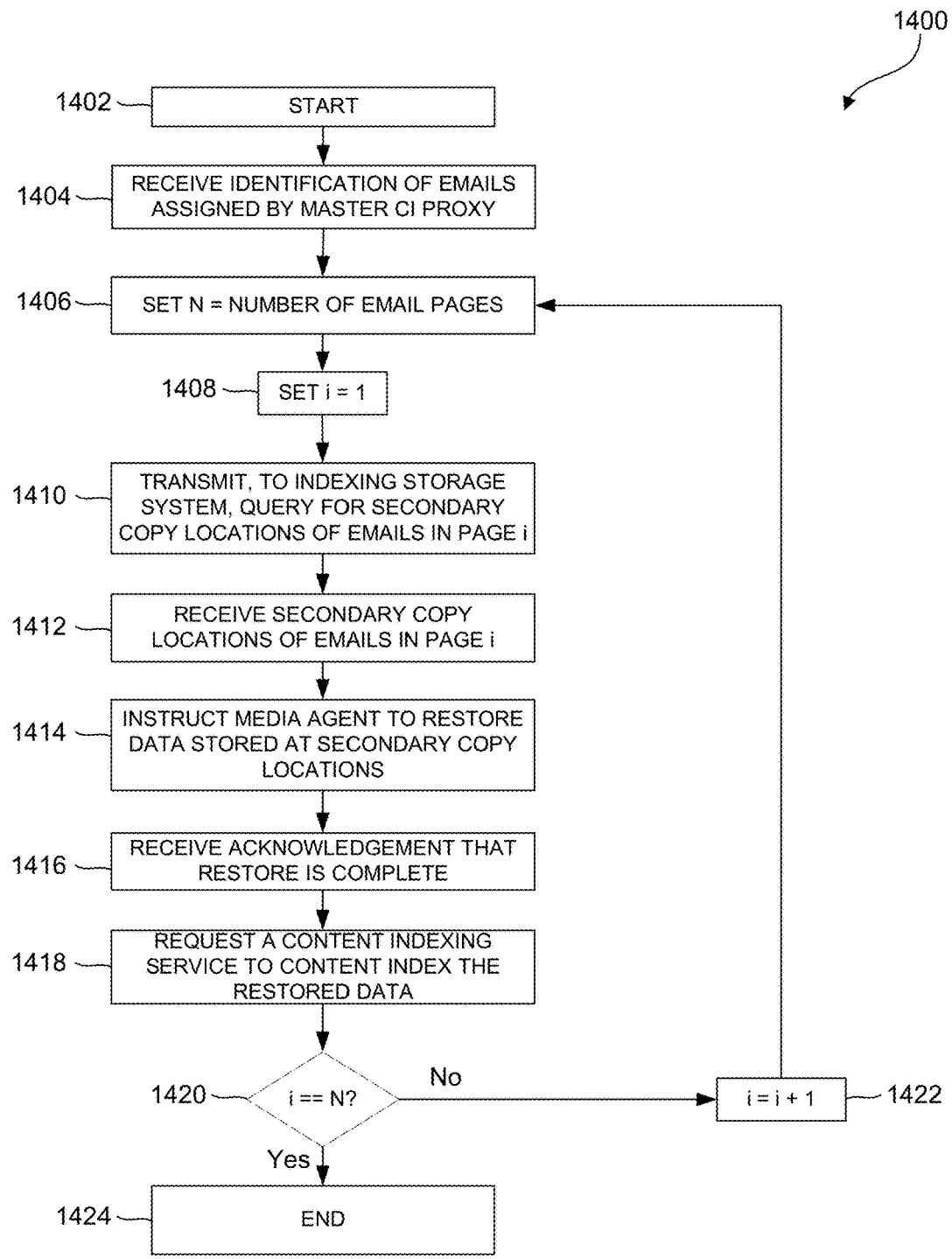
FIG. 14 depicts some salient operations of another method for content indexing emails according to an illustrative embodiment of the present invention.

FIG. 14 depicts some salient operations of another method 1400 for content indexing emails according to an illustrative embodiment of the present invention. A controller content indexing proxy 332 or 344 can implement the method 1400. The method 1400 starts at block 1402.

At block 1404, an identification of emails assigned by a master content indexing proxy is received. The identification of emails may be received by a worker thread executing on the controller content indexing proxy 332 or 344 and may be those emails assigned specifically to the worker thread.

At block 1406, the variable N is set to the number of email pages. For example, an email page may include a set number of emails. Thus, the number of email pages may correspond to the total number of emails assigned to the worker thread. The worker thread may content index emails a page at a time to ensure accurate and efficient content indexing operations. For example, browse callback thread 544 may request the restoration of emails in a first page, then the restoration of emails in a second page, and so on. In addition, while browse callback thread 544 is requesting the restoration of emails in the first page, the index query thread 542 may be querying the secondary copy location data for emails in the second page, and so on.

At block 1408, the variable i is set to 1. As used herein, variable i will refer to a particular email page.

At block 1410, a query for secondary copy locations of emails in page i are transmitted to the indexing storage system 320. For example, the queried secondary copy location data may include the logical paths to the secondary copies stored in the secondary storage device 108 and/or the location information (e.g., offsets) indicating where the secondary copies are stored in the secondary storage device 108.

At block 1412, secondary copy locations of emails in page i are received. The secondary copy locations may be received after the index manager 322 queries the backup and CI database 324 for the information.

At block 1414, a media agent is instructed to restore data stored at the received secondary copy locations. The media agent therefore may restore secondary copies corresponding to primary data that has yet to be content indexed.

At block 1416, an acknowledgement is received that the restore is complete. For example, the acknowledgment may be received from the media agent 144.

At block 1418, a content indexing service is requested to content index the restored data. For example, the content indexing service may retrieve the restored secondary copies. The restored secondary copies (e.g., the restored emails) may be in the XML format and the content indexing service can process the restored secondary copies to extract keywords and generate previews.

At block 1420, a determination is made as to whether variable i equals variable N. If the two variables are equal, then the emails in all of the email pages have been content indexed and the method 1400 can proceed to block 1424 and end. Otherwise, if the two variables are not equal, then not all of the emails in all of the email pages have been content indexed and the method 1400 can proceed to block 1422.

At block 1422, the variable i is incremented by 1. Once variable i is incremented by 1, the method 1400 proceeds back to block 1406.

As described herein, some emails may include one or more attachment files. Thus, the method 1400 can be repeated for some or all of the attachment files included in the emails assigned to the worker thread.

While FIG. 14 is illustrated in a manner such that the operations directed to one email page are performed serially and before operations directed to a second email page are performed, this is not meant to be limiting. Rather, FIG. 14 is illustrated to show the distributed architecture of the improved content indexing system. When the worker thread is receiving secondary copy locations for emails in a first page, the worker thread may simultaneously be query for secondary copy locations of emails in a second page, and so on. Thus, blocks 1410, 1412, 1414, 1416, and/or 1418 may be executed serially in relation to the same email page, but in parallel in relation to different email pages.

Example Method for Tracking Content Indexing

Figure 15:
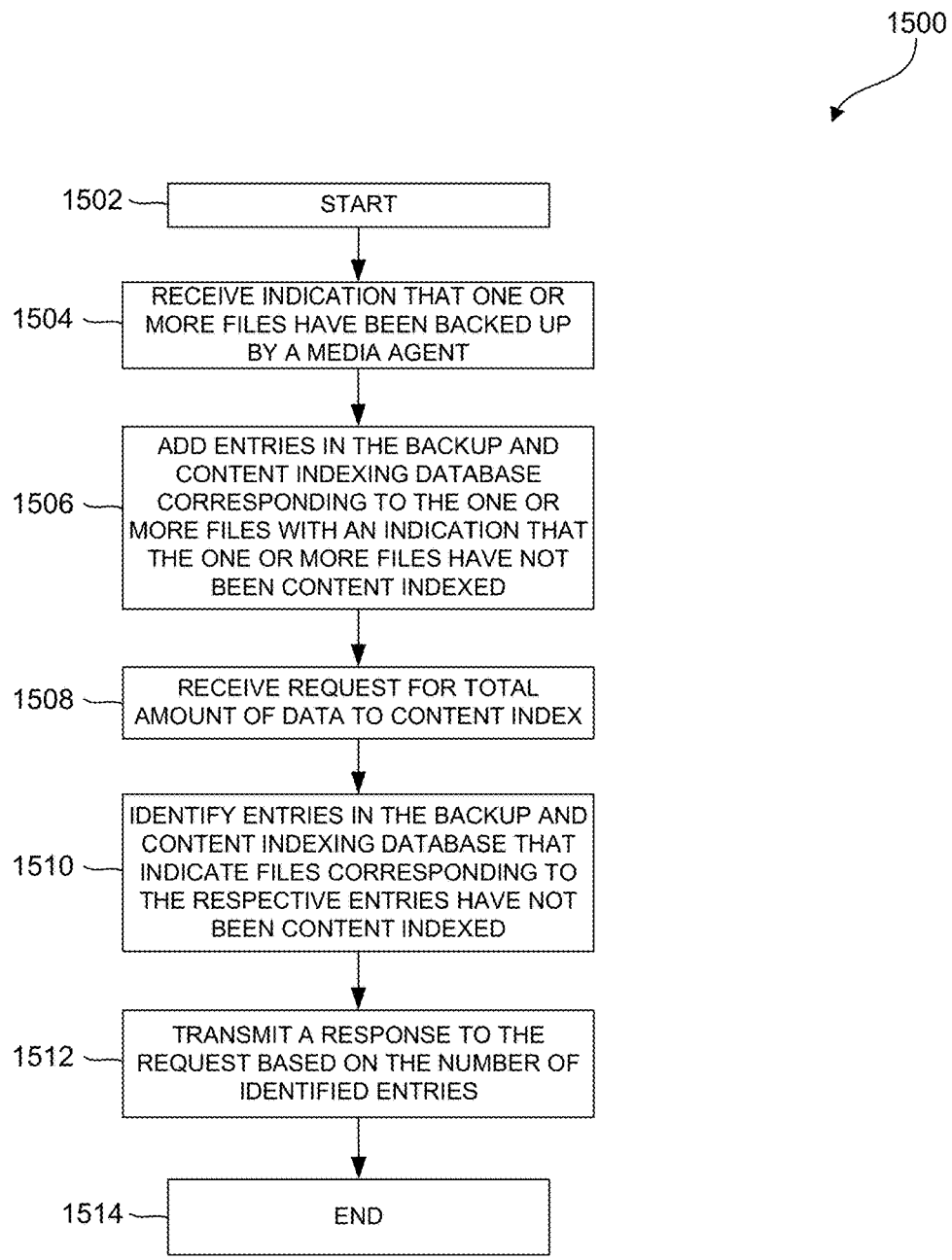
FIG. 15 depicts some salient operations of a method for tracking content indexing according to an illustrative embodiment of the present invention.

FIG. 15 depicts some salient operations of a method 1500 for tracking content indexing according to an illustrative embodiment of the present invention. The indexing storage system 320 (e.g., the index manager 322) can implement the method 1500. The method 1500 starts at block 1502.

At block 1504, an indication that one or more files have been backed up by a media agent is received. For example, the media agent may transmit indices 153 corresponding to the backed up files to indicate that the files have been backed up.

At block 1506, entries in the backup and CI database are added corresponding to the one or more files with an indication that the one or more files have not been content indexed. For example, a status flag in each entry may be set to indicate that the files have not been content indexed.

At block 1508, a request for a total amount of data to content index is received. For example, the request may be received from a master proxy.

At block 1510, entries in the backup and CI database are identified that indicate files corresponding to the respective entries have not been content indexed. For example, the status flags in the entries may be checked to determine whether files have been content indexed.

At block 1512, a response to the request is transmitted based on the number of identified entries. For example, the total amount of data to content index may correspond to the number of entries that have status flags indicating the corresponding files have not been content indexed. In further embodiments, the response may be dependent on content indexing policy criteria. For example, the criteria may indicate that only files in a certain folder are to be content indexed. Thus, the total amount of data to content index included in the response may depend on the number of entries that have status flags indicating the corresponding files have not been content indexed and a determination of which of those entries correspond to files in the folder specified by the criteria. After the response to the request is transmitted, the method 1500 ends, as shown at block 1514.

In further embodiments, extracted keywords and/or paths to the stored locations of previews may be received. In response to receiving this information, corresponding entries in the backup and CI database may be updated with the extracted keywords and/or paths. In addition, the updated entries may be further modified to change the status flag to indicate that the corresponding files have been content indexed.

Example Method for Combining Backup and Content Index Data

Figure 16:
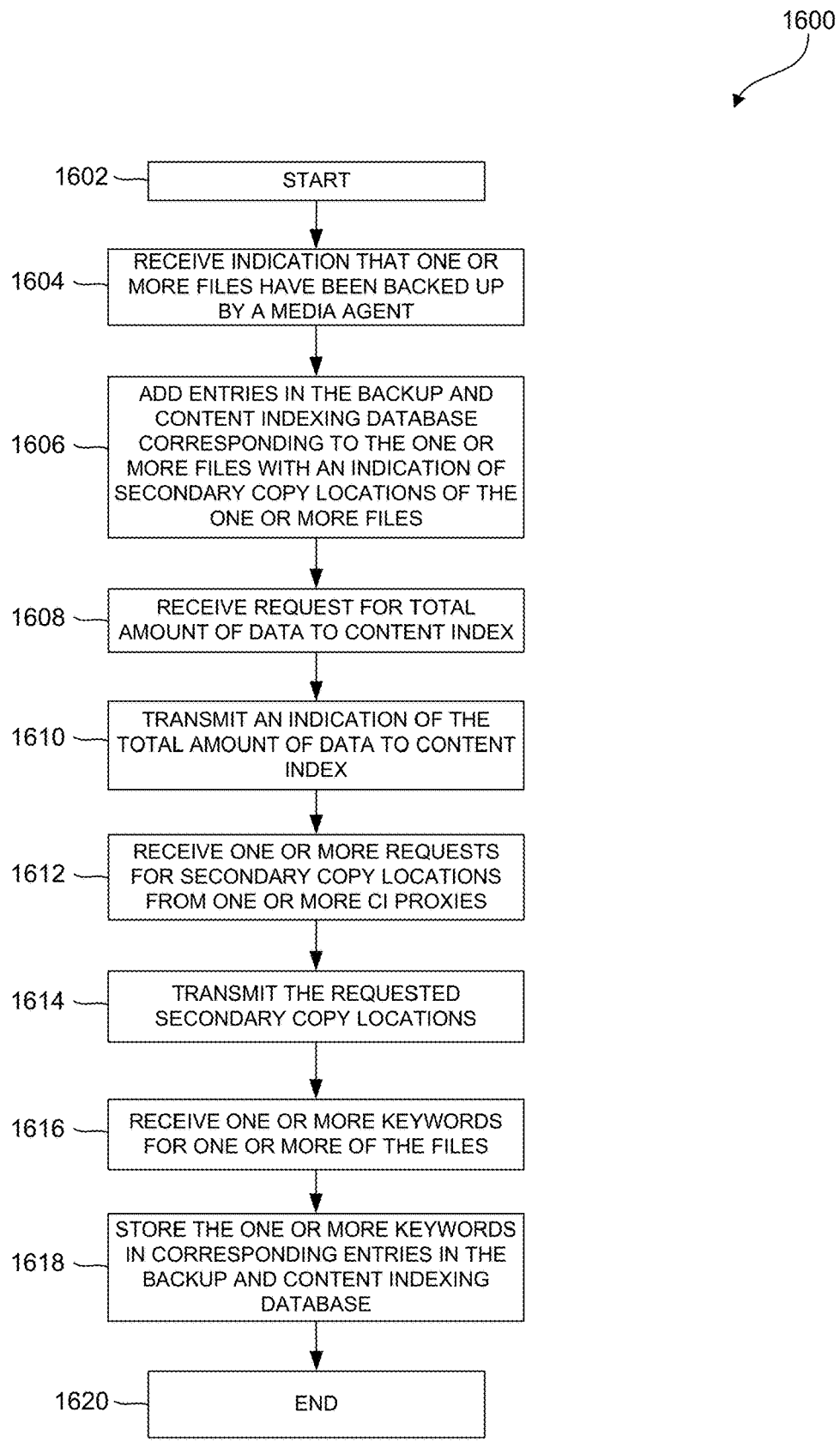
FIG. 16 depicts some salient operations of a method for combining backup and content index data according to an illustrative embodiment of the present invention.

FIG. 16 depicts some salient operations of a method 1600 for combining backup and content index data according to an illustrative embodiment of the present invention. The indexing storage system 320 (e.g., the index manager 322) can implement the method 1600. The method 1600 starts at block 1602.

At block 1604, an indication that one or more files have been backed up by a media agent is received. For example, the media agent may transmit indices 153 corresponding to the backed up files to indicate that the files have been backed up.

At block 1606, entries in the backup and CI database are added corresponding to the one or more files with an indication of secondary copy locations of the one or more files. For example, the secondary copy locations can include the logical paths to the secondary copies stored in the secondary storage device 108 and/or the location information (e.g., offsets) indicating where the secondary copies are stored in the secondary storage device 108. The secondary copy locations may be received from the media agent.

At block 1608, a request for a total amount of data to content index is received. For example, the request may be received from a master proxy.

At block 1610, an indication of the total amount of data to content index is transmitted. For example, the total amount of data to content index may correspond to the number of entries that have status flags indicating the corresponding files have not been content indexed. In further embodiments, the response may be dependent on content indexing policy criteria. For example, the criteria may indicate that only files in a certain folder are to be content indexed. Thus, the total amount of data to content index included in the response may depend on the number of entries that have status flags indicating the corresponding files have not been content indexed and a determination of which of those entries correspond to files in the folder specified by the criteria.

At block 1612, one or more requests for secondary copy locations are received from one or more controller content indexing proxies. For example, the requests may be received from each worker thread tasked with content indexing at least a portion of the one or more files that have been backed up.

At block 1614, the requested secondary copy locations are transmitted. For example, the secondary copy locations may be stored in the backup and CI database and retrieved therefrom.

At block 1616, one or more keywords for one or more of the files that were backed up are received. For example, a content indexing service 334 and/or 346 may have extracted the keywords from restored versions of the secondary copies. In further embodiments, paths to the stored locations of previews are also received.

At block 1618, the one or more keywords are stored in entries in the backup and CI database corresponding to the one or more files that were backed up. In further embodiments, the paths to the stored locations of previews are also stored in entries in the backup and CI database corresponding to the one or more files that were backed up. Thus, the backup and CI database may include both backup metadata (as provided by the media agent 144) and content index data (e.g., keywords and/or paths to the stored locations of previews as provided by the content indexing service 334 and/or 346). After the one or more keywords are stored, the method 1600 ends, as shown at block 1620.

Example Method for Separately Storing Generated Previews

Figure 17:
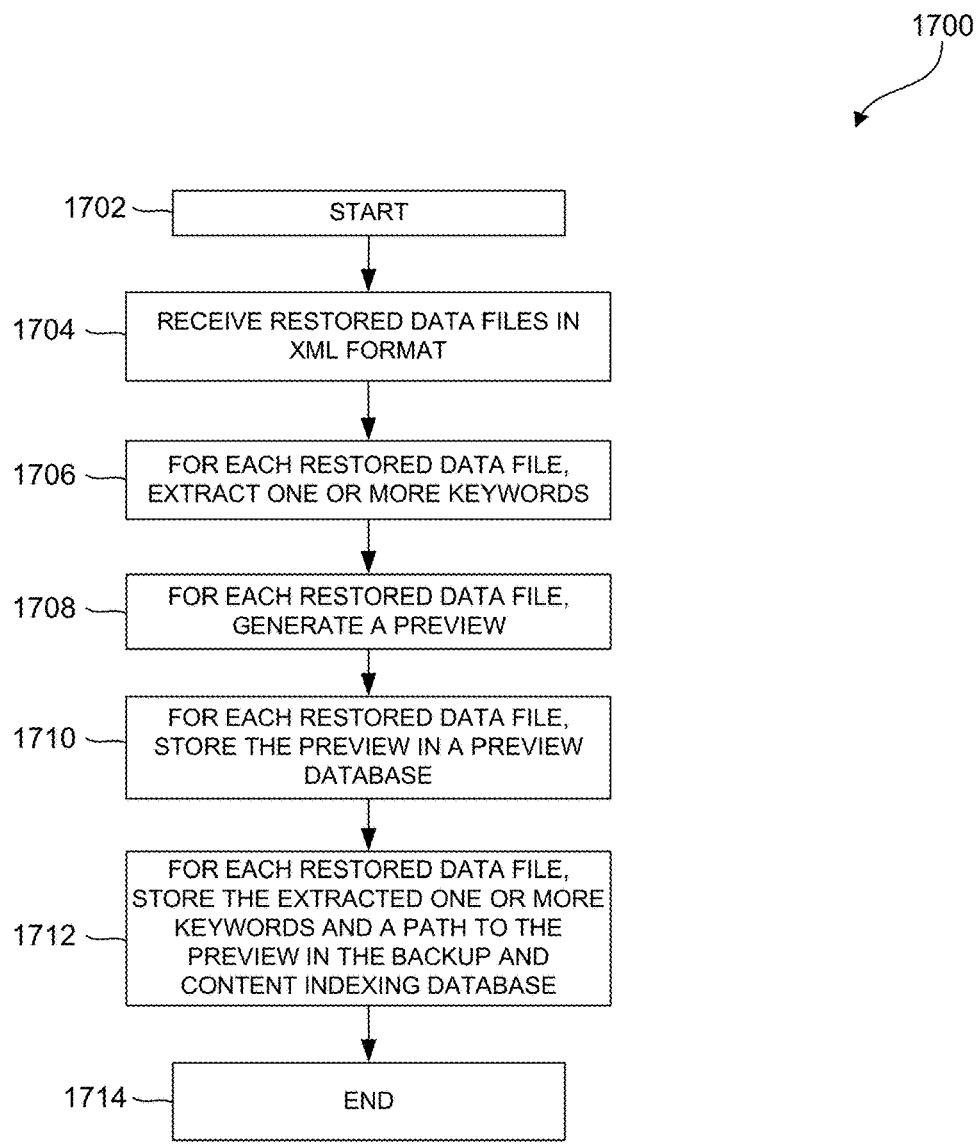
FIG. 17 depicts some salient operations of a method for separately storing generated previews according to an illustrative embodiment of the present invention.

FIG. 17 depicts some salient operations of a method 1700 for separately storing generated previews according to an illustrative embodiment of the present invention. The content indexing service 334 or 346 can implement the method 1700. The method 1700 starts at block 1702.

At block 1704, restored data files in the XML format are received. For example, the data files may be any data object, such as email files. The restored data files may be received from a media agent 144.

At block 1706, for each restored data file, one or more keywords are extracted. For example, the content indexing service 334 or 346 can use a natural language parser or other text recognition techniques to parse the restored data files in the XML format and identify one or more keywords.

At block 1708, for each restored data file, a preview may be generated. The preview may be a thumbnail image that is a snapshot of a portion of or all of the restored data file. For example, the preview may be a smaller version of an image at a lower resolution if the restored data file is an image file. As another example, the preview may be a snapshot of a portion of the body of an email if the restored data file is an email file.

At block 1710, for each restored data file, the preview is stored in a preview database. The preview database may be separate from a backup and CI database.

At block 1712, for each restored data file, the extracted one or more keywords and a path to the preview are stored in the backup and CI database. Thus, when content search results are provided to the storage manager 140, the storage manager 140 can use the preview paths to retrieve the appropriate previews from the preview database for display in the user interface 158. Alternatively, the index manager 322 can use the preview paths to retrieve the appropriate previews from the preview database and provide the previews to the storage manager 140 for display in the user interface 158. After the keywords and paths are stored, the method 1700 ends, as shown at block 1714.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, a secondary storage computing device 106 may include the indexing storage system 320. Similarly, the exchange server 360 may implement the functionality of the backup proxies 350 described herein. In addition, a secondary storage computing device 106 may store the preview database 340 (separately from the indexing storage system 320 and/or the media agent database 152).

EXAMPLE EMBODIMENTS

Some example enumerated embodiments of the present invention are recited in this section in the form of methods, systems, and non-transitory computer-readable media, without limitation.

One aspect of the disclosure provides a computer-implemented method as generally shown and described herein and equivalents thereof.

Another aspect of the disclosure provides a system as generally shown and described herein and equivalents thereof.

Another aspect of the disclosure provides a non-transitory computer readable medium storing instructions, which when executed by at least one computing device, perform a method as generally shown and described herein and equivalents thereof.

Another aspect of the disclosure provides a networked information management system for content indexing restored secondary copies. The networked information management system comprises: a content indexing proxy having one or more first hardware processors, where the content indexing proxy is configured with first computer-executable instructions that, when executed, cause the content indexing proxy to: receive, by a first thread executing on the content indexing proxy, identification of primary data assigned to the content indexing proxy by a master content indexing proxy; transmit, by the first thread to an indexing storage system, a query for secondary copy location data corresponding to the identified primary data; receive, by the first thread, the secondary copy location data; transmit, by a second thread executing on the content indexing proxy, an instruction to a first computing device that executes a media agent to restore secondary copies stored at locations indicated by the secondary copy location data; receive, by a third thread executing on the content indexing proxy, an acknowledgment from the first computing device that a restoration of the secondary copies is complete; and transmit, by a fourth thread executing on the content indexing proxy, a request to content index the restored secondary copies. The networked information management system further comprises one or more computing devices in communication with the content indexing proxy, where the one or more computing devices each have one or more second hardware processors, where the one or more computing devices are configured with second computer-executable instructions that, when executed, cause the one or more computing devices to: receive the request to content index the restored secondary copies; retrieve the restored secondary copies from the first computing device; and content index the restored secondary copies.

The networked information management system of the preceding paragraph can include any sub-combination of the following features: where the second computer-executable instructions, when executed, further cause the one or more computing devices to generate previews and extract keywords using the restored secondary copies; where the second computer-executable instructions, when executed, further cause the one or more computing devices to store the generated previews in a database separate from secondary copy metadata; where the indexing storage system comprises an index manager and a backup and content indexing database; where the second computer-executable instructions, when executed, further cause the one or more computing devices to transmit the extracted keywords to the index manager; where the index manager is configured to mark entries in the backup and content indexing database associated with the primary data to indicate that content indexing is complete; where the index manager is configured to mark the entries by changing one or more status flags; where the first computer-executable instructions, when executed, further cause the content indexing proxy to transmit, by the third thread to the fourth thread, a request for content indexing of the restored secondary copies in response to reception of the acknowledgment; where a first worker thread and a second worker thread execute on the content indexing proxy, and where the first worker thread comprises the first thread, the second thread, the third thread, and the fourth thread; and where the primary data is assigned to the first worker thread and second primary data is assigned to the second worker thread by the master content indexing proxy.

Another aspect of the disclosure provides a computer-implemented method for content indexing restored secondary copies. The computer-implemented method further comprises: receiving, by a first thread executing on a content indexing proxy having one or more hardware processors, identification of primary data assigned to the content indexing proxy by a master content indexing proxy; transmitting, by the first thread to an indexing storage system, a query for secondary copy location data corresponding to the identified primary data; transmitting, by a second thread executing on the content indexing proxy, an instruction to a first computing device that executes a media agent to restore secondary copies stored at locations indicated by the secondary copy location data; receiving, by a third thread executing on the content indexing proxy, an acknowledgment from the first computing device that a restoration of the secondary copies is complete; retrieving the restored secondary copies from the first computing device; and content indexing the restored secondary copies.

The computer-implemented method of the preceding paragraph can include any sub-combination of the following features: where content indexing the restored secondary copies further comprises generating previews and extracting keywords using the restored secondary copies; where the computer-implemented method further comprises storing the generated previews in a database separate from secondary copy metadata; where the indexing storage system comprises an index manager and a backup and content indexing database; where the computer-implemented method further comprises transmitting the extracted keywords to the index manager; where the index manager is configured to mark entries in the backup and content indexing database associated with the primary data to indicate that content indexing is complete; where the computer-implemented method further comprises transmitting, by the third thread to the fourth thread, a request for content indexing of the restored secondary copies in response to reception of the acknowledgment; where a first worker thread and a second worker thread execute on the content indexing proxy, where the first worker thread comprises the first thread, the second thread, the third thread, and the fourth thread, and where the primary data is assigned to the first worker thread and second primary data is assigned to the second worker thread by the master content indexing proxy; where the primary data is assigned to the content indexing proxy and second primary data is assigned to a second content indexing proxy by the master content indexing proxy; and where transmitting a query for secondary copy location data corresponding to the identified primary data further comprises transmitting a query for secondary copy location data corresponding to emails in a first page.

Another aspect of the disclosure provides a networked information management system for tracking content indexing. The networked information management system comprises an indexing storage system having one or more first hardware processors, where the indexing storage system is configured with first computer-executable instructions that, when executed, cause the indexing storage system to: receive an indication that a first file has been backed up by a first computing device that executes a media agent; add a first entry in a backup and content indexing database corresponding to the first file that has been backed up, where the first entry comprises an indication that the corresponding first file has not been content indexed, and where the backup and content indexing database comprises a plurality of other entries; receive a request for a total amount of data to content index; determine that the first entry in the backup and content indexing database comprises the indication that the corresponding first file has not been content indexed; determine that a second entry in the plurality of other entries comprises an indication that a corresponding second file has not been content indexed; and transmit a response to the request providing the total amount of data to content index, where the total amount of data to content index is determined based at least in part on the first file and the second file. The networked information management system further comprises a master content indexing proxy in communication with the indexing storage system, where the master content indexing proxy has one or more second hardware processors, where the master content indexing proxy is configured with second computer-executable instructions that, when executed, cause the master content indexing proxy to transmit the request for the total amount of data to content index.

The networked information management system of the preceding paragraph can include any sub-combination of the following features: where the first computer-executable instructions, when executed, further cause the indexing storage system to determine that the first file and the second file correspond to criteria included in a context indexing policy; where the total amount of data to context index comprises at least one of a total number of archive files that include secondary copies that correspond with primary data to be context indexed or a number of secondary copies that are associated with each archive file that correspond with primary data to be context indexed; where the first computer-executable instructions, when executed, further cause the indexing storage system to receive at least one of file metadata associated with the first file or secondary copy metadata associated with the first file and generated by the first computing device; where the first computer-executable instructions, when executed, further cause the indexing storage system to store at least one of the file metadata or the secondary copy metadata in the first entry in the in the backup and content indexing database; where the second computer-executable instructions, when executed, further cause the master content indexing proxy to identify at least one of a total number of controller content indexing proxies available to perform content indexing tasks or a total number of worker threads executing on each controller content indexing proxy available to perform content indexing tasks; where the second computer-executable instructions, when executed, further cause the master content indexing proxy to split the total amount of data to content index for assignment to different controller content indexing proxies available to perform content indexing tasks; where the second computer-executable instructions, when executed, further cause the master content indexing proxy to assign the first file to a first controller content indexing proxy available to perform content indexing tasks and assign the second file to a second controller content indexing proxy available to perform content indexing tasks; where the second computer-executable instructions, when executed, further cause the master content indexing proxy to track and report on progress of content indexing performed by the first controller content indexing proxy and by the second controller content indexing proxy; and where the first entry comprises a status flag that indicates that the first file has not been content indexed.

Another aspect of the disclosure provides a computer-implemented method for tracking content indexing. The computer-implemented method comprises: receiving an indication that a first file has been backed up by a first computing device that executes a media agent; adding a first entry in a backup and content indexing database corresponding to the first file that has been backed up, where the first entry comprises an indication that the corresponding first file has not been content indexed, and where the backup and content indexing database comprises a plurality of other entries; receiving a request for a total amount of data to content index; determining that the first entry in the backup and content indexing database comprises the indication that the corresponding first file has not been content indexed; determining that a second entry in the plurality of other entries comprises an indication that a corresponding second file has not been content indexed; and transmitting a response to the request providing the total amount of data to content index, where the total amount of data to content index is determined based at least in part on the first file and the second file.

The computer-implemented method of the preceding paragraph can include any sub-combination of the following features: where the computer-implemented further comprises determining that the first file and the second file correspond to criteria included in a context indexing policy; where the total amount of data to context index comprises at least one of a total number of archive files that include secondary copies that correspond with primary data to be context indexed or a number of secondary copies that are associated with each archive file that correspond with primary data to be context indexed; where receiving an indication that a first file has been backed up by a first computing device that executes a media agent further comprises receiving at least one of file metadata associated with the first file or secondary copy metadata associated with the first file and generated by the first computing device; where the computer-implemented method further comprises storing at least one of the file metadata or the secondary copy metadata in the first entry in the in the backup and content indexing database; where the computer-implemented method further comprises identifying at least one of a total number of controller content indexing proxies available to perform content indexing tasks or a total number of worker threads executing on each controller content indexing proxy available to perform content indexing tasks, where the computer-implemented method further comprises splitting the total amount of data to content index for assignment to different controller content indexing proxies available to perform content indexing tasks; where the computer-implemented further comprises assigning the first file to a first controller content indexing proxy available to perform content indexing tasks, assigning the second file to a second controller content indexing proxy available to perform content indexing tasks, and tracking and reporting on progress of content indexing performed by the first controller content indexing proxy and by the second controller content indexing proxy; where the first controller content indexing proxy causes content indexing to be performed on a restored secondary copy of the first file in an independent format; and where receiving a request for a total amount of data to content index further comprises receiving a request for a total amount of data in a first mailbox to content index.

Another aspect of the disclosure provides a networked information management system for content indexing data. The networked information management system comprises a master content indexing proxy having one or more first hardware processors, where the master content indexing proxy is configured with first computer-executable instructions that, when executed, cause the master content indexing proxy to: transmit a query for a total amount of data to content index; receive an indication of the total amount of data to content index; determine a total number of controller content indexing proxies that are available to perform content indexing operations; for each available controller content indexing proxy, determine a total number of worker threads executing on the respective available controller content indexing proxy that are available to perform content indexing operations, assign a portion of the total amount of data to content index to the respective available controller content indexing proxy based on at least one of the total amount of data to content index, the total number of available controller content indexing proxies, or the total number of available worker threads executing on the respective available controller content indexing proxy, and transmit an instruction to the respective available controller content indexing proxy indicating the portion of the total amount of data to content index assigned to the respective available controller content indexing proxy. The networked information management system further comprises an indexing storage system in communication with the master content indexing proxy, where the indexing storage system has one or more second hardware processors, where the indexing storage system is configured with second computer-executable instructions that, when executed, cause the indexing storage system to transmit the indication of the total amount of data to content index to the master content indexing proxy.

The networked information management system of the preceding paragraph can include any sub-combination of the following features: where the first computer-executable instructions, when executed, further cause the master content indexing proxy to track progress of content indexing performed by a first available controller content indexing proxy; where the first computer-executable instructions, when executed, further cause the master content indexing proxy to transmit a notification indicating the tracked progress; where the tracked progress comprises one of a percentage of data assigned to the first available controller content indexing proxy that has yet to be content indexed, an amount of data assigned to the first available controller content indexing proxy that has yet to be content indexed, or a time remaining until the data assigned to the first available controller content indexing proxy is content indexed; where the first computer-executable instructions, when executed, further cause the master content indexing proxy to: determine that the first available controller content indexing proxy is operating at a performance level below a threshold value based on the tracked progress, and assign at least some of the content indexing tasks assigned to the first available controller content indexing proxy to another available controller content indexing proxy; where the first computer-executable instructions, when executed, further cause the master content indexing proxy to assign one of a first archive file, a portion of a second archive file, or individual primary data to a first available controller content indexing proxy; where a first worker thread and a second worker thread execute on a first available controller content indexing proxy; where the first computer-executable instructions, when executed, further cause the master content indexing proxy to: assign a first archive file to the first worker thread, and assign a second archive file to the second worker thread; where the first computer-executable instructions, when executed, further cause the master content indexing proxy to determine a total amount of data to content index for a second set of content indexing operations while the total number of controller content indexing proxies that are available to perform the content indexing operations is determined; and where the total amount of data to content index comprises at least one of a total number of archive files that include secondary copies that correspond with primary data to be context indexed or a number of secondary copies that are associated with each archive file that correspond with primary data to be context indexed.

Another aspect of the disclosure provides a computer-implemented method for content indexing data. The computer-implemented method comprises: transmitting a query for a total amount of data to content index; receiving an indication of the total amount of data to content index; determining a total number of controller content indexing proxies that are available to perform content indexing operations; and for each available controller content indexing proxy, determining a total number of worker threads executing on the respective available controller content indexing proxy that are available to perform content indexing operations, assigning a portion of the total amount of data to content index to the respective available controller content indexing proxy based on at least one of the total amount of data to content index, the total number of available controller content indexing proxies, or the total number of available worker threads executing on the respective available controller content indexing proxy, and transmitting an instruction to the respective available controller content indexing proxy indicating the portion of the total amount of data to content index assigned to the respective available controller content indexing proxy.

The computer-implemented method of the preceding paragraph can include any sub-combination of the following features: where the method further comprises tracking progress of content indexing performed by a first available controller content indexing proxy; where the computer-implemented method further comprises transmitting a notification indicating the tracked progress; where the tracked progress comprises one of a percentage of data assigned to the first available controller content indexing proxy that has yet to be content indexed, an amount of data assigned to the first available controller content indexing proxy that has yet to be content indexed, or a time remaining until the data assigned to the first available controller content indexing proxy is content indexed; where the computer-implemented method further comprises: determining that the first available controller content indexing proxy is operating at a performance level below a threshold value based on the tracked progress, and assigning at least some of the content indexing tasks assigned to the first available controller content indexing proxy to another available controller content indexing proxy; where assigning a portion of the total amount of data to content index to the respective available controller content indexing proxy further comprises assigning one of a first archive file, a portion of a second archive file, or individual primary data to a first available controller content indexing proxy; where a first worker thread and a second worker thread execute on a first available controller content indexing proxy, and where assigning a portion of the total amount of data to content index to the respective available controller content indexing proxy further comprises: assigning a first archive file to the first worker thread, and assigning a second archive file to the second worker thread; where the first available controller content indexing proxy causes content indexing to be performed on restored secondary copies in an independent format; where the computer-implemented method further comprises determining a total amount of data to content index for a second set of content indexing operations while the total number of controller content indexing proxies that are available to perform the content indexing operations is determined; and where transmitting a query for a total amount of data to content index further comprises transmitting a query for a total amount of data in a first mailbox to content index.

Another aspect of the disclosure provides a networked information management system for content indexing data. The networked information management system comprises a master content indexing proxy having one or more first hardware processors, where the master content indexing proxy is configured with first computer-executable instructions that, when executed, cause the master content indexing proxy to: transmit a query for a total amount of data to content index; receive an indication of the total amount of data to content index; determine a total number of controller content indexing proxies that are available to perform content indexing operations; determine, based on the total number of controller content indexing proxies that are available to perform content indexing operations, that a first controller content indexing proxy is available to perform content indexing operations, where the first controller content indexing proxy is executed by a first computing device that executes a media agent, and where the media agent manages at least a subset of the total amount of data to content index; assign the subset of the total amount of data to content index to the first controller content indexing proxy such that the media agent restores secondary copies corresponding to the subset of the total amount of data and provides the restored secondary copies to the first controller content indexing proxy without transmitting the restored secondary copies over an external network; and transmit an instruction to the first controller content indexing proxy indicating that the subset of the total amount of data to content index is assigned to the first controller content indexing proxy. The networked information management system further comprises an indexing storage system in communication with the master content indexing proxy, where the indexing storage system has one or more second hardware processors, where the indexing storage system is configured with second computer-executable instructions that, when executed, cause the indexing storage system to transmit the indication of the total amount of data to content index to the master content indexing proxy.

The networked information management system of the preceding paragraph can include any sub-combination of the following features: where the first computer-executable instructions, when executed, further cause the master content indexing proxy to track progress of content indexing performed by the first controller content indexing proxy; where the first computer-executable instructions, when executed, further cause the master content indexing proxy to transmit a notification indicating the tracked progress; where the tracked progress comprises one of a percentage of the subset of the total amount of data assigned to the first controller content indexing proxy that has yet to be content indexed, an amount of the subset of the total amount of data assigned to the first controller content indexing proxy that has yet to be content indexed, or a time remaining until the subset of the total amount of data assigned to the first available controller content indexing proxy is content indexed; where the first computer-executable instructions, when executed, further cause the master content indexing proxy to: determine that the first controller content indexing proxy is operating at a performance level below a threshold value based on the tracked progress, and assign at least some of the subset of the total amount of data assigned to the first controller content indexing proxy to another controller content indexing proxy; where the first computer-executable instructions, when executed, further cause the master content indexing proxy to assign one of a first archive file, a portion of a second archive file, or individual primary data to the first controller content indexing proxy; where a first worker thread and a second worker thread execute on the first controller content indexing proxy; where the first computer-executable instructions, when executed, further cause the master content indexing proxy to: assign a first portion of the subset of the total amount of data to the first worker thread, and assign a second portion of the subset of the total amount of data to the second worker thread; where the first computer-executable instructions, when executed, further cause the master content indexing proxy to determine a total amount of data to content index for a second set of content indexing operations while the total number of controller content indexing proxies that are available to perform the content indexing operations is determined; and where the subset of the total amount of data to content index comprises at least one of a total number of archive files that include secondary copies that correspond with primary data to be context indexed or a number of secondary copies that are associated with each archive file that correspond with primary data to be context indexed.

Another aspect of the disclosure provides a computer-implemented method for content indexing data. The computer-implemented method comprises: transmitting a query for a total amount of data to content index; receiving an indication of the total amount of data to content index; determining a total number of controller content indexing proxies that are available to perform content indexing operations; determining, based on the total number of controller content indexing proxies that are available to perform content indexing operations, that a first controller content indexing proxy is available to perform content indexing operations, where the first controller content indexing proxy is executed by a first computing device that executes a media agent, and where the media agent manages at least a subset of the total amount of data to content index; assigning the subset of the total amount of data to content index to the first controller content indexing proxy such that the media agent restores secondary copies corresponding to the subset of the total amount of data and provides the restored secondary copies to the first controller content indexing proxy for use in content indexing without transmitting the restored secondary copies over an external network; and transmitting an instruction to the first controller content indexing proxy indicating that the subset of the total amount of data to content index is assigned to the first controller content indexing proxy.

The computer-implemented method of the preceding paragraph can include any sub-combination of the following features: where the computer-implemented method further comprises tracking progress of content indexing performed by the first controller content indexing proxy; where the computer-implemented method further comprises transmitting a notification indicating the tracked progress; where the tracked progress comprises one of a percentage of the subset of the total amount of data assigned to the first controller content indexing proxy that has yet to be content indexed, an amount of the subset of the total amount of data assigned to the first controller content indexing proxy that has yet to be content indexed, or a time remaining until the subset of the total amount of data assigned to the first available controller content indexing proxy is content indexed; where the computer-implemented method further comprises determining that the first controller content indexing proxy is operating at a performance level below a threshold value based on the tracked progress, and assigning at least some of the subset of the total amount of data assigned to the first controller content indexing proxy to another controller content indexing proxy; where assigning the subset of the total amount of data to content index to the first controller content indexing proxy further comprises assigning one of a first archive file, a portion of a second archive file, or individual primary data to the first controller content indexing proxy; where a first worker thread and a second worker thread execute on the first controller content indexing proxy, and where assigning the subset of the total amount of data to content index to the first controller content indexing proxy further comprises: assigning a first portion of the subset of the total amount of data to the first worker thread, and assigning a second portion of the subset of the total amount of data to the second worker thread; where the restored secondary copies are in an independent format; where the computer-implemented method further comprises determining a total amount of data to content index for a second set of content indexing operations while the total number of controller content indexing proxies that are available to perform the content indexing operations is determined; and where transmitting a query for a total amount of data to content index further comprises transmitting a query for a total amount of data in a first mailbox to content index.

Another aspect of the disclosure provides a networked information management system for combining backup and content index data. The networked information management system comprises an indexing storage system having one or more first hardware processors, where the indexing storage system is configured with first computer-executable instructions that, when executed, cause the indexing storage system to: receive an indication that a first file has been backed up by a first computing device that executes a media agent; add a first entry in a backup and content indexing database corresponding to the first file that has been backed up, where the first entry comprises an indication of a secondary copy location of the first file; receive a request for the secondary copy location; transmit the secondary copy location such that a restored secondary copy of the first file can be content indexed; receive one or more keywords extracted from the restored secondary copy of the first file; and store the one or more keywords in the first entry in the backup and content indexing database. The networked information management system further comprises a controller content indexing proxy in communication with the indexing storage system, where the controller content indexing proxy has one or more second hardware processors, where the controller content indexing proxy is configured with second computer-executable instructions that, when executed, cause the controller content indexing proxy to transmit the request for the secondary copy location.

The networked information management system of the preceding paragraph can include any sub-combination of the following features: where the first computer-executable instructions, when executed, further cause the indexing storage system to mark the first entry in the backup and content indexing database to indicate that the first file has been content indexed; where the first computer-executable instructions, when executed, further cause the indexing storage system to change a status flag in the first entry to indicate that the first file has been content indexed; where the indexing storage system is configured to not store a preview of the first file generated during the content indexing of the first file; where the first computer-executable instructions, when executed, further cause the indexing storage system to receive at least one of file metadata associated with the first file or secondary copy metadata associated with the first file and generated by the first computing device; where the first computer-executable instructions, when executed, further cause the indexing storage system to store at least one of the file metadata or the secondary copy metadata in the first entry in the in the backup and content indexing database; where the second computer-executable instructions, when executed, further cause the controller content indexing proxy to request a restoration of the first file from the secondary copy location; where the second computer-executable instructions, when executed, further cause the controller content indexing proxy to request content indexing of the first file subsequent to the request for the restoration of the first file from the secondary copy location; where the second computer-executable instructions, when executed, further cause the controller content indexing proxy to request a secondary copy location of a second file while requesting the restoration of the first file from the secondary copy location; and where the restored secondary copy of the first file is in a markup language format.

Another aspect of the disclosure provides a computer-implemented method for combining backup and content index data. The computer-implemented method comprises: receiving an indication that a first file has been backed up by a first computing device that executes a media agent; adding a first entry in a backup and content indexing database corresponding to the first file that has been backed up, where the first entry comprises an indication of a secondary copy location of the first file; receiving a request for the secondary copy location; transmitting the secondary copy location such that a restored secondary copy of the first file can be content indexed; receiving one or more keywords extracted from the restored secondary copy of the first file; and storing the one or more keywords in the first entry in the backup and content indexing database.

The computer-implemented method of the preceding paragraph can include any sub-combination of the following features: where the computer-implemented method further comprises marking the first entry in the backup and content indexing database to indicate that the first file has been content indexed; where marking the first entry in the backup and content indexing database to indicate that the first file has been content indexed further comprises changing a status flag in the first entry to indicate that the first file has been content indexed; where the indexing storage system is configured to not store a preview of the first file generated during the content indexing of the first file; where receiving an indication that a first file has been backed up by a first computing device further comprises receiving at least one of file metadata associated with the first file or secondary copy metadata associated with the first file and generated by the first computing device; where the computer-implemented method further comprises storing at least one of the file metadata or the secondary copy metadata in the first entry in the in the backup and content indexing database; where the computer-implemented method further comprises: requesting a restoration of the first file from the secondary copy location, and requesting content indexing of the first file subsequent to the request for the restoration of the first file from the secondary copy location; where the computer-implemented method further comprises requesting a secondary copy location of a second file while requesting the restoration of the first file from the secondary copy location; where the restored secondary copy of the first file is in an independent format; where receiving a request for the secondary copy location further comprises: receiving a request for the secondary copy location of the first file from a first controller content indexing proxy at the direction of a master content indexing proxy, and receiving a request for a secondary copy location of a second file from a second controller content indexing proxy at the direction of the master content indexing proxy.

Another aspect of the disclosure provides a networked information management system for separately storing previews. The networked information management system comprises a preview database. The networked information management system further comprises a backup and content indexing database. The networked information management system further comprises a content indexing service having one or more first hardware processors, where the content indexing service is configured with first computer-executable instructions that, when executed, cause the content indexing service to: receive a restored version of a secondary copy, where the secondary copy corresponds to a first data file; parse the restored version of the secondary copy; extract one or more keywords corresponding the first data file based on the parsing of the restored version of the secondary copy; generate a preview of the restored version of the secondary copy; store the generated preview of the restored version of the secondary copy in the preview database; and store, in the backup and content indexing database, the one or more extracted keywords and a path to a storage location of the generated preview in the preview database.

The networked information management system of the preceding paragraph can include any sub-combination of the following features: where the preview database comprises a link to a duplicate preview at a location corresponding to the path to the storage location of the generated preview; where the first computer-executable instructions, when executed, further cause the content indexing service to identify the path to the storage location of the generated preview in the preview database subsequent to storing the generated preview in the preview database; where the first computer-executable instructions, when executed, further cause the content indexing service to process an instruction to content index the first data file; where the first computer-executable instructions, when executed, further cause the content indexing service to parse the restored version of the secondary copy in response to reception of the instruction to content index the first data file; where the first computer-executable instructions, when executed, further cause the content indexing service to process an instruction to content index the first data file received from a controller content indexing proxy; where the first computer-executable instructions, when executed, further cause the content indexing service to receive the restored version of the secondary copy as a result of the controller content indexing proxy instructing a first computing device having a media agent to restore the first data file; where the first computer-executable instructions, when executed, further cause the content indexing service to store the one or more extracted keywords in the backup and content indexing database in an entry associated with the first data file; where storage of the one or more extracted keywords in the backup and content indexing database results in an indication, in the backup and content indexing database, that the first data file is content indexed; and where the restored version of the secondary copy is in a markup language format.

Another aspect of the disclosure provides a computer-implemented method for separately storing previews. The computer-implemented method further comprises: receiving a restored version of a secondary copy, where the secondary copy corresponds to a first data file; parsing the restored version of the secondary copy; extracting one or more keywords corresponding the first data file based on the parsing of the restored version of the secondary copy; generating a preview of the restored version of the secondary copy; storing the generated preview of the restored version of the secondary copy in a preview database; and storing, in a backup and content indexing database, the one or more extracted keywords and a path to a storage location of the generated preview in the preview database.

The computer-implemented method of the preceding paragraph can include any sub-combination of the following features: where the preview database comprises a link to a duplicate preview at a location corresponding to the path to the storage location of the generated preview; where the computer-implemented method further comprises identifying the path to the storage location of the generated preview in the preview database subsequent to storing the generated preview in the preview database; where the computer-implemented method further comprises receiving an instruction to content index the first data file; where parsing the restored version of the secondary copy further comprises parsing the restored version of the secondary copy in response to reception of the instruction to content index the first data file; where receiving an instruction to content index the first data file further comprises: receiving an instruction to content index the first data file from a first controller content indexing proxy at the direction of a master content indexing proxy, and receiving an instruction to content index a second data file from a second controller content indexing proxy at the direction of the master content indexing proxy; where receiving the restored version of the secondary copy further comprises receiving the restored version of the secondary copy as a result of the first controller content indexing proxy instructing a first computing device having a media agent to restore the first data file; where storing the one or more extracted keywords further comprises storing the one or more extracted keywords in the backup and content indexing database in an entry associated with the first data file; where storage of the one or more extracted keywords in the backup and content indexing database results in an indication, in the backup and content indexing database, that the first data file is content indexed; and where the restored version of the secondary copy is in an independent format.

Another aspect of the disclosure provides a networked information management system for content indexing emails. The networked information management system comprises a content indexing proxy having one or more first hardware processors, where the content indexing proxy is configured with first computer-executable instructions that, when executed, cause the content indexing proxy to: receive, by a first thread executing on the content indexing proxy, identification of emails assigned to the content indexing proxy by a master content indexing proxy, where the identified emails are each associated with an email page in a plurality of email pages; and for each email page in the plurality of email pages, transmit, by the first thread to an indexing storage system, a query for secondary copy location data corresponding to the emails associated with the respective email page, receive, by the first thread, the secondary copy location data, transmit, by a second thread executing on the content indexing proxy, an instruction to a first computing device that executes a media agent to restore secondary copies stored at locations indicated by the secondary copy location data, receive, by a third thread executing on the content indexing proxy, an acknowledgment from the first computing device that a restoration of the secondary copies is complete, and transmit, by a fourth thread executing on the content indexing proxy, a request to content index the restored secondary copies. The networked information management system further comprises one or more computing devices in communication with the content indexing proxy, where the one or more computing devices each have one or more second hardware processors, where the one or more computing devices are configured with second computer-executable instructions that, when executed, cause the one or more computing devices to content index the restored secondary copies.

The networked information management system of the preceding paragraph can include any sub-combination of the following features: where the first computer-executable instructions, when executed, further cause the content indexing proxy to simultaneously transmit an instruction to the first computing device to restore secondary copies of emails associated with a first email page in the plurality of email pages and transmit a query for secondary copy location data corresponding to emails associated with a second email page in the plurality of email pages; where the first computer-executable instructions, when executed, further cause the content indexing proxy to: for an attachment file associated with a first email in a first email page in the plurality of email pages, transmit, by the first thread to the indexing storage system, a query for secondary copy location data corresponding to the attachment file, receive, by the first thread, the secondary copy location data corresponding to the attachment file, transmit, by the second thread, an instruction to the first computing device to restore a secondary copy of the attachment file stored at a location indicated by the secondary copy location data corresponding to the attachment file, receive, by the third thread, an acknowledgment from the first computing device that a restoration of the secondary copy of the attachment file is complete, and transmit, by the fourth thread, a request to content index the restored secondary copy of the attachment file; where the secondary copy of the attachment file is stored separately from a secondary copy of the first email in a secondary storage device; where the secondary copy location data comprises at least one of logical paths to secondary copies stored in a secondary storage device or offsets indicating where the secondary copies are stored in the secondary storage device; where the emails assigned to the content indexing proxy are emails that have not yet been content indexed; where the second computer-executable instructions, when executed, further cause the one or more computing devices to extract one or more keywords and generate one or more previews using the restored secondary copies; where the second computer-executable instructions, when executed, further cause the one or more computing devices to store the one or more keywords and the one or more previews in different databases; where the second computer-executable instructions, when executed, further cause the one or more computing devices to store the one or more keywords and a path to a storage location of the one or more previews in a backup and content indexing database; and where the restored secondary copies are in a markup language format.

Another aspect of the disclosure provides a computer-implemented method for content indexing emails. The computer-implemented method comprises: receiving, by a first thread executing on a content indexing proxy, identification of emails assigned to the content indexing proxy by a master content indexing proxy, where the identified emails are each associated with an email page in a plurality of email pages; and for each email page in the plurality of email pages, transmitting, by the first thread to an indexing storage system, a query for secondary copy location data corresponding to the emails associated with the respective email page, receiving, by the first thread, the secondary copy location data, transmitting, by a second thread executing on the content indexing proxy, an instruction to a first computing device that executes a media agent to restore secondary copies stored at locations indicated by the secondary copy location data, receiving, by a third thread executing on the content indexing proxy, an acknowledgment from the first computing device that a restoration of the secondary copies is complete, and transmitting, by a fourth thread executing on the content indexing proxy, a request to content index the restored secondary copies.

The computer-implemented method of the preceding paragraph can include any sub-combination of the following features: where the computer-implemented method further comprises simultaneously transmitting an instruction to the first computing device to restore secondary copies of emails associated with a first email page in the plurality of email pages and transmitting a query for secondary copy location data corresponding to emails associated with a second email page in the plurality of email pages; where the computer-implemented method further comprises for an attachment file associated with a first email in a first email page in the plurality of email pages, transmitting, by the first thread to the indexing storage system, a query for secondary copy location data corresponding to the attachment file, receiving, by the first thread, the secondary copy location data corresponding to the attachment file, transmitting, by the second thread, an instruction to the first computing device to restore a secondary copy of the attachment file stored at a location indicated by the secondary copy location data corresponding to the attachment file, receiving, by the third thread, an acknowledgment from the first computing device that a restoration of the secondary copy of the attachment file is complete, and transmitting, by the fourth thread, a request to content index the restored secondary copy of the attachment file; where the secondary copy of the attachment file is stored separately from a secondary copy of the first email in a secondary storage device; where the secondary copy location data comprises at least one of logical paths to secondary copies stored in a secondary storage device or offsets indicating where the secondary copies are stored in the secondary storage device; where the emails assigned to the content indexing proxy are emails that have not yet been content indexed; where the computer-implemented method further comprises extracting one or more keywords and generating one or more previews using the restored secondary copies; where the computer-implemented method further comprises storing the one or more keywords and the one or more previews in different databases; where the computer-implemented method further comprises receiving, by a first thread executing on a second content indexing proxy, identification of second emails assigned to the second content indexing proxy by the master content indexing proxy, and performing, by the second content indexing proxy, operations to content index the second emails; and where the restored secondary copies are in an independent format.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A networked information management system for content indexing restored secondary copies, the networked information management system comprising:
   a content indexing proxy having one or more first hardware processors, wherein the content indexing proxy is configured with first computer-executable instructions that, when executed, cause the content indexing proxy to:
      receive, by a first thread executing on the content indexing proxy, identification of primary data assigned to the content indexing proxy by a master content indexing proxy, wherein the master content indexing proxy monitors a status of the content indexing proxy and statuses of one or more other content indexing proxies;
      transmit, by the first thread to an indexing storage system, a query for secondary copy location data corresponding to the identified primary data;
      receive, by the first thread, the secondary copy location data;
      transmit, by a second thread executing on the content indexing proxy that is different than the first thread, an instruction to a first computing device that executes a media agent to restore secondary copies stored at locations indicated by the secondary copy location data;
      receive, by a third thread executing on the content indexing proxy that is different than the first and second threads, an acknowledgment from the first computing device that a restoration of the secondary copies is complete; and
      transmit, by a fourth thread executing on the content indexing proxy that is different than the first, second, and third threads, a request to content index the restored secondary copies; and
   one or more computing devices in communication with the content indexing proxy, wherein the one or more computing devices each have one or more second hardware processors, wherein the one or more computing devices are configured with second computer-executable instructions that, when executed, cause the one or more computing devices to:
      receive the request to content index the restored secondary copies;
      retrieve the restored secondary copies from the first computing device; and
      content index the restored secondary copies.

2. The networked information management system of claim 1, wherein the second computer-executable instructions, when executed, further cause the one or more computing devices to generate previews and extract keywords using the restored secondary copies.

3. The networked information management system of claim 2, wherein the second computer-executable instructions, when executed, further cause the one or more computing devices to store the generated previews in a database separate from secondary copy metadata.

4. The networked information management system of claim 2, wherein the indexing storage system comprises an index manager and a backup and content indexing database.

5. The networked information management system of claim 4, wherein the second computer-executable instructions, when executed, further cause the one or more computing devices to transmit the extracted keywords to the index manager.

6. The networked information management system of claim 5, wherein the index manager is configured to mark entries in the backup and content indexing database associated with the primary data to indicate that content indexing is complete.

7. The networked information management system of claim 6, wherein the index manager is configured to mark the entries by changing one or more status flags.

8. The networked information management system of claim 1, wherein the first computer-executable instructions, when executed, further cause the content indexing proxy to transmit, by the third thread to the fourth thread, a request for content indexing of the restored secondary copies in response to reception of the acknowledgment.

9. The networked information management system of claim 1, wherein a first worker thread and a second worker thread execute on the content indexing proxy, and wherein the first worker thread comprises the first thread, the second thread, the third thread, and the fourth thread.

10. The networked information management system of claim 9, wherein the primary data is assigned to the first worker thread and second primary data is assigned to the second worker thread by the master content indexing proxy.

11. A computer-implemented method for content indexing restored secondary copies, the computer-implemented method comprising:
   receiving, by a first thread executing on a content indexing proxy having one or more hardware processors, identification of primary data assigned to the content indexing proxy by a master content indexing proxy, wherein the master content indexing proxy monitors a status of the content indexing proxy and statuses of one or more other content indexing proxies;
   transmitting, by the first thread to an indexing storage system, a query for secondary copy location data corresponding to the identified primary data;
   transmitting, by a second thread executing on the content indexing proxy that is different than the first thread, an instruction to a first computing device that executes a media agent to restore secondary copies stored at locations indicated by the secondary copy location data;
   receiving, by a third thread executing on the content indexing proxy that is different than the first and second threads, an acknowledgment from the first computing device that a restoration of the secondary copies is complete;

retrieving the restored secondary copies from the first computing device; and content indexing the restored secondary copies.

12. The computer-implemented method of claim 11, wherein content indexing the restored secondary copies further comprises generating previews and extracting keywords using the restored secondary copies.

13. The computer-implemented method of claim 12, further comprising storing the generated previews in a database separate from secondary copy metadata.

14. The computer-implemented method of claim 12, wherein the indexing storage system comprises an index manager and a backup and content indexing database.

15. The computer-implemented method of claim 14, further comprising transmitting the extracted keywords to the index manager.

16. The computer-implemented method of claim 15, wherein the index manager is configured to mark entries in the backup and content indexing database associated with the primary data to indicate that content indexing is complete.

17. The computer-implemented method of claim 11, further comprising transmitting, by the third thread to the fourth thread, a request for content indexing of the restored secondary copies in response to reception of the acknowledgment.

18. The computer-implemented method of claim 11, wherein a first worker thread and a second worker thread execute on the content indexing proxy, wherein the first worker thread comprises the first thread, the second thread, the third thread, and the fourth thread, and wherein the primary data is assigned to the first worker thread and second primary data is assigned to the second worker thread by the master content indexing proxy.

19. The computer-implemented method of claim 11, wherein the primary data is assigned to the content indexing proxy and second primary data is assigned to a second content indexing proxy by the master content indexing proxy.

20. The computer-implemented method of claim 11, wherein transmitting a query for secondary copy location data corresponding to the identified primary data further comprises transmitting a query for secondary copy location data corresponding to emails in a first page.

* * * * *